United States Patent
Kondo et al.

(10) Patent No.: US 8,982,478 B2
(45) Date of Patent: Mar. 17, 2015

(54) IMAGING LENS AND IMAGING APPARATUS EQUIPPED WITH THE IMAGING LENS

(71) Applicant: FUJIFILM Corporation, Tokyo (JP)

(72) Inventors: Masato Kondo, Saitama-ken (JP); Michio Cho, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/208,839

(22) Filed: Mar. 13, 2014

(65) Prior Publication Data

US 2014/0192423 A1 Jul. 10, 2014

Related U.S. Application Data

(63) Continuation of application No. PCT/JP2013/002740, filed on Apr. 23, 2013.

(60) Provisional application No. 61/660,005, filed on Jun. 15, 2012.

(30) Foreign Application Priority Data

Apr. 27, 2012 (JP) .................................. 2012-102047

(51) Int. Cl.
    *G02B 3/02* (2006.01)
    *G02B 9/08* (2006.01)
    *G02B 9/60* (2006.01)

(52) U.S. Cl.
    USPC ............ 359/714; 359/739; 359/740; 359/766

(58) Field of Classification Search
    USPC .................... 359/714, 739, 740, 766
    See application file for complete search history.

(56) References Cited

U.S. PATENT DOCUMENTS

| | | | |
|---|---|---|---|
| 7,274,515 B2 | 9/2007 | Noda | |
| 8,508,860 B2 * | 8/2013 | Tang et al. | ..................... 359/714 |
| 8,760,775 B2 * | 6/2014 | Shinohara | ..................... 359/714 |
| 2006/0280498 A1 | 12/2006 | Souma et al. | |

FOREIGN PATENT DOCUMENTS

| | | |
|---|---|---|
| CN | 202110325 | 1/2012 |
| JP | 58-33211 | 2/1983 |
| JP | 63-116112 | 5/1988 |
| JP | 63-274904 | 11/1988 |
| JP | 2005-164839 | 6/2005 |
| JP | 2006-343554 | 12/2006 |
| JP | 2011-085733 | 4/2011 |
| JP | 2011-133062 | 6/2011 |

OTHER PUBLICATIONS

International Search Report, PCT/JP2013/002740, Jul. 30, 2013.

* cited by examiner

*Primary Examiner* — Evelyn A. Lester
(74) *Attorney, Agent, or Firm* — Young & Thompson

(57) ABSTRACT

An imaging lens substantially includes five lenses, constituted by: a first lens having a positive refractive power; a second lens having a negative refractive power; a third lens having a positive refractive power and a convex surface that faces an object side; a fourth lens having a negative refractive power and a meniscus shape with a concave surface that faces the object side; and a fifth lens having a positive refractive power, a meniscus shape with a convex surface that faces the object side, and at least one inflection point on the surface thereof toward an image side.

20 Claims, 28 Drawing Sheets

EXAMPLE 2

EXAMPLE 3

EXAMPLE 4

EXAMPLE 5

EXAMPLE 6

EXAMPLE 11

EXAMPLE 12

EXAMPLE 13

EXAMPLE 2

EXAMPLE 4

EXAMPLE 7

EXAMPLE 13

IMAGING LENS AND IMAGING APPARATUS EQUIPPED WITH THE IMAGING LENS

CROSS REFERENCE TO RELATED APPLICATIONS

This application is a continuation of PCT/JP2013/002740 filed on Apr. 23, 2013, which claims foreign priority to Japanese application No. 2012-102047 filed on Apr. 27, 2012. This application also claims the 35 USC 119(e) benefit of provisional application 61/660,005 filed on Jun. 15, 2012. The entire contents of each of the above applications are hereby incorporated by reference.

TECHNICAL FIELD

The present invention is related to a fixed focus imaging lens for forming optical images of subjects onto an imaging element such as a CCD (Charge Coupled Device) and a CMOS (Complementary Metal Oxide Semiconductor). The present invention is also related to an imaging apparatus provided with the imaging lens that performs photography such as a digital still camera, a cellular telephone with a built in camera, a PDA (Personal Digital Assistant), a smart phone, a tablet terminal, and a portable gaming device.

BACKGROUND ART

Accompanying the recent spread of personal computers in households, digital still cameras capable of inputting image data such as photographed scenes and portraits into personal computers are rapidly becoming available. In addition, many cellular telephones and smart phones are being equipped with camera modules for inputting images. Imaging elements such as CCD's and CMOS's are employed in these devices having photography functions. Recently, miniaturization of these imaging elements is advancing, and there is demand for miniaturization of the entirety of the photography devices as well as imaging lenses to be mounted thereon. At the same time, the number of pixels in imaging elements is increasing, and there is demand for high resolution and high performance of imaging lenses. Performance corresponding to 5 megapixels or greater, and more preferably 8 megapixels or greater, is desired.

In response to such demands, an imaging lens having a five lens configuration, which is a comparatively large number of lenses, may be considered in order to shorten total length and to obtain high resolution. For example, imaging lenses constituted by a first lens having a positive refractive power, a second lens having a negative refractive power, a third lens having a positive refractive power, a fourth lens having a negative refractive power, and a fifth lens having a positive refractive power have been proposed in Japanese Unexamined Patent Publication No. 2011-085733, Chinese Utility Model Publication No. 202110325, U.S. Pat. No. 7,274,515, Japanese Unexamined Patent Publication No. 63 (1988)-116112, and Japanese Unexamined Patent Publication No. 63 (1988)-274904, as well as in Japanese Patent Application No. 2011-133062 assigned to the present assignee.

DISCLOSURE OF THE INVENTION

Here, in an imaging lens configured by a comparatively large number of lenses as described above, and particularly in an imaging lens for use in a PDA, in which a shortened total length is desired, there is demand for an imaging lens having an image size capable of dealing with a large imaging element of approximately the same size as a conventional imaging element.

It would be preferable for the total lengths of the imaging lenses having a five lens configuration disclosed in Japanese Unexamined Patent Publication No. 2011-085733, and U.S. Pat. No. 7,274,515 to be further shortened in order to meet this demand. The lenses disclosed in Chinese Utility Model Publication No. 202110325, Japanese Unexamined Patent Publication No. 63 (1988)-116112, and Japanese Unexamined Patent Publication No. 63 (1988)-274904 have total lengths which are large with respect to the size of an imaging element. If these lenses are proportionately enlarged to correspond to a comparatively large imaging element, the total lengths thereof will become great. Therefore, the demand to further shorten the total lengths of these lenses will still remain.

The present invention has been developed in view of the foregoing problems. The object of the present invention is to provide an imaging lens that can realize high imaging performance from a central angle of view through peripheral angles of view while having a short total length and a large image size. It is another object of the present invention to provide an imaging apparatus equipped with the lens, which is capable of obtaining high resolution photographed images.

An imaging lens of the present invention substantially consists of five lenses, including:
a first lens having a positive refractive power;
a second lens having a negative refractive power;
a third lens having a positive refractive power and a convex surface that faces an object side;
a fourth lens having a negative refractive power and a meniscus shape with a concave surface that faces the object side; and
a fifth lens having a positive refractive power, a meniscus shape with a convex surface that faces the object side, and at least one inflection point on the surface thereof toward an image side.

In the imaging lens of the present invention, the configuration of each lens element is optimized, and particularly the shapes of the third lens and the fifth lens are favorably configured in a lens configuration having five lenses in total. Therefore, a lens system having high resolution performance can be realized while shortening the total length thereof.

Note that in the imaging lens of the present invention, the expression "substantially consists of five lenses" means that the imaging lens of the present invention may also include lenses that practically have any power, optical elements other than lenses such as aperture stops and cover glass, and mechanical components such as lens flanges, a lens barrel, an imaging element, a blur correcting mechanism, etc.

The optical performance of the imaging lens of the present invention can be further improved by adopting the following favorable configurations.

In addition, it is preferable for an aperture stop to be provided toward the object side of the surface of the second lens toward the object side in the imaging lens of the present invention.

It is preferable for the imaging lens of the present invention to satisfy the following Conditional Formulae (1) through (9-2). Note that any one of Conditional Formulae (1) through (9-2) may be satisfied, or arbitrary combinations of Conditional Formulae (1) through (9-2) may be satisfied.

$$0 < f/f3 < 0.5 \tag{1}$$

$$0 < f/f3 < 0.45 \tag{1-1}$$

$$0 < f/R6 < 5 \quad (2)$$

$$0.2 < f/R6 < 3 \quad (2\text{-}1)$$

$$vd4 < 30 \quad (3)$$

$$vd4 < 26 \quad (3\text{-}1)$$

$$-4 < (R6-R7)/(R6+R7) < 0.1 \quad (4)$$

$$-2.5 < (R6-R7)/(R6+R7) < 0.05 \quad (4\text{-}1)$$

$$1 < f/f1 < 2 \quad (5)$$

$$1.25 < f/f1 < 1.47 \quad (5\text{-}2)$$

$$-1.5 < f/f2 < -0.4 \quad (6)$$

$$-0.9 < f/f2 < -0.63 \quad (6\text{-}2)$$

$$-2 < f/f4 < -0.1 \quad (7)$$

$$-1 < f/f4 < -0.17 \quad (7\text{-}2)$$

$$0 < f/f5 < 2 \quad (8)$$

$$0.5 < f/f123 < 2 \quad (9)$$

$$0.66 < f/f123 < 1.25 \quad (9\text{-}2)$$

wherein f is the focal length of the entire system, f1 is the focal length of the first lens, f2 is the focal length of the second lens, f3 is the focal length of the third lens, f4 is the focal length of the fourth lens, f5 is the focal length of the fifth lens, f123 is the combined focal length of the first through third lenses, vd4 is the Abbe's number of the fourth lens with respect to the d line, R6 is the paraxial radius of curvature of the surface of the third lens toward the object side, and R7 is the paraxial radius of curvature of the surface of the third lens toward the image side.

An imaging apparatus of the present invention is equipped with the imaging lens of the present invention.

The imaging apparatus of the present invention is capable of obtaining high resolution image signals, based on high resolution optical images obtained by the imaging lens of the present invention.

In the imaging lens of the present invention, the configuration of each lens element in a five lens configuration is optimized, and particularly, the shapes of the first lens and the fifth lens, are favorably configured. Therefore, a lens system having a short total length, a large image size, and further high imaging performance from a central angle of view through peripheral angles of view can be realized.

In addition, the imaging apparatus of the present invention outputs image signals corresponding to optical images formed by the imaging lens of the present invention which has the high imaging performance. Therefore, high resolution images can be obtained.

BEST MODE FOR CARRYING OUT THE INVENTION

Hereinafter, embodiments of the present invention will be described in detail with reference to the attached drawings.

Figure 1:
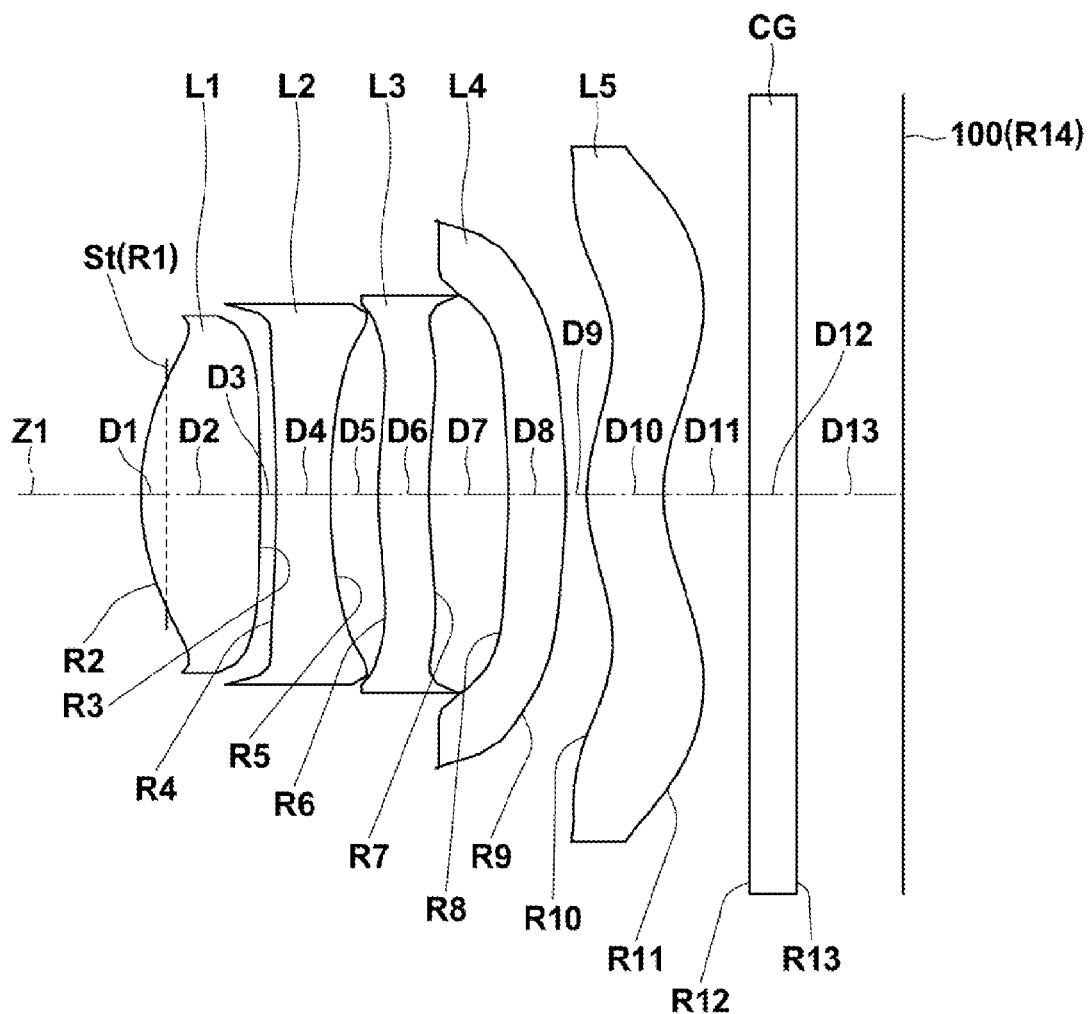
FIG. 1 is a sectional diagram that illustrates a first example of the configuration of an imaging lens according to an embodiment of the present invention, and corresponds to a lens of Example 1.

FIG. 1 illustrates a first example of the configuration of an imaging lens according to an embodiment of the present invention. This example corresponds to the configuration of a lens of Example 1 having the numerical values shown in Table 1 and Table 14, to be described later. Similarly, FIGS. 2 through 13 are sectional diagrams that illustrate second through thirteenth examples of the configurations of imaging lenses according to embodiments of the present invention. The examples of FIGS. 2 through 13 correspond to the configurations of lenses of Examples 2 through 13 having the numerical values shown in Tables 2 through 13 and Tables 15 through 26. In FIGS. 1 through 13, the symbol Ri represents the radii of curvature of ith surfaces, i being lens surface numbers that sequentially increase from the object side to the image side (imaging side), with the surface of a lens element most toward the object side designated as first. The symbol Di represents the distances between an ith surface and an i+1st surface along an optical axis Z1. Note that the basic configurations of the examples are the same, and therefore a description will be given of the imaging lens of FIG. 1 as a base, and the examples of FIGS. 2 through 13 will also be described as necessary. In addition, FIG. 14 is an optical path diagram of the imaging lens L of FIG. 1, and illustrates a beam 2 along the optical axis and a beam 3 having a maximum angle of view from an object at infinity.

The imaging lens L of the embodiment of the present invention is favorably employed in various imaging devices that employ imaging elements such as a CCD and a CMOS. The imaging lens L of the embodiment of the present invention is particularly favorable for use in comparatively miniature portable terminal devices, such as a digital still camera, a cellular telephone with a built in camera, a smart phone, a tablet type terminal, and a PDA. The imaging lens L is equipped with a first lens L1, a second lens L2, a third lens L3, a fourth lens L4, and a fifth lens L5 along the optical axis Z1, in this order from the object side.

Figure 28:
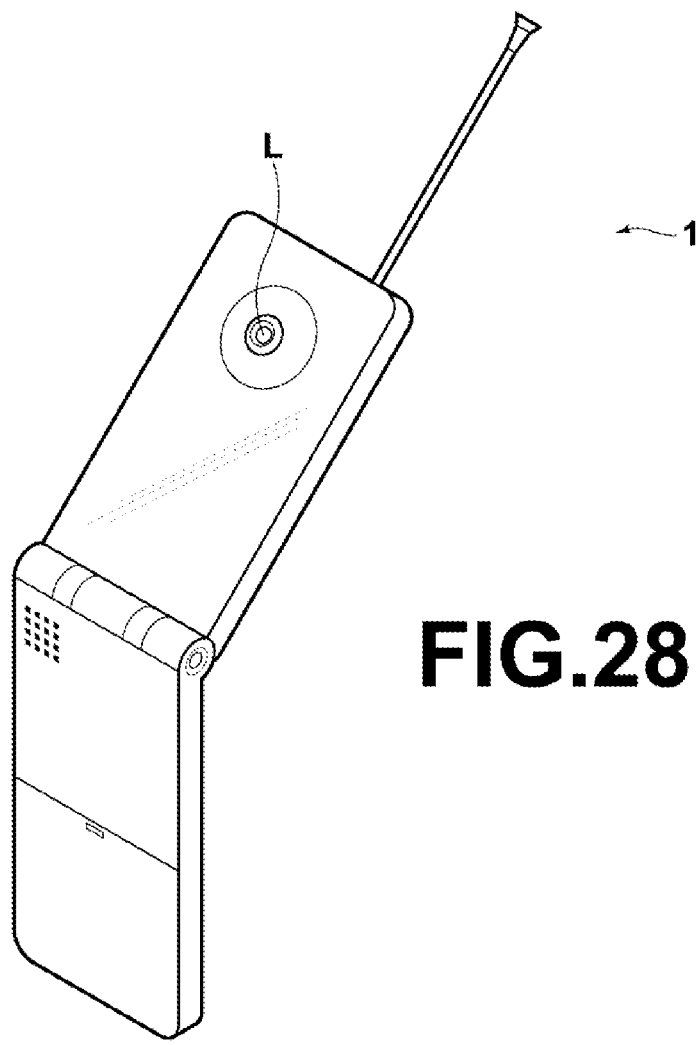
FIG. 28 is a diagram that illustrates a cellular telephone as an imaging apparatus equipped with the imaging lens of the present invention.

FIG. 28 schematically illustrates a cellular telephone as an imaging apparatus 1 according to an embodiment of the present invention. The imaging apparatus 1 of the embodiment of the present invention is equipped with the imaging lens L according to the embodiment of the present invention and an imaging element 100 (refer to FIG. 1) such as a CCD that outputs image signals corresponding to optical images formed by the imaging lens L. The imaging element 100 is provided at an imaging surface (image surface R13) of the imaging lens L.

Figure 29:
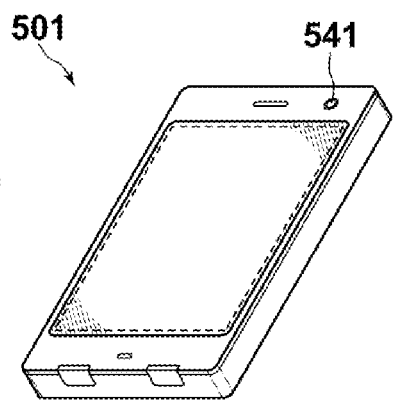
FIG. 29 is a diagram that illustrates a smart phone as an imaging apparatus equipped with the imaging lens of the present invention.

FIG. 29 schematically illustrates a smart phone as an imaging apparatus 501 according to an embodiment of the present invention. The imaging apparatus 501 of the embodiment of the present invention is equipped with a camera section 541 having the imaging lens L according to the embodiment of the present invention and an imaging element 100 (refer to FIG. 1) such as a CCD that outputs image signals corresponding to optical images formed by the imaging lens L. The imaging element 100 is provided at an imaging surface (image surface) of the imaging lens L.

Various optical members CG may be provided between the fifth lens L5 and the imaging element 100, depending on the configuration of the camera to which the lens is applied. A planar optical member CG such as a glass cover for protecting the imaging surface and infrared cutoff filters may be provided, for example. In this case, a planar glass cover having a coating having a filtering effect such as an infrared cutoff filter coating or an ND filter coating may be utilized as the optical member CG.

Alternatively, the optical member CG may be omitted, and a coating may be administered on the fifth lens L5 to obtain the same effect as that of the optical member CG. In this case, the number of parts can be reduced, and the total length can be shortened.

It is preferable for the imaging lens L to be equipped with an aperture stop St provided more toward the object side than the surface of the second lens L2 toward the object side. By providing the aperture stop St more toward the object side than the surface of the second lens L2 toward the object side, the incident angles of rays of light that pass through the optical system with respect to the imaging surface (imaging element) can be prevented from becoming excessively large, particularly at the peripheral portions of an imaging region. In order to increase this advantageous effect, it is more preferable for the aperture stop St to be provided more toward the object side than the surface of the first lens toward the object side. Note that the aperture stop being provided "more toward the object side than the surface of the second lens toward the object side" means that the position of the aperture stop along the direction of the optical axis is the same as or more toward the object side than the intersection of a marginal ray of light on the axis and the surface of the second lens L2 toward the object side. In addition, the aperture stop being provided "more toward the object side than the surface of the first lens toward the object side" means that the position of the aperture stop along the direction of the optical axis is the same as or more toward the object side than the intersection of a marginal ray of light on the axis and the surface of the first lens L1 toward the object side.

In the present embodiment, the first through thirteenth examples of the lenses (FIG. 1 through FIG. 13) are those in which the aperture stop St is provided more toward the object side than the surface of the first lens L1 toward the image side. In the present embodiment, the apertures stop St is provided more toward the image side than the peak of the surface of the first lens L1. However, the present invention is not limited to such a configuration, and the aperture stop St may be provided more toward the object side than the peak of the surface of the first lens L1. A configuration in which the aperture stop St is provided more toward the object side than the peak of the surface of the first lens L1 is somewhat disadvantageous compared to a configuration in which the aperture stop St is provided more toward the image side than the peak of the surface of the first lens L1 from the viewpoint of securing a sufficient amount of peripheral light. However, the incident angles of rays of light that pass through the optical system with respect to the imaging surface (imaging element) can be further prevented from becoming excessively large, particularly at the peripheral portions of an imaging region.

In the imaging lens L, the first lens L1 has a positive refractive power in the vicinity of the optical axis. In addition, it is preferable for the first lens L1 to be of a biconvex shape in the vicinity of the optical axis as in the imaging lens of the first embodiment illustrated in FIG. 1. Correction of spherical aberrations is facilitated in the case that the first lens L1 is of a biconvex shape.

The second lens L2 has a negative refractive power in the vicinity of the optical axis. In addition, it is preferable for the second lens L2 to be of a biconcave shape in the vicinity of the optical axis as in the imaging lens of the first embodiment illustrated in FIG. 1. Correction of longitudinal chromatic aberrations is facilitated in the case that the second lens is of a biconcave shape.

The third lens L3 has a positive refractive power in the vicinity of the optical axis. In addition, the third lens L3 has a surface which is convex toward the object side in the vicinity of the optical axis. The total length can be shortened to a greater degree by the third lens L3 having a surface which is convex toward the object side in the vicinity of the optical axis. Further, it is preferable for the third lens L3 to be of a meniscus shape having a convex surface toward the object side in the vicinity of the optical axis as in the imaging lens of the first embodiment illustrated in FIG. 1. The total length can be easily shortened, and correction of spherical aberrations is facilitated by the third lens being of a meniscus shape having a convex surface toward the object side in the vicinity of the optical axis.

The fourth lens L4 has a negative refractive power in the vicinity of the optical axis. In addition, the fourth lens L4 is of a meniscus shape having a concave surface toward the object side in the vicinity of the optical axis. Correction of astigmatic aberrations at low angles of view is facilitated by the fourth lens being of a meniscus shape having a concave surface toward the object side in the vicinity of the optical axis.

The fifth lens L5 has a positive refractive power in the vicinity of the optical axis. In addition, the fifth lens L5 is of a meniscus shape having a convex surface toward the object side in the vicinity of the optical axis. In the imaging lens L, shortening of the total length can be realized and field curvature can be favorably corrected, by the fifth lens L5 being of a meniscus shape having a convex surface toward the object side in the vicinity of the optical axis. In addition, it is preferable for the fifth lens L5 to have at least one inflection point on the surface thereof toward the image side. The "inflection point" on the surface of the fifth lens L5 toward the image side refers to a point at which the shape of the surface of the fifth lens L5 toward the image side changes from a convex shape to a concave shape (or from a concave shape to a convex shape) with respect to the image side. The position of the inflection point may be any arbitrary position within a range from the optical axis to the effective diameter of the surface of the fifth lens L5 toward the image side. Preferably, the at least one inflection point is provided at the peripheral portion of the surface. The incident angles of rays of light that pass through the optical system with respect to the imaging surface (imaging element) can be prevented from becoming excessively large, particularly at the peripheral portions of an imaging region, by the surface of the fifth lens L5 toward the image side being of a shape which has at least one inflection point. Note that here, the peripheral portion of the surface refers to a portion outside approximately 40% of a maximum effective radius of the surface in the radial direction.

According to the imaging lens L, the configuration of each lens element in a five lens configuration is optimized, and particularly, the shapes of the third lens and the fifth lens are favorably configured. Therefore, a lens system having a short total length, a large image size, and high resolution can be realized. In addition, the imaging lens L substantially consists of the first lens having the positive refractive power, the second lens having the negative refractive power, the third lens having the positive refractive power, the fourth lens having the negative refractive power, and the fifth lens having the positive refractive power, in this order from the object side. The lenses are arranged such that the refractive powers of the lenses are symmetrically arranged as positive, negative, positive, negative, and positive in the direction of the optical axis. Therefore, lateral chromatic aberration and distortion can be favorably corrected.

In addition, in the case that the configuration of each of the first through fifth lenses of the imaging lens L is set such that the full angle of view 2ω is 50 degrees or greater as in the embodiments illustrated in FIGS. 1 through 13, for example, the imaging lens L may be favorably applied to imaging apparatuses which are employed often for short distance imaging, such as cellular telephones, because the full angle of view 2ω is an appropriate value.

Note that the lenses disclosed in Japanese Unexamined Patent Publication No. 63 (1988)-116112 and Japanese Unexamined Patent Publication No. 63 (1988)-274904 presume that astigmatic aberrations are corrected employing image rotating prisms. Therefore, if these lenses are employed individually as imaging lenses without employing image rotating prisms, correction of astigmatic aberrations will become difficult, which his not preferable. In addition, the F numbers of the lenses disclosed in Japanese Unexamined Patent Publication No. 63 (1988)-116112 and Japanese Unexamined Patent Publication No. 63 (1988)-274904 are large, and are not capable of realizing a sufficiently small F number capable of imaging in low light conditions, which is required for imaging lenses which are applied to cellular telephones, for example. In contrast, the imaging lens according to the embodiment of the present invention has a smaller F number than the lenses disclosed in Japanese Unexamined Patent Publication No. 63 (1988)-116112 and Japanese Unexamined Patent Publication No. 63 (1988)-274904. In addition, the imaging lens according to the embodiment of the present invention can be favorably employed without being equipped with an image rotating prism. Therefore, the imaging lens according to the embodiment of the present invention may be favorably applied to imaging apparatuses such as cellular telephones.

It is preferable for at least one of the surfaces of each of the first lens L1 through the fifth lens L5 of the imaging L to be an aspherical surface, in order to improve performance.

In addition, it is preferable for each of the first lens L1 through the fifth lens L5 that constitute the imaging lens L to be a single lens, not a cemented lens. If the lenses are single lenses, the number of aspherical surfaces will be greater than that in the case that any of the lenses L1 through L5 is a cemented lens. Therefore, the degree of freedom in the design of each lens will increase, and the total length can be favorably shortened.

Next, the operation and effects of he conditional formulae of the imaging lens L will be described in greater detail.

First, the focal distance f3 of the third lens L3 and the focal distance f of the entire system satisfy Conditional Formula (1) below.

$$0 < f/f3 < 0.5 \tag{1}$$

Conditional Formula (1) defines the preferred range of numerical values for the ratio of the focal length f of the entire system with respect to the focal length f3 of the third lens L3. In the case that the value of f/f3 is less than the lower limit defined in Conditional Formula (1), correction of spherical aberrations will become difficult. In the case that the value of f/f3 exceeds the upper limit defined in Conditional Formula (1), the refractive power of the third lens L3 will become excessively strong with respect to the refractive power of the entire system, and it will become difficult to shorten the total length of the imaging lens while maintaining a wide angle of view. For these reasons, spherical aberrations can be favorably corrected, and the length of the entire lens system can be shortened while maintaining a wide angle of view, by satisfying the range defined in Conditional Formula (1). It is preferable for Conditional Formula (1-1) below to be satisfied in order to cause this advantageous effect to become more prominent.

$$0 < f/f3 < 0.45 \tag{1-1}$$

In addition, the focal length f of the entire system and the paraxial radius of curvature R6 of the surface of the third lens toward the object side satisfy Conditional Formula (2) below.

$$0 < f/R6 < 5 \tag{2}$$

Conditional Formula (2) defines the preferred range of numerical values for the ratio between the paraxial radius of curvature R6 of the surface of the third lens toward the object side and the focal length f of the entire system. In the case that the value of f/R6 is less than the lower limit defined in Conditional Formula (2), shortening of the total length will become difficult. In the case that the value of f/R6 exceeds the upper limit defined in Conditional Formula (2), correction of spherical aberrations will become difficult. For these reasons, shortening of the total length can be realized and spherical aberrations can be favorably corrected, by satisfying the range defined in Conditional Formula (2). It is preferable for Conditional Formula (2-1) below to be satisfied in order to cause this advantageous effect to become more prominent.

$$0.2 < f/R6 < 3 \tag{2-1}$$

It is preferable for the Abbe's number vd4 of the fourth lens L4 with respect to the d line to satisfy Conditional Formula (3) below.

$$vd4 < 30 \tag{3}$$

Conditional Formula (3) defines the preferred range of numerical values for the Abbes number vd4 of the fourth lens L4 with respect to the d line. If the value of vd4 exceeds the upper limit defined in Conditional Formula (3), correction of lateral chromatic aberrations will become difficult. The fourth lens L4 can be constituted by a high dispersion material by satisfying Conditional Formula (3), and lateral chromatic aberrations can be favorably corrected. From this viewpoint, it is more preferable for Conditional Formula (3-1) below to be satisfied.

$$vd4 < 26 \tag{3-1}$$

In addition, it is preferable for the paraxial radius of curvature R6 of the surface of the third lens L3 toward the object side and the paraxial radius of curvature R7 of the surface of the third lens L3 toward the image side to satisfy Conditional Formula (4) below.

$$-4 < (R6-R7)/(R6+R7) < 0.1 \tag{4}$$

Conditional Formula (4) defines the preferred range of numerical values for the paraxial radius of curvature R6 of the surface of the third lens L3 toward the object side and the paraxial radius of curvature R7 of the surface of the third lens L3 toward the image side. In the case that the value of (R6−R7)/(R6+R7) is less than the lower limit defined in Conditional Formula (4), astigmatic aberrations will become over corrected, particularly at low angles of view. In the case that the value of (R6−R7)/(R6+R7) exceeds the upper limit defined in Conditional Formula (4), astigmatic aberrations will become under corrected, particularly at low angles of view. For these reasons, astigmatic aberrations can be favorably corrected by satisfying the range defined in Conditional Formula (4). It is preferable for Conditional Formula (4-1) below to be satisfied in order to cause this advantageous effect to become more prominent.

$$-2.5 < (R6-R7)/(R6+R7) < 0.05 \tag{4-1}$$

In addition, the focal length f1 of the first lens L1 and the focal length f of the entire system satisfy Conditional Formula (5) below.

$$1 < f/f1 < 2 \tag{5}$$

Conditional Formula (5) defines the preferred range of numerical values for the ratio of the focal length f of the entire system with respect to the focal length f1 of the first lens L1. In the case that the value of f/f1 is less than the lower limit defined in Conditional Formula (5), the refractive power of the first lens L1 will become excessively weak with respect to the refractive power of the entire system, and it will become difficult to shorten the total length of the imaging lens. In the case that the value of f/f1 exceeds the upper limit defined in Conditional Formula (5), the refractive power of the first lens L1 will become excessively strong with respect to the refractive power of the entire system, and it will become difficult to correct astigmatic aberrations, particularly at low angles of view. For these reasons, the length of the entire lens system can be shortened while favorably correcting astigmatic aberrations, by satisfying the range defined in Conditional Formula (5). It is preferable for Conditional Formula (5-1) below to be satisfied, and more preferable for Conditional Formula (5-2) to be satisfied, in order to cause this advantageous effect to become more prominent.

$$1.1<f/f1<1.7 \qquad (5\text{-}1)$$

$$1.25<f/f1<1.47 \qquad (5\text{-}2)$$

In addition, the focal length f2 of the second lens L2 and the focal length f of the entire system satisfy Conditional Formula (6) below.

$$-1.5<f/f2<-0.4 \qquad (6)$$

Conditional Formula (6) defines the preferred range of numerical values for the ratio of the focal length f of the entire system with respect to the focal length f2 of the second lens L2. In the case that the value of f/f2 is less than the lower limit defined in Conditional Formula (6), the refractive power of the second lens L2 will become excessively strong with respect to the refractive power of the entire system, and it will become difficult to correct spherical aberrations. In the case that the value of f/f2 exceeds the upper limit defined in Conditional Formula (6), the refractive power of the second lens L2 will become excessively weak with respect to the refractive power of the entire system, and it will become difficult to correct lateral chromatic aberrations. For these reasons, spherical aberrations and lateral chromatic aberrations can be favorably corrected, by satisfying the range defined in Conditional Formula (6). It is preferable for Conditional Formula (6-1) below to be satisfied, and more preferable for Conditional Formula (6-2) to be satisfied, in order to cause this advantageous effect to become more prominent.

$$-1<f/f2<-0.55 \qquad (6\text{-}1)$$

$$-0.9<f/f2<-0.63 \qquad (6\text{-}2)$$

In addition, the focal length f4 of the fourth lens L4 and the focal length f of the entire system satisfy Conditional Formula (7) below.

$$-2<f/f4<-0.1 \qquad (7)$$

Conditional Formula (7) defines the preferred range of numerical values for the ratio of the focal length f of the entire system with respect to the focal length f4 of the fourth lens L4. In the case that the value of f/f4 is less than the lower limit defined in Conditional Formula (7), the refractive power of the fourth lens L4 will become excessively strong with respect to the refractive power of the entire system, and it will become difficult to correct spherical aberrations. In the case that the value of f/f4 exceeds the upper limit defined in Conditional Formula (7), the refractive power of the fourth lens L4 will become excessively weak with respect to the refractive power of the entire system, and it will become difficult to correct lateral chromatic aberrations. For these reasons, spherical aberrations and lateral chromatic aberrations can be favorably corrected, by satisfying the range defined in Conditional Formula (7). It is preferable for Conditional Formula (7-1) below to be satisfied, and more preferable for Conditional Formula (7-2) to be satisfied, in order to cause this advantageous effect to become more prominent.

$$-1.25<f/f4<-0.13 \qquad (7\text{-}1)$$

$$-1<f/f4<-0.17 \qquad (7\text{-}2)$$

In addition, the focal length f5 of the fifth lens L5 and the focal length f of the entire system satisfy Conditional Formula (8) below.

$$0<f/f5<2 \qquad (8)$$

Conditional Formula (8) defines the preferred range of numerical values for the ratio of the focal length f of the entire system with respect to the focal length f5 of the fifth lens L5. In the case that the value of f/f5 is less than the lower limit defined in Conditional Formula (8), it will become difficult to correct astigmatic aberrations. In the case that the value of f/f5 exceeds the upper limit defined in Conditional Formula (8), the refractive power of the fifth lens L5 will become excessively strong with respect to the refractive power of the entire system, and it will become difficult to shorten the total length of the lens system. For these reasons, astigmatic aberrations can be favorably corrected and the total length of the lens system can be shortened, by satisfying the range defined in Conditional Formula (8). It is preferable for Conditional Formula (8-1) below to be satisfied, and more preferable for Conditional Formula (8-2) to be satisfied, in order to cause this advantageous effect to become more prominent.

$$0.05<f/f5<0.2 \qquad (8\text{-}1)$$

$$0.05<f/f5<0.14 \qquad (8\text{-}2)$$

In addition, the focal length f of the entire system and the combined focal length f123 of the first through third lenses satisfy Conditional Formula (9) below.

$$0.5<f/f123<2 \qquad (9)$$

Conditional Formula (9) defines the preferred range of numerical values for the ratio of the focal length f of the entire system with respect to the combined focal length f123 of the first through third lenses. In the case that the value of f/f123 is less than the lower limit defined in Conditional Formula (9), the refractive power of the first lens L1 through the third lens L3 will become excessively weak with respect to the refractive power of the entire system, it will become difficult to correct astigmatic aberrations and also difficult to shorten the total length of the lens system. In the case that the value of f/f123 exceeds the upper limit defined in Conditional Formula (9), the refractive power of the first lens L1 through the third lens L3 will become excessively strong with respect to the refractive power of the entire system, and it will become difficult to correct spherical aberrations. For these reasons, the total length of the lens system can be shortened while favorably correcting astigmatic aberrations and spherical aberrations, by satisfying the range defined in Conditional Formula (9). It is preferable for Conditional Formula (9-1) below to be satisfied, and more preferable for Conditional Formula (9-2) to be satisfied, in order to cause this advantageous effect to become more prominent.

$$0.5<f/f123<1.43 \qquad (9\text{-}1)$$

$$0.66<f/f123<1.25 \qquad (9\text{-}2)$$

Next, the imaging lenses according to the second through thirteenth embodiments of the present invention will be described with reference to FIGS. 2 through 13. Note that each of the wide angle lenses according to the second through thirteenth embodiments of the present invention substantially consists of a first lens L1 having a positive refractive power, a second lens L2 having a negative refractive power, a third lens L3 having a positive refractive power and a convex surface toward the object side, a fourth lens L4 having a negative refractive power and a meniscus shape with a concave surface toward the object side, a fifth lens L5 having a positive refractive power and a meniscus shape with a convex surface toward the object side and at least one inflection point on the surface toward the image side, similarly to the lens of the first embodiment. For this reason, only the detailed structures of the lenses that constitute each lens group of the second through thirteenth embodiments will be described. In addition, the operational effects of structures which are common to the first through thirteenth embodiments are the same. Therefore, the structures and the operational effects thereof will be described for lower numbered embodiments, and redundant descriptions of the common structures and the operational effects thereof will be omitted for the other embodiments.

Figure 2:
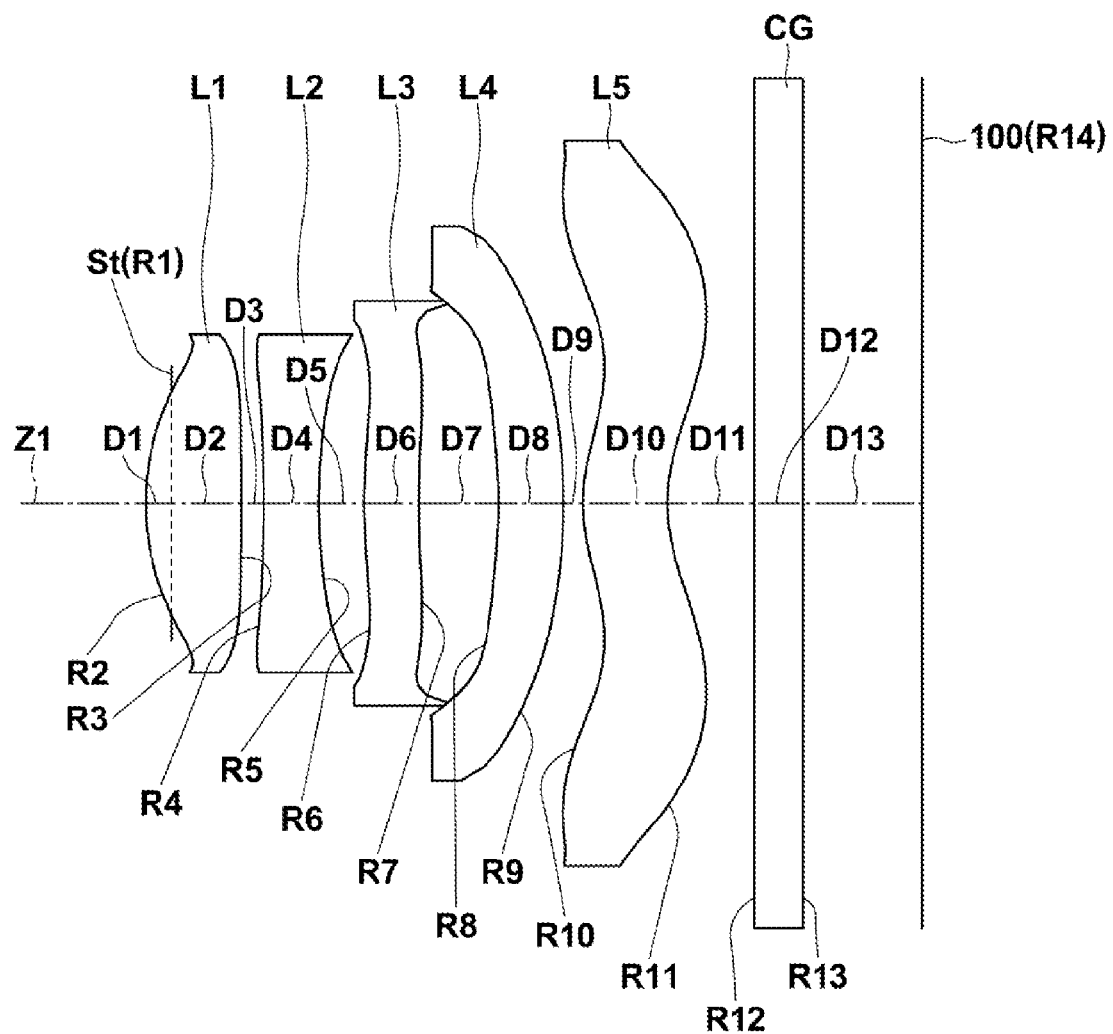
FIG. 2 is a sectional diagram that illustrates a second example of the configuration of an imaging lens according to an embodiment of the present invention, and corresponds to a lens of Example 2.

The imaging lens according to the second embodiment illustrated in FIG. 2 has the configurations of the first lens L1 through the fifth lens L5 in common with the first embodiment. The same operational effects corresponding to each of the lens structures as those obtained by the first embodiment are obtained by the imaging lens of the second embodiment.

Figure 3:
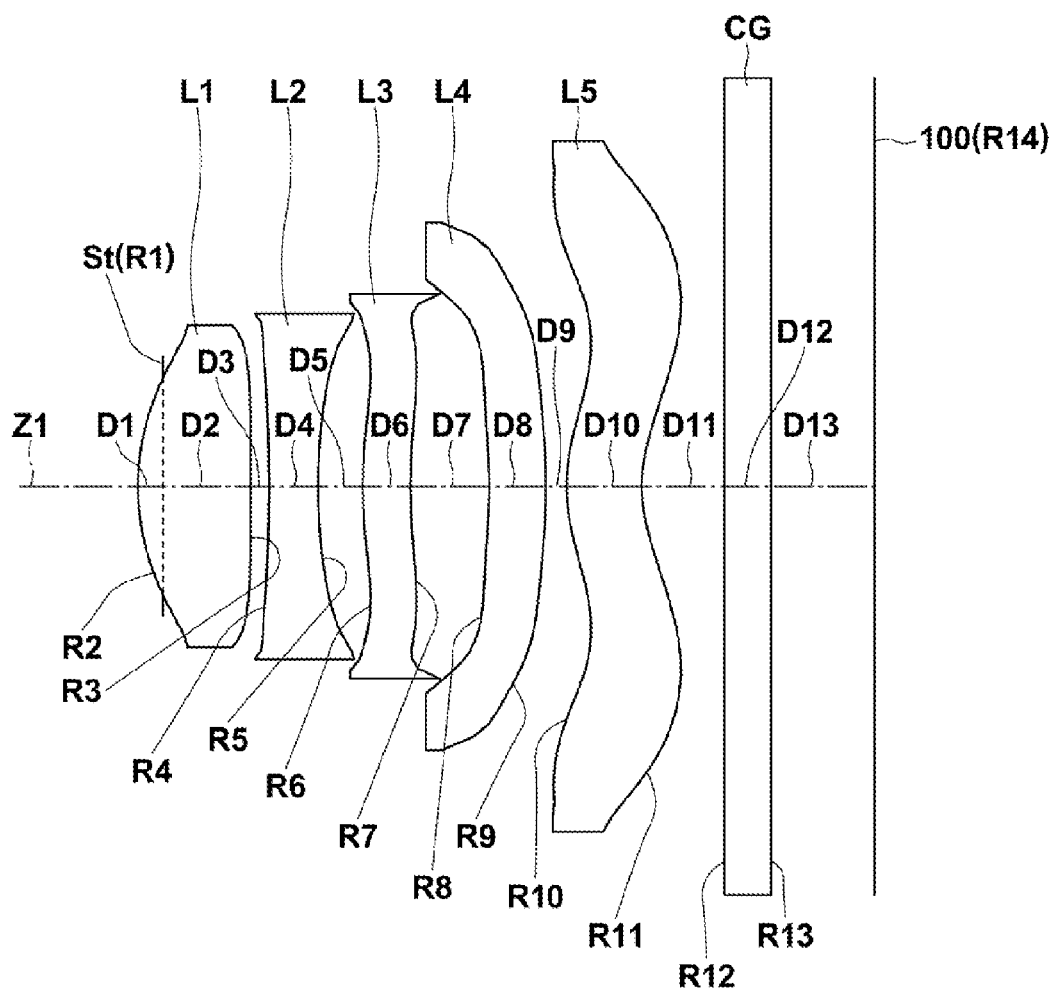
FIG. 3 is a sectional diagram that illustrates a third example of the configuration of an imaging lens according to an embodiment of the present invention, and corresponds to a lens of Example 3.

In addition, the first lens L1 may be configured to be of a meniscus shape with a convex surface toward the object side in the vicinity of the optical axis as in the third embodiment illustrated in FIG. 3. It is more advantageous from the viewpoint of shortening the total length of the lens system in the case that the first lens L1 is of a meniscus shape with a convex surface toward the object side. In addition, the imaging lens according to the third embodiment has the configurations of the second lens L2 through the fifth lens L5 in common with the first embodiment. The same operational effects corresponding to each of the lens structures as those obtained by the first embodiment are obtained by the imaging lens of the third embodiment.

Figure 4:
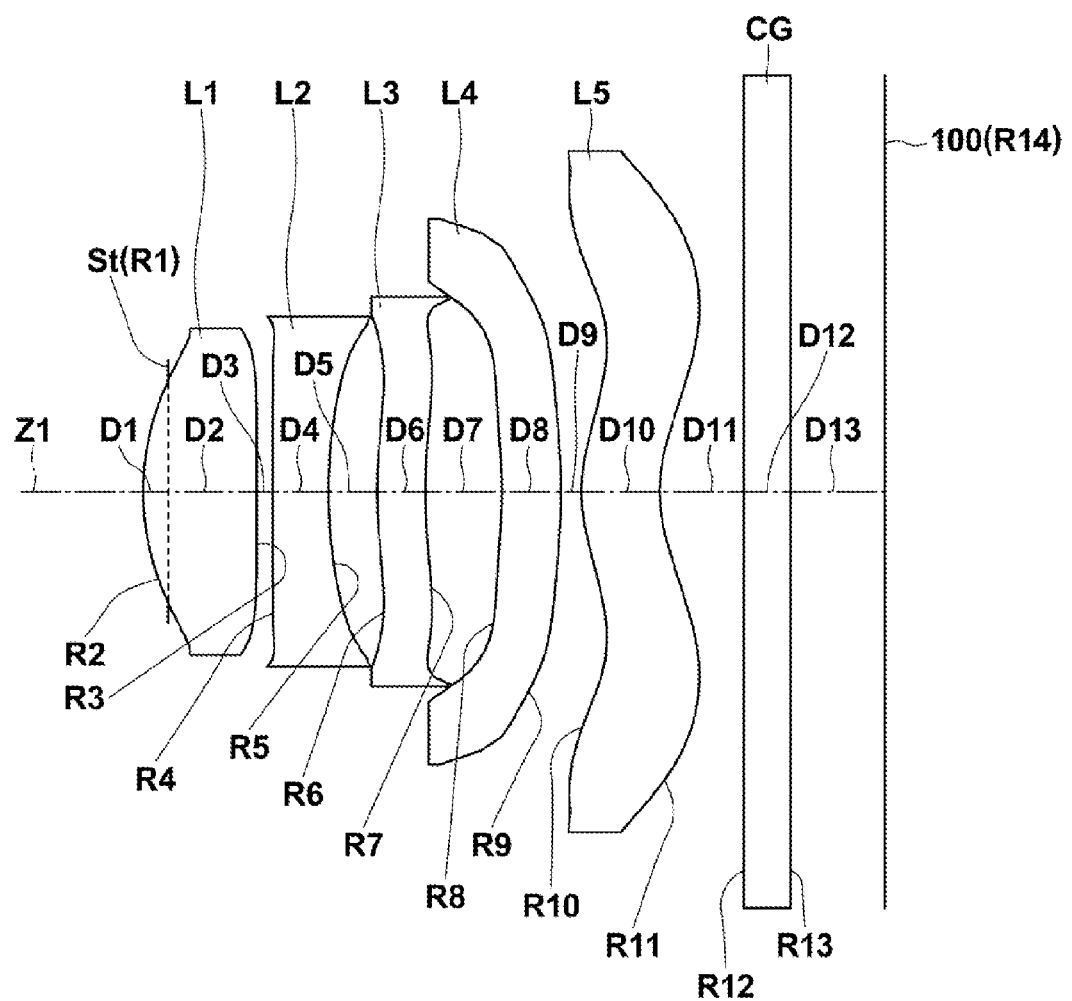
FIG. 4 is a sectional diagram that illustrates a fourth example of the configuration of an imaging lens according to an embodiment of the present invention, and corresponds to a lens of Example 4.

In addition, the second lens L2 may be configured to be of a meniscus shape with a convex surface toward the object side in the vicinity of the optical axis as in the fourth embodiment illustrated in FIG. 4. It is more advantageous from the viewpoint of shortening the total length of the lens system in the case that the second lens L2 is of a meniscus shape with a convex surface toward the object side. In addition, the imaging lens according to the fourth embodiment has the configurations of the first lens L1, the third lens L3, the fourth lens L4, and the fifth lens L5 in common with the third embodiment. The same operational effects corresponding to each of the lens structures as those obtained by the third embodiment are obtained by the imaging lens of the fourth embodiment.

Figure 5:
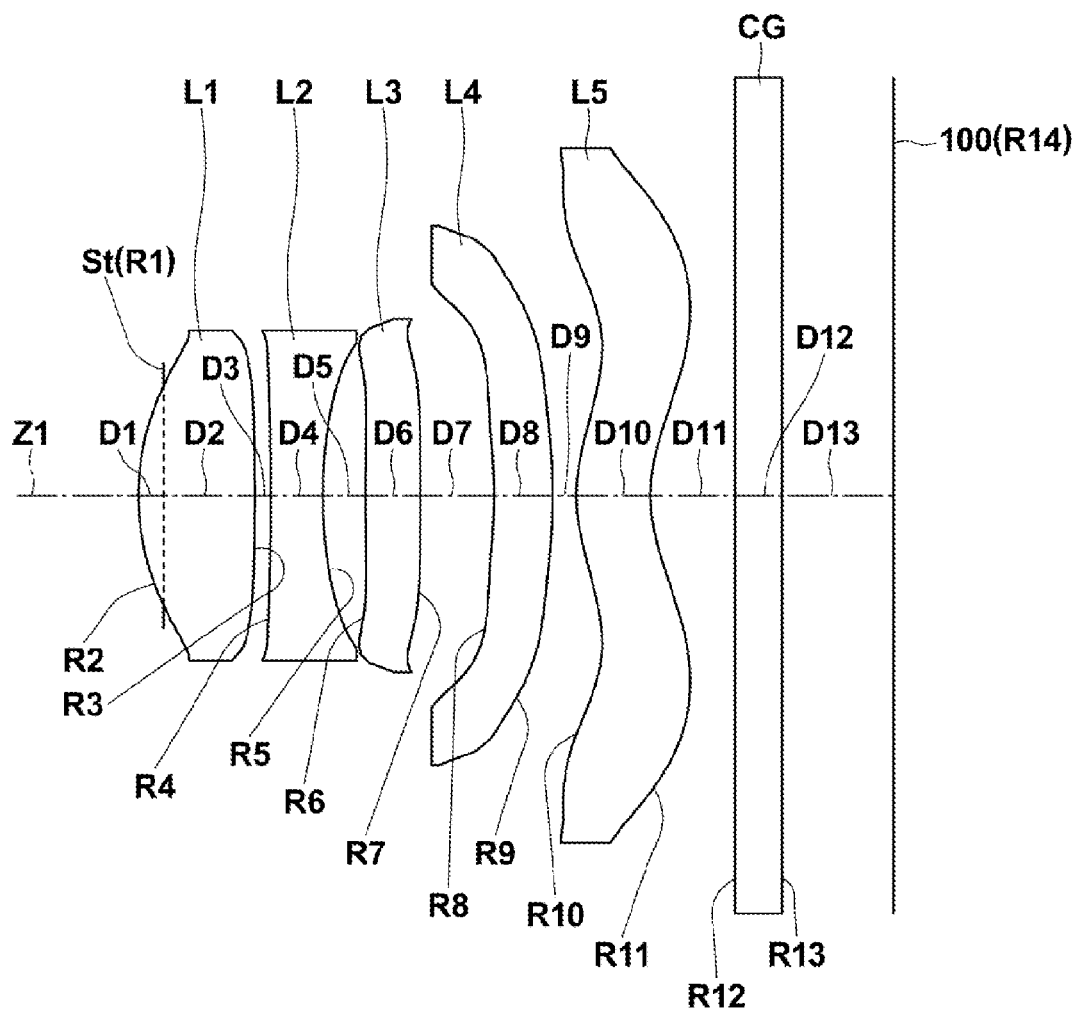
FIG. 5 is a sectional diagram that illustrates a fifth example of the configuration of an imaging lens according to an embodiment of the present invention, and corresponds to a lens of Example 5.

In addition, the third lens L3 may be configured to be of a biconvex shape in the vicinity of the optical axis as in the fifth embodiment illustrated in FIG. 5. Astigmatic aberrations can be favorably corrected, particularly at low angles of view, in the case that the third lens L3 is configured to be of a biconvex in the vicinity of the optical axis. In addition, the imaging lens according to the fifth embodiment has the configurations of the first lens L1, the second lens L2, the fourth lens L4, and the fifth lens L5 in common with the first embodiment. The same operational effects corresponding to each of the lens structures as those obtained by the first embodiment are obtained by the imaging lens of the fifth embodiment.

Figure 6:
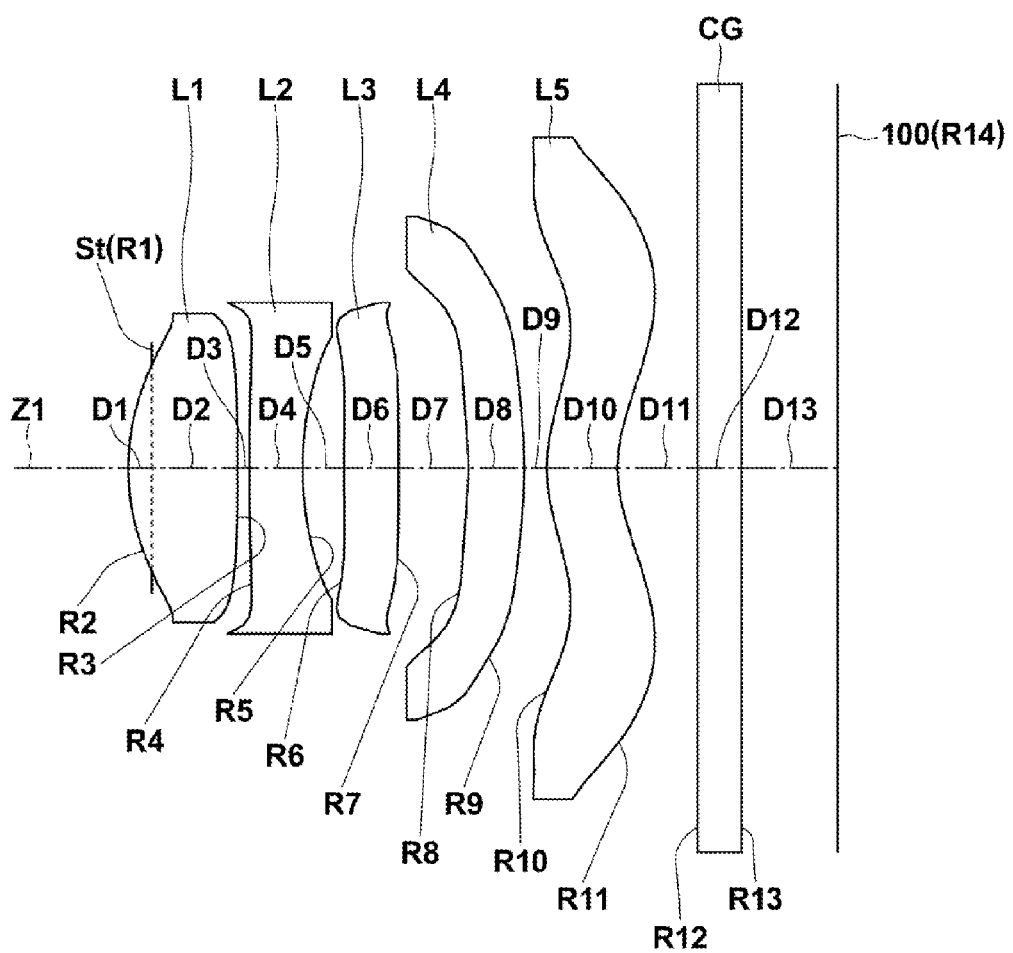
FIG. 6 is a sectional diagram that illustrates a sixth example of the configuration of an imaging lens according to an embodiment of the present invention, and corresponds to a lens of Example 6.

In addition, an imaging lens L may be configured such that the configurations of the first lens L1, the fourth lens L4, and the fifth lens L5 are the same as those of the first embodiment, the configuration of the second lens L2 is the same as that of the fourth embodiment, and the configuration of the third lens L3 is the same as that of the fifth embodiment, as in the sixth embodiment illustrated in FIG. 6. The same operational effects corresponding to the configurations the first through fifth lenses of the sixth embodiment as those obtained by the first, fourth, and fifth embodiments are obtained by the imaging lens of the sixth embodiment.

Figure 7:
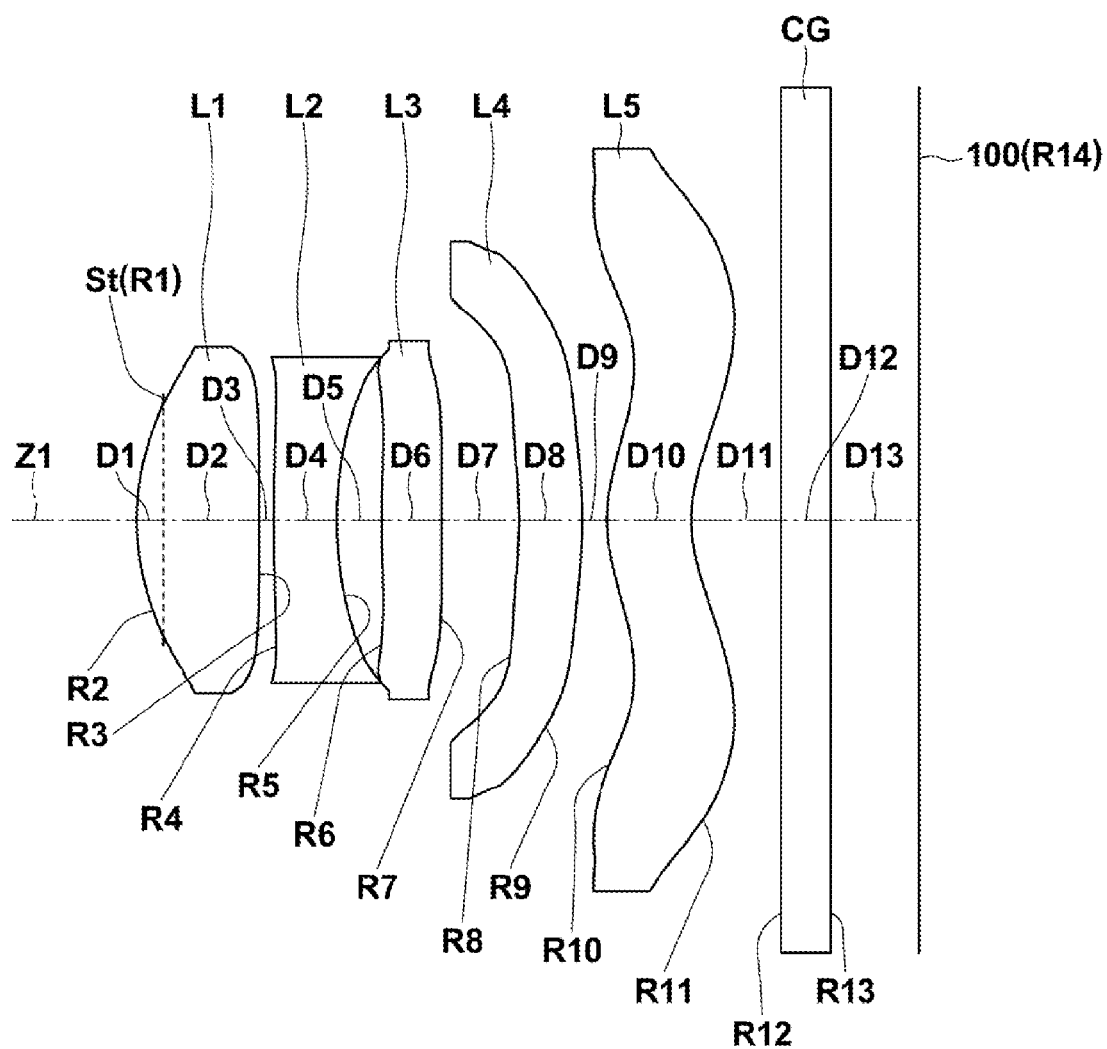
FIG. 7 is a sectional diagram that illustrates a seventh example of the configuration of an imaging lens according to an embodiment of the present invention, and corresponds to a lens of Example 7.

In addition, an imaging lens L may be configured such that the configurations of the first lens L1, the second lens L2, the fourth lens L4, and the fifth lens L5 are the same as those of the sixth embodiment, and the configuration of the third lens L3 is the same as that of the fourth embodiment, as in the seventh embodiment illustrated in FIG. 7. The same operational effects corresponding to the configurations the first through fifth lenses of the seventh embodiment as those obtained by the fourth and sixth embodiments are obtained by the imaging lens of the seventh embodiment.

Figure 8:
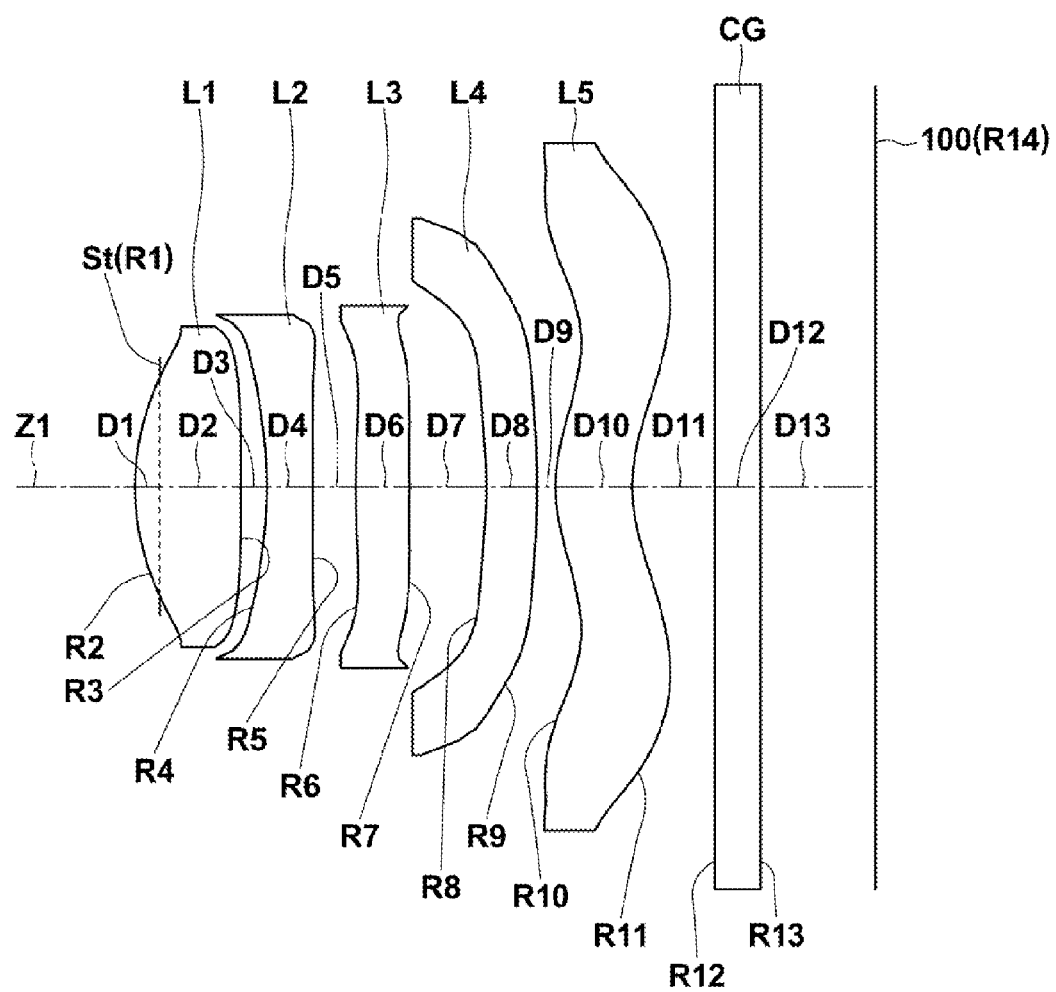
FIG. 8 is a sectional diagram that illustrates an eighth example of the configuration of an imaging lens according to an embodiment of the present invention, and corresponds to a lens of Example 8.

In addition, the second lens L2 may be configured to be of a meniscus shape having a concave surface toward the object side in the vicinity of the optical axis as in the eighth embodiment illustrated in FIG. 8. Spherical aberrations can be favorably corrected in the case that the second lens L2 is configured to be of a meniscus shape having a concave surface toward the object side in the vicinity of the optical axis. In addition, the imaging lens according to the eighth embodiment has the configurations of the first lens L1, and the third lens L3, the fourth lens L4, and the fifth lens L5 in common with the sixth embodiment. The same operational effects corresponding to each of the lens structures as those obtained by the sixth embodiment are obtained by the imaging lens of the eighth embodiment.

Figure 9:
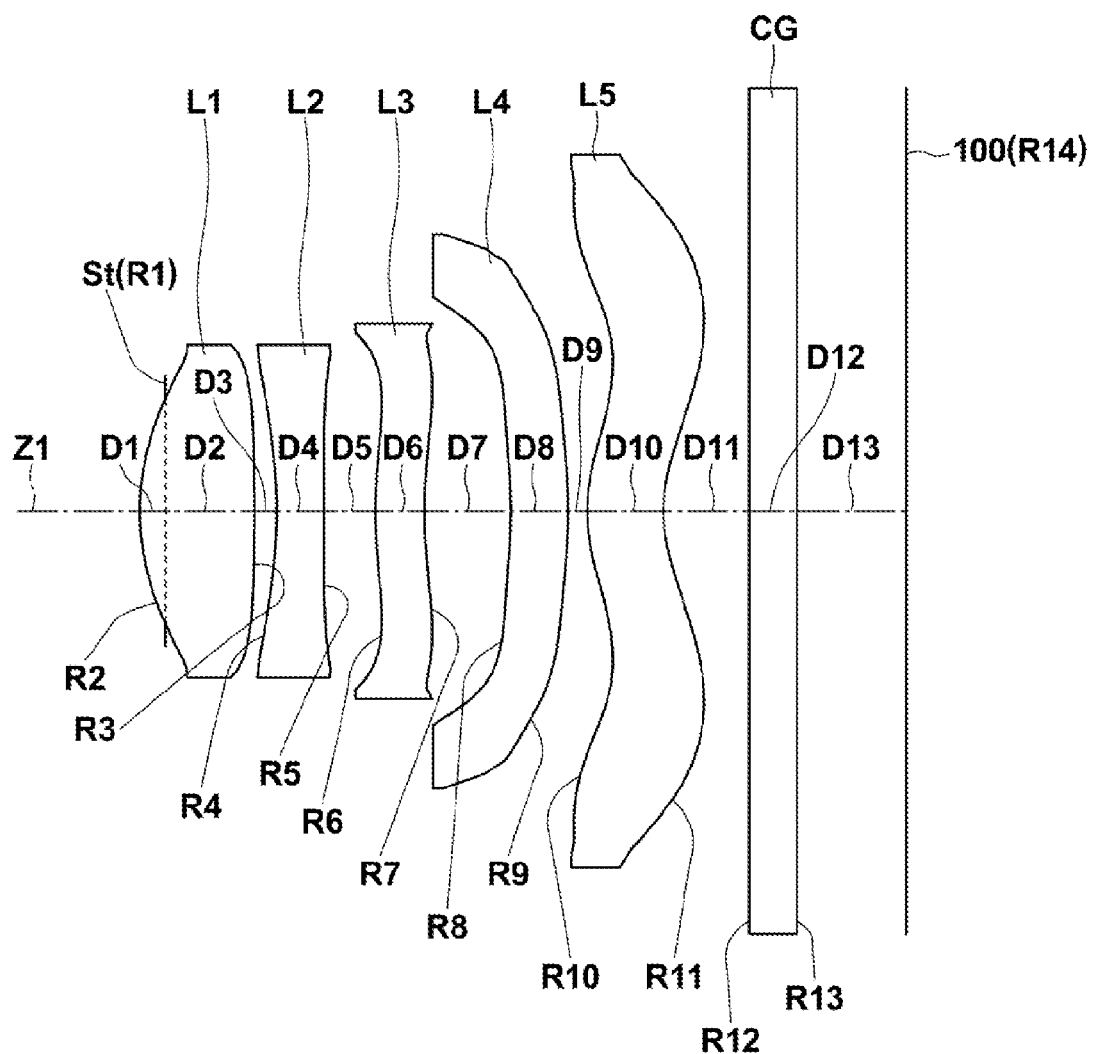
FIG. 9 is a sectional diagram that illustrates a ninth example of the configuration of an imaging lens according to an embodiment of the present invention, and corresponds to a lens of Example 9.

In addition, an imaging lens L may be configured such that the configuration of the third lens L3 is the same as those of the first embodiment, and the configurations of the first lens L1, the second lens L2, the fourth lens L4, and the fifth lens L5 are the same as those of the eighth embodiment, as in the ninth embodiment illustrated in FIG. 9. The same operational effects corresponding to the configurations the lenses of the first and eighth embodiments are obtained by the imaging lens of the ninth embodiment.

Figure 10:
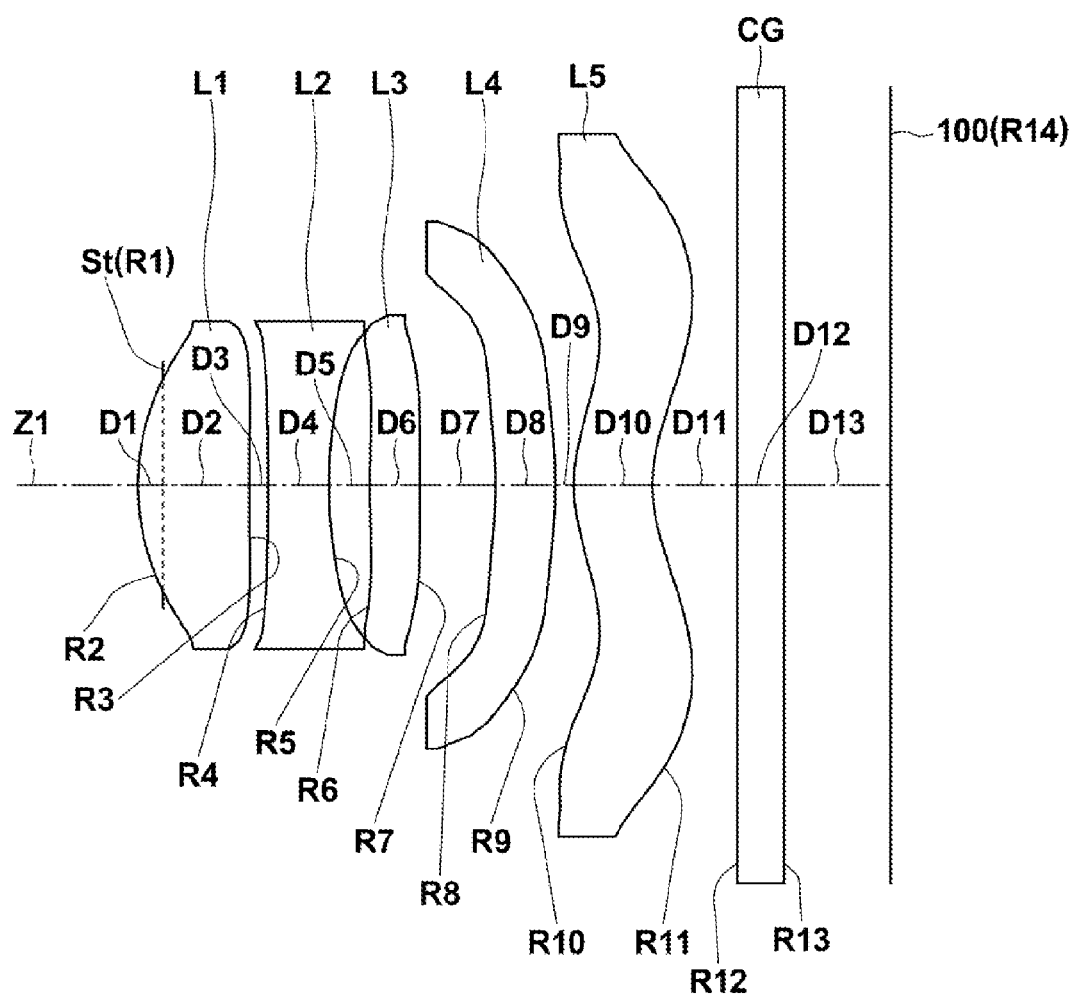
FIG. 10 is a sectional diagram that illustrates a tenth example of the configuration of an imaging lens according to an embodiment of the present invention, and corresponds to a lens of Example 10.

In addition, an imaging lens L may be configured such that the configurations of the first lens L1, the second lens L2, the fourth lens L4, and the fifth lens L5 are the same as those of the third embodiment, and the configuration of the third lens L3 is the same as those of the fifth embodiment, as in the tenth embodiment illustrated in FIG. 10. The same operational effects corresponding to the configurations the first through fifth lenses of the tenth embodiment as those obtained by the third and fifth embodiments are obtained by the imaging lens of the tenth embodiment.

Figure 11:
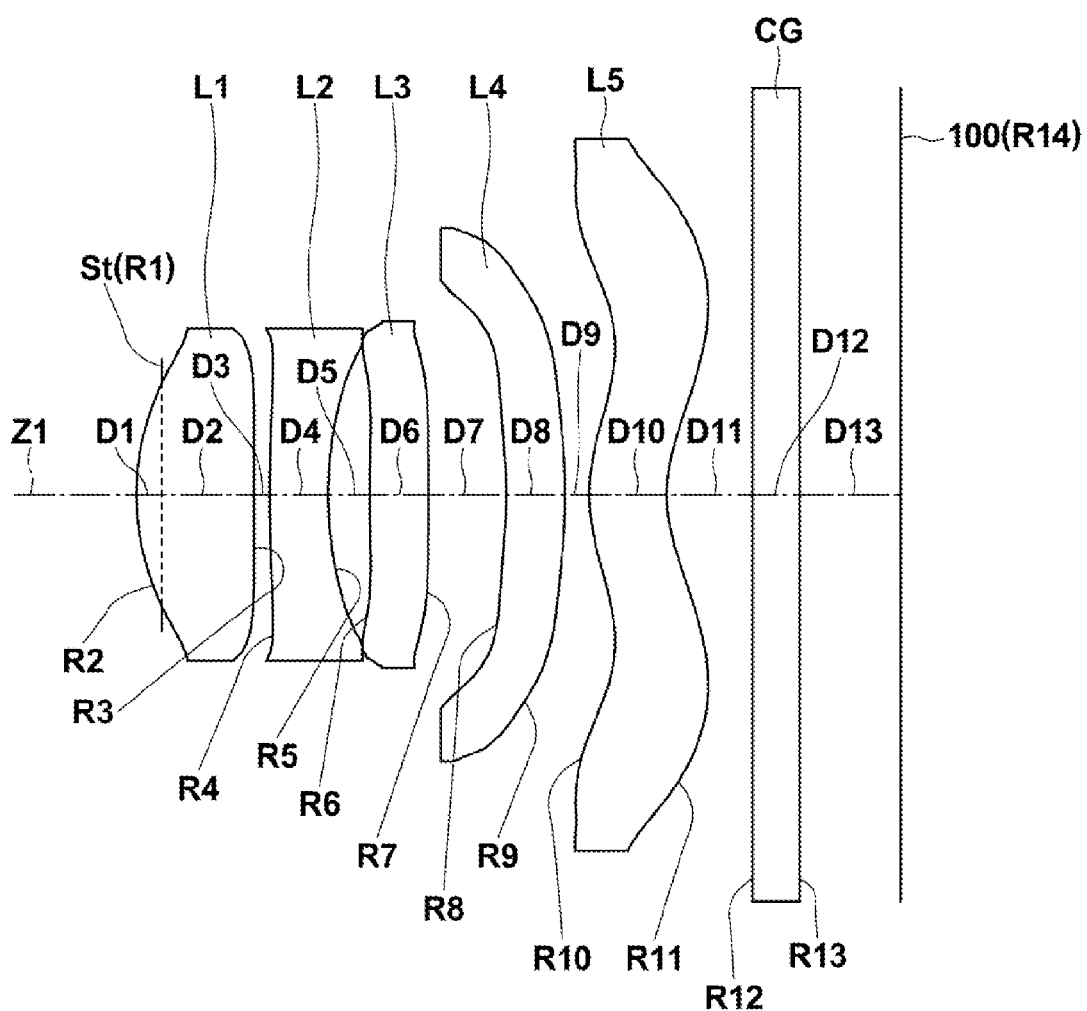
FIG. 11 is a sectional diagram that illustrates an eleventh example of the configuration of an imaging lens according to an embodiment of the present invention, and corresponds to a lens of Example 11.

In addition, an imaging lens L may be configured such that the configuration of the first lens L1 is the same as that of the third embodiment, and the configurations of the second lens L2 through the fifth lens L5 are the same as those of the sixth embodiment, as in the eleventh embodiment illustrated in FIG. 11. The same operational effects corresponding to the configurations the first through fifth lenses of the eleventh embodiment as those obtained by the third and sixth embodiments are obtained by the imaging lens of the eleventh embodiment.

Figure 12:
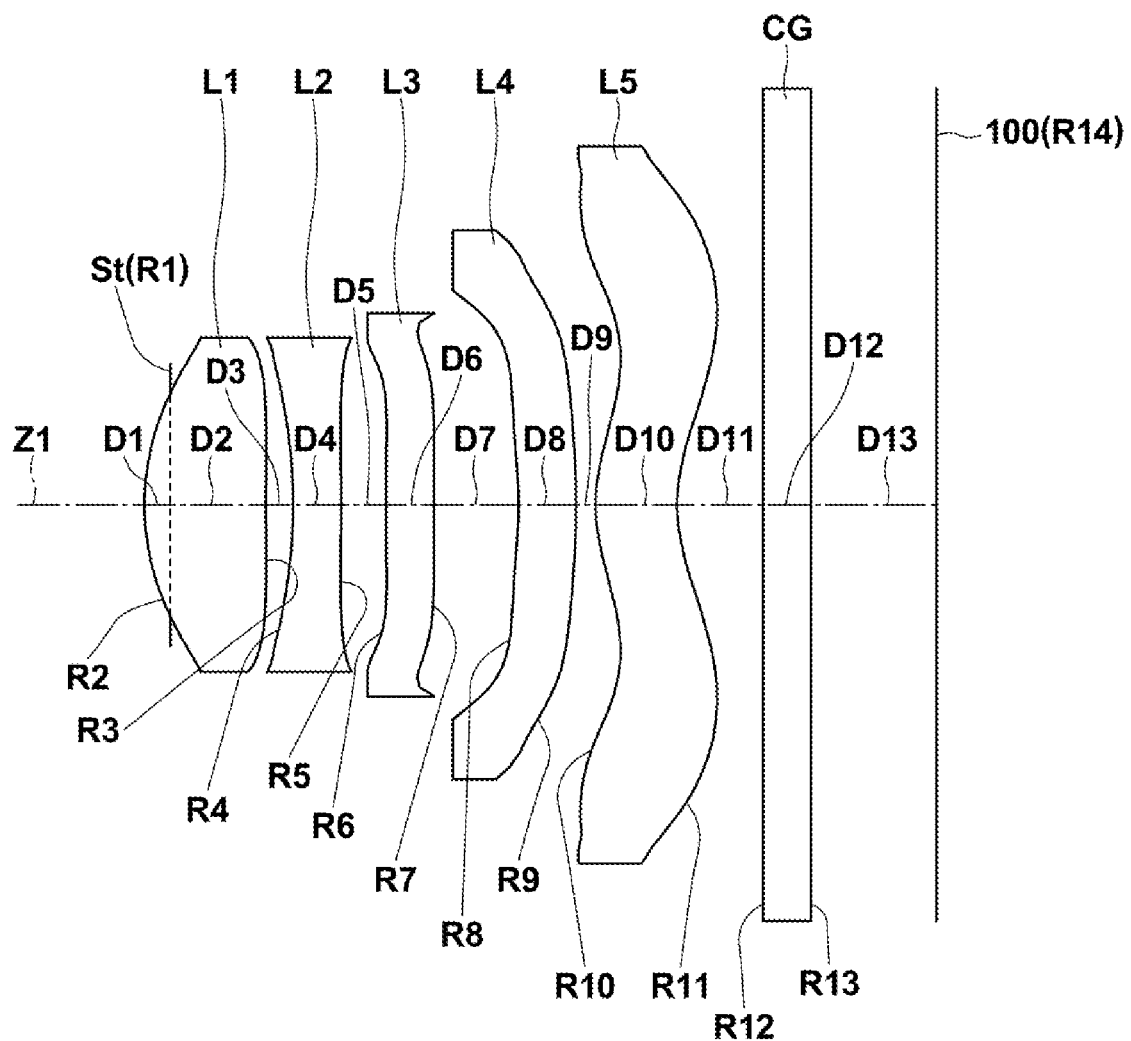
FIG. 12 is a sectional diagram that illustrates a twelfth example of the configuration of an imaging lens according to an embodiment of the present invention, and corresponds to a lens of Example 12.

In addition, an imaging lens L may be configured such that the configuration of the first lens L1 is the same as that of the third embodiment, and the configurations of the second lens L2 through the fifth lens L5 are the same as those of the eighth embodiment, as in the twelfth embodiment illustrated in FIG. 12. The same operational effects corresponding to the configurations the first through fifth lenses of the twelfth embodiment as those obtained by the third and eighth embodiments are obtained by the imaging lens of the twelfth embodiment.

Figure 13:
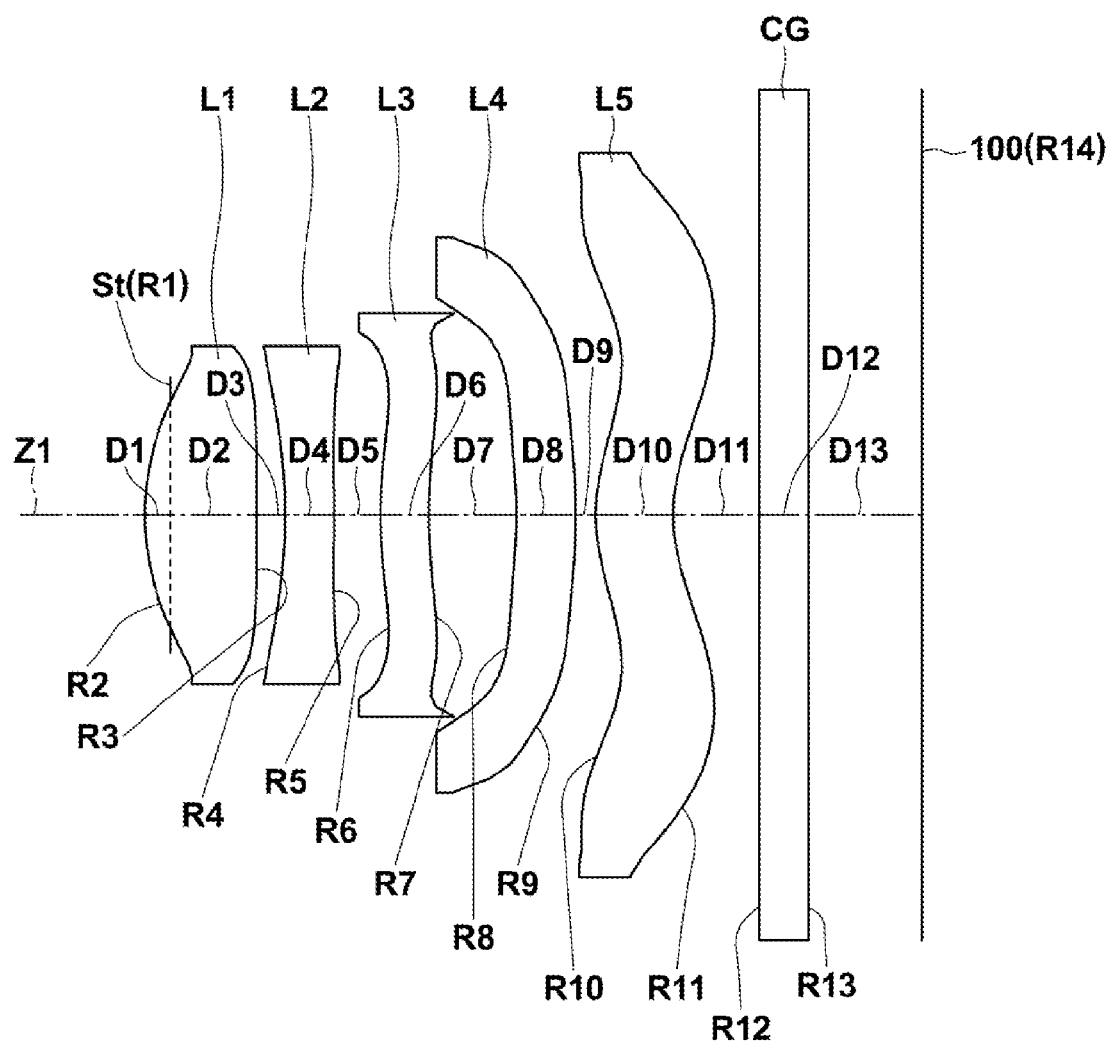
FIG. 13 is a sectional diagram that illustrates a thirteenth example of the configuration of an imaging lens according to an embodiment of the present invention, and corresponds to a lens of Example 13.
Figure 14:
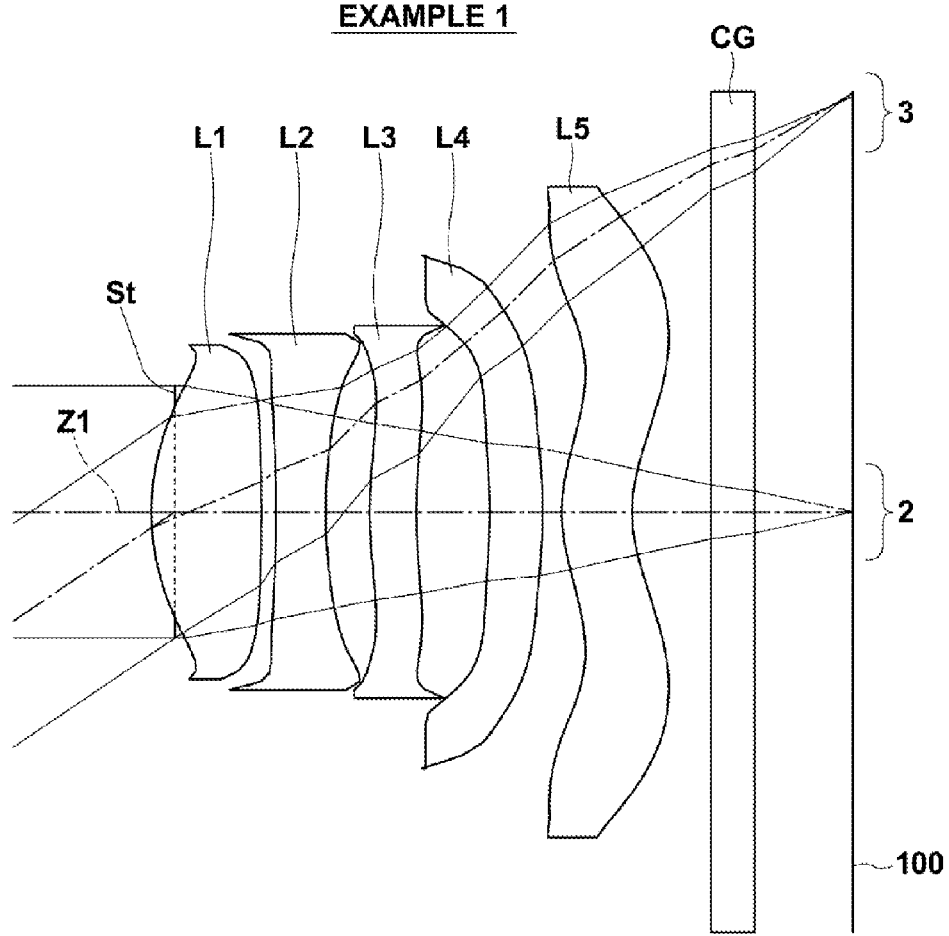
FIG. 14 is a ray diagram of the imaging lens illustrated in FIG. 1.

In addition, an imaging lens L may be configured such that the configuration of the third lens L3 is the same as that of the first embodiment, and the configurations of the first lens L1, the second lens L2, the fourth lens L4, and the fifth lens L5 are the same as those of the twelfth embodiment, as in the thirteenth embodiment illustrated in FIG. 13. The same operational effects corresponding to the configurations the first through fifth lenses of the thirteenth embodiment as those obtained by the fifth and twelfth embodiments are obtained by the imaging lens of the thirteenth embodiment.

As described above, the imaging lenses L according to the embodiments of the present invention, the configuration of each lens element in a five lens configuration is optimized, and particularly, the shapes of the third lens and the fifth lens, are favorably configured. Therefore, a lens system having a short total length, a large image size, and high resolution can be realized.

Further improved imaging performance can be realized by satisfying preferred conditions appropriately. In addition, the imaging apparatuses according to the embodiments of the present invention output image signals corresponding to optical images formed by the high performance imaging lenses L according to the embodiments of the present invention. Therefore, images having high resolution from a central angle of view to peripheral angles of view can be obtained.

Next, specific examples of numerical values of the imaging lens of the present invention will be described. A plurality of examples of numerical values will be summarized and explained below.

Table 1 and Table 14 below show specific lens data corresponding to the configuration of the imaging lens illustrated in FIG. 1. Table 1 shows basic lens data of the imaging lens, and Table 14 shows data related to aspherical surfaces. In the lens data of Table 1, ith (i=1, 2, 3, . . . ) lens surface numbers that sequentially increase from the object side to the image side, with the lens surface at the most object side designated as first (the aperture stop St being number 1), are shown in the column Si. The radii of curvature (mm) of ith surfaces corresponding to the symbols Ri illustrated in FIG. 1 are shown in the column Ri. The distances between an ith surface and an i+1st surface along the optical axis Z are shown in the column Di. The refractive indices of jth (j=1, 2, 3, . . . ) optical elements from the object side to the image side with respect to the d line (wavelength: 587.6 nm) are shown in the column Ndj. The Abbe's numbers of the jth optical element with respect to the d line are shown in the column vdj. Note that the values of the focal length f (mm) of the entire system and back focus Bf (mm) are shown as data for each lens datum. Note that the back focus Bf is represented as values converted to spatial distances.

In the imaging lens of Example 1, both of the surfaces of the first lens L1 through the fifth lens L5 are all aspherical in shape. In the basic lens data of Table 1, numerical values of radii of curvature in the vicinity of the optical axis (paraxial radii of curvature) are shown as the radii of curvature of the aspherical surfaces.

Table 14 shows aspherical surface data of the imaging lens of Example 1. In the numerical values shown as the aspherical surface data, the symbol "E" indicates that the numerical value following thereafter is a "power index" having 10 as a base, and that the numerical value represented by the index function having 10 as a base is to be multiplied by the numerical value in front of "E". For example, "1.0E-02" indicates that the numerical value is "$1.0 \cdot 10^{-2}$".

The values of coefficients Ai and K represented by the aspherical surface shape formula (A) below are shown as the aspherical surface data. In greater detail, Z is the length (mm) of a normal line that extends from a point on the aspherical surface having a height h to a plane (a plane perpendicular to the optical axis) that contacts the peak of the aspherical surface.

$$Z = C \cdot h^2 / \{1 + (1 - K \cdot C^2 \cdot h^2)^{1/2}\} + \Sigma A_i \cdot h^i$$

wherein: Z is the depth of the aspherical surface (mm), h is the distance from the optical axis to the surface of the lens (height) (mm), C is the paraxial curvature=1/R (R is the paraxial radius of curvature), Ai is an ith ordinal aspherical surface coefficient (i is an integer 3 or greater), and K is an aspherical surface coefficient.

Specific lens data corresponding to the configuration of the imaging lens illustrated in FIG. 2 are shown in Table 2 and Table 15 as Example 2 in the same manner as that for the imaging lens of Example 1. Similarly, specific lens data corresponding to the configurations of the imaging lenses illustrated in FIGS. 3 through 13 are shown in Tables 3 through 13 and Tables 16 through 26 as Example 3 through Example 13. In the imaging lenses of Examples 1 through 13, both of the surfaces of the first lens L1 through the fifth lens L5 are all aspherical surfaces.

Figure 15:
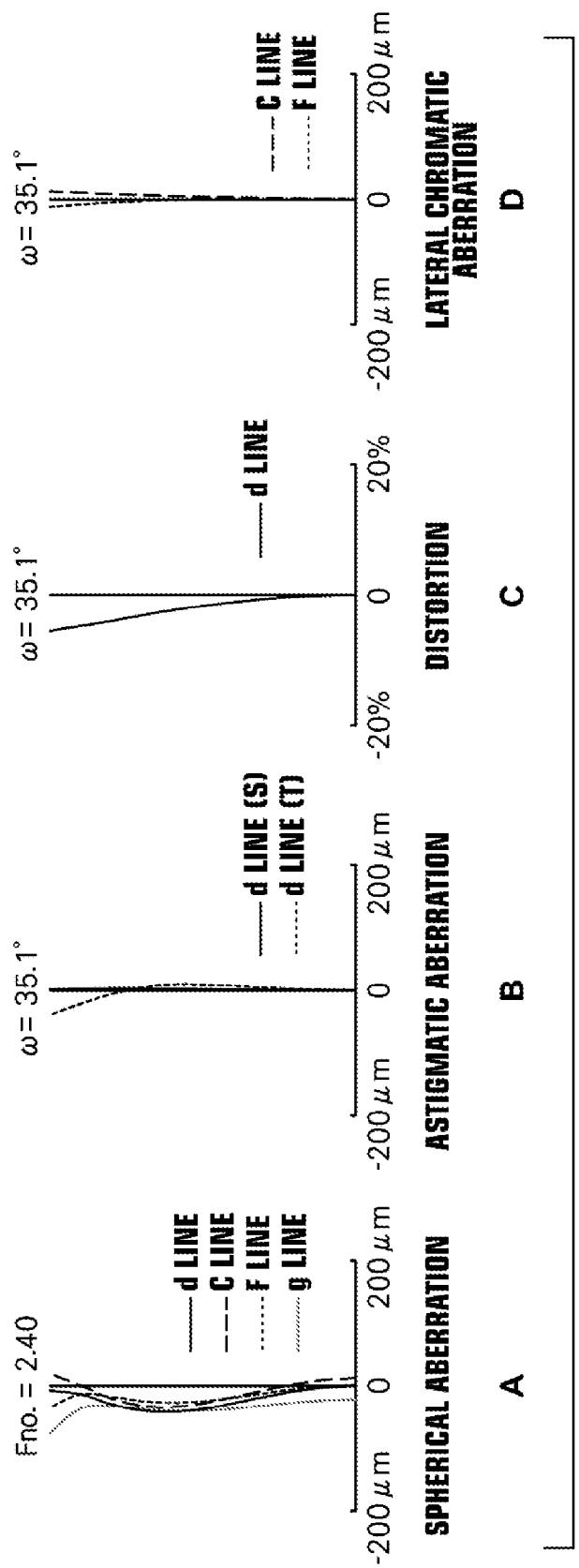
FIG. 15 is a collection of diagrams that illustrate aberrations of the imaging lens of Example 1, wherein A illustrates spherical aberration, B illustrates astigmatic aberration (field curvature), C illustrates distortion, and D illustrates lateral chromatic aberration.

A through D of FIG. 15 are diagrams that illustrate the spherical aberration, the astigmatic aberration, the distortion, and the lateral chromatic aberration of the imaging lens of Example 1, respectively. Each of the diagrams that illustrate the spherical aberration, the astigmatic aberration (field curvature), and the distortion illustrate aberrations using the d line (wavelength: 587.6 nm) as a standard wavelength. The diagrams that illustrate spherical aberration and lateral chromatic aberration, also show aberrations related to the F line (wavelengths: 486.1 nm) and the C line (wavelength: 656.27 nm). In addition, the diagram that illustrates spherical aberration also show aberrations related to the g line (wavelength: 435.83 nm). In the diagrams that illustrate astigmatic aberrations, aberrations in the sagittal direction (S) are indicated by solid lines, while aberrations in the tangential direction (T) are indicated by broken lines. In addition, "Fno." denotes F values, and "ω" denotes half angles of view.

Figure 16:
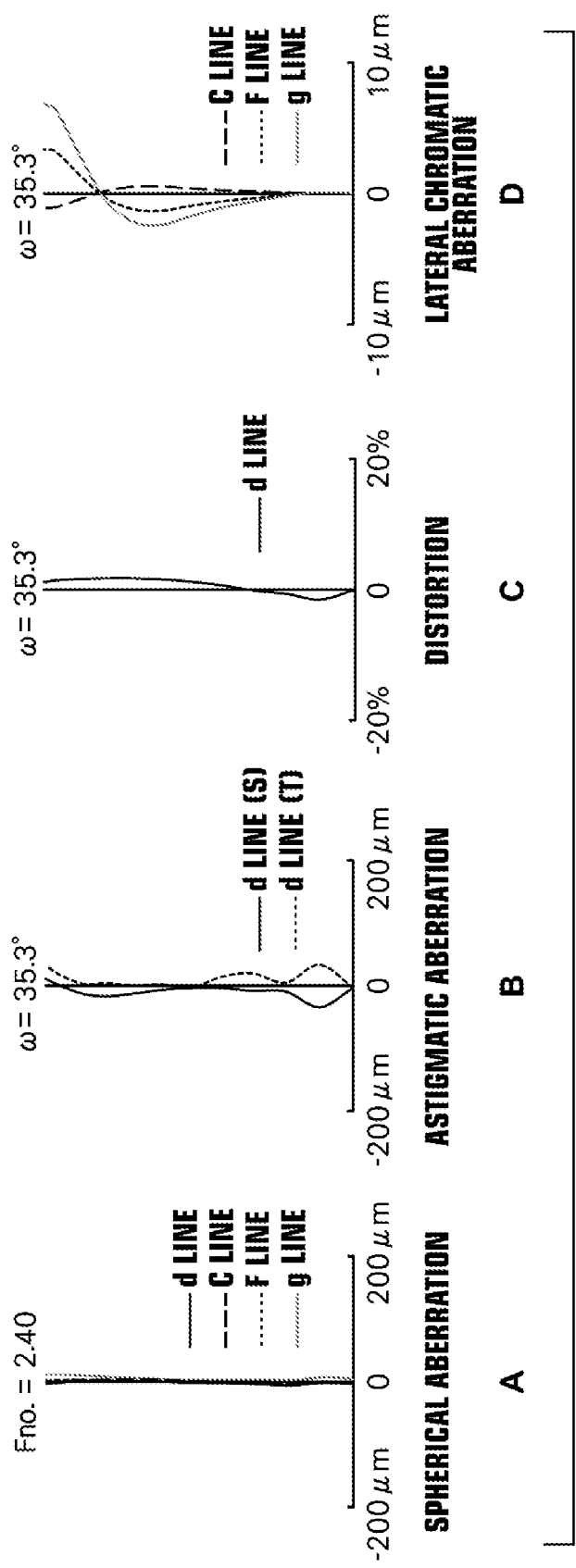
FIG. 16 is a collection of diagrams that illustrate aberrations of the imaging lens of Example 2, wherein A illustrates spherical aberration, B illustrates astigmatic aberration (field curvature), C illustrates distortion, and D illustrates lateral chromatic aberration.
Figure 17:
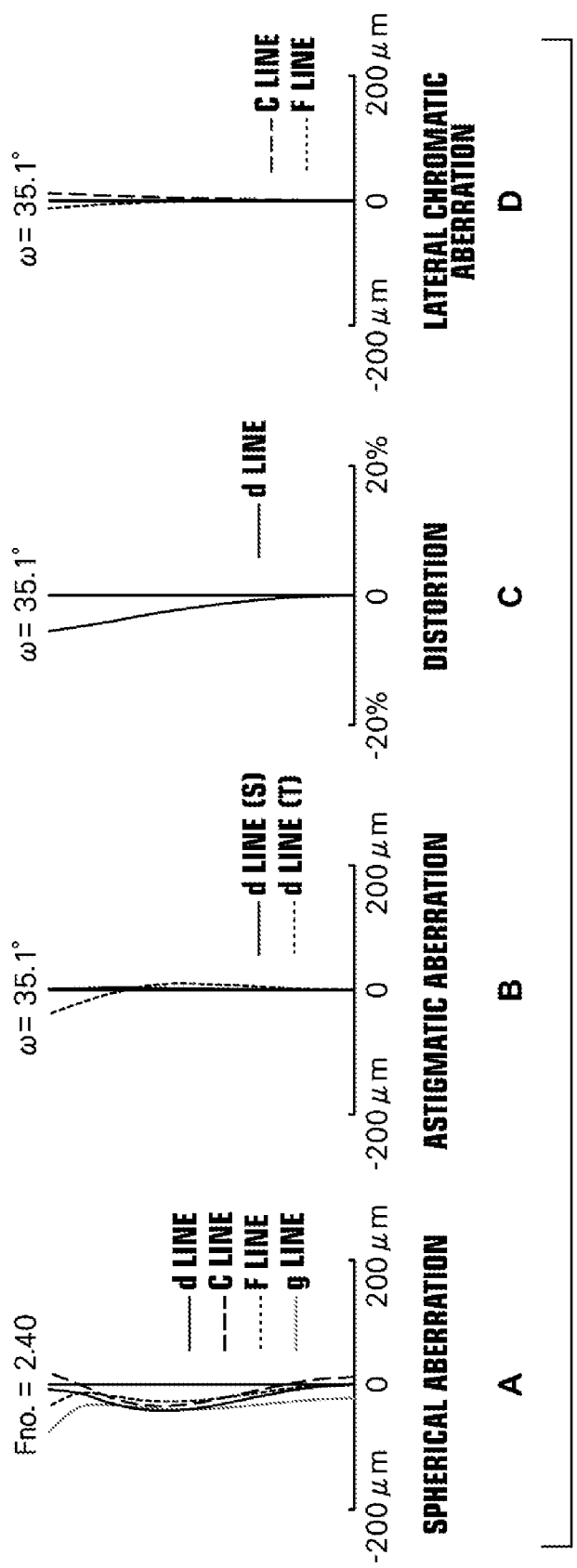
FIG. 17 is a collection of diagrams that illustrate aberrations of the imaging lens of Example 3, wherein A illustrates spherical aberration, B illustrates astigmatic aberration (field curvature), C illustrates distortion, and D illustrates lateral chromatic aberration.
Figure 18:
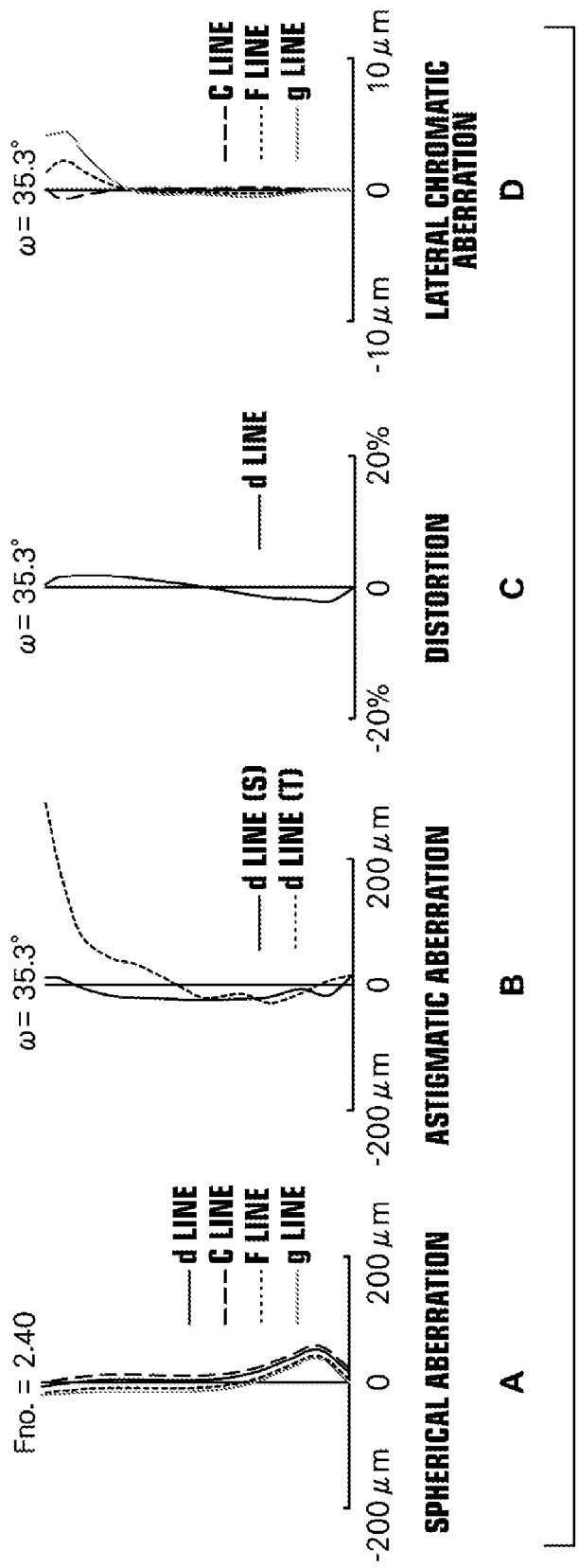
FIG. 18 is a collection of diagrams that illustrate aberrations of the imaging lens of Example 4, wherein A illustrates spherical aberration, B illustrates astigmatic aberration (field curvature), C illustrates distortion, and D illustrates lateral chromatic aberration.
Figure 19:
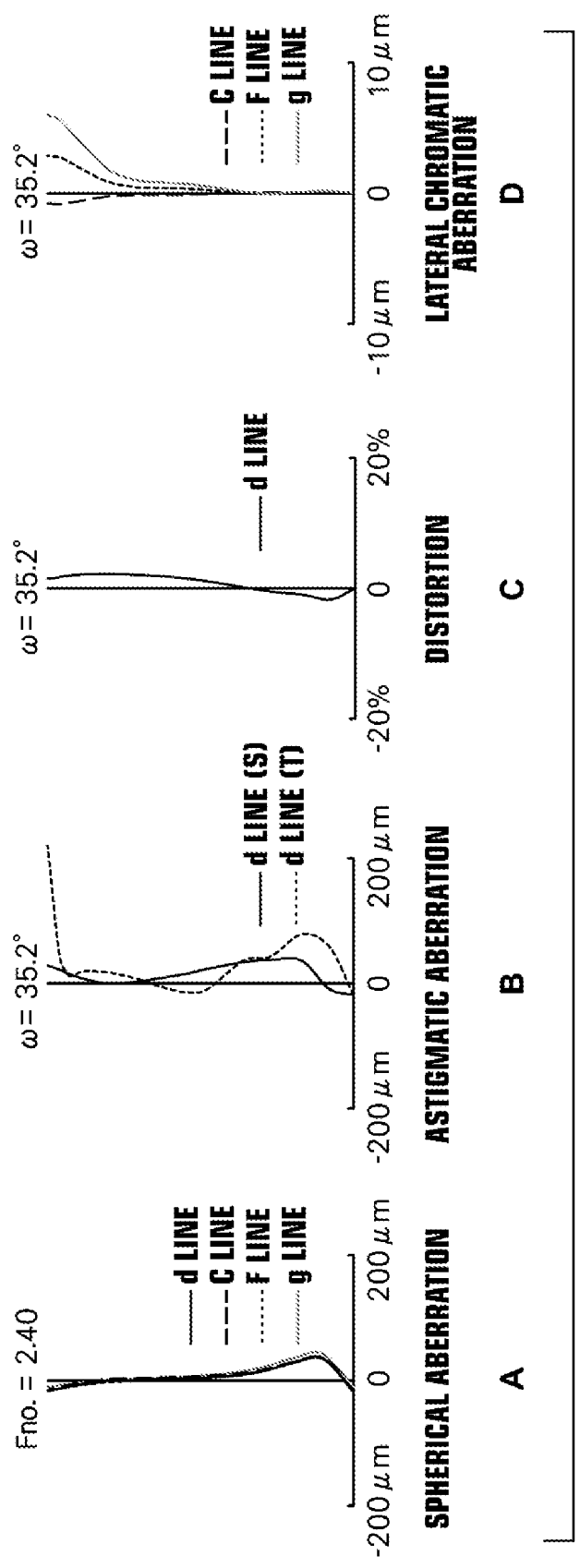
FIG. 19 is a collection of diagrams that illustrate aberrations of the imaging lens of Example 5, wherein A illustrates spherical aberration, B illustrates astigmatic aberration (field curvature), C illustrates distortion, and D illustrates lateral chromatic aberration.
Figure 20:
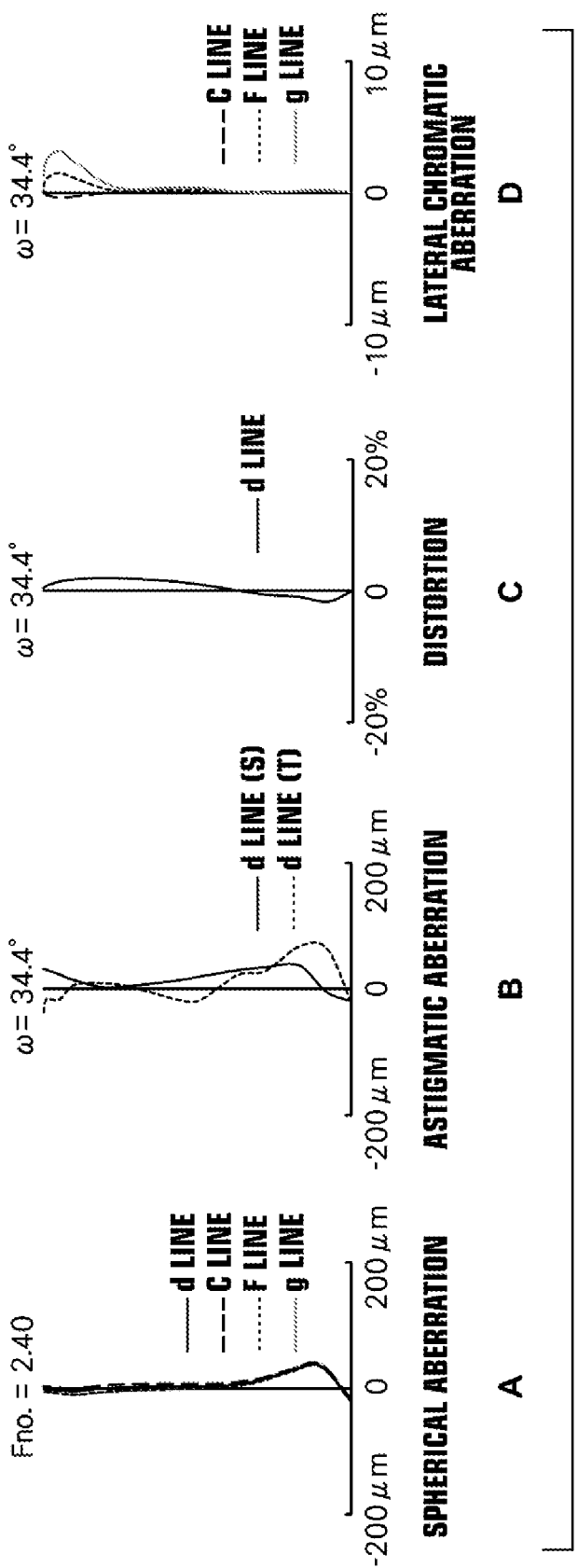
FIG. 20 is a collection of diagrams that illustrate aberrations of the imaging lens of Example 6, wherein A illustrates spherical aberration, B illustrates astigmatic aberration (field curvature), C illustrates distortion, and D illustrates lateral chromatic aberration.
Figure 21:
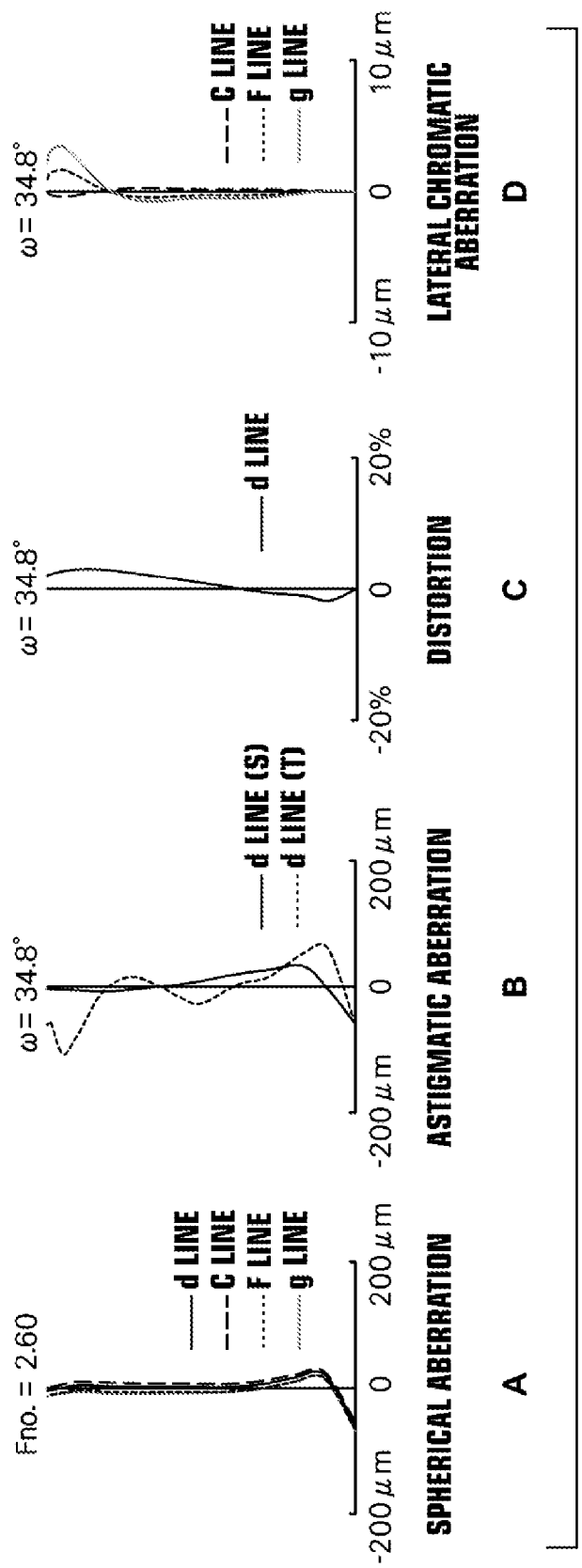
FIG. 21 is a collection of diagrams that illustrate aberrations of the imaging lens of Example 7, wherein A illustrates spherical aberration, B illustrates astigmatic aberration (field curvature), C illustrates distortion, and D illustrates lateral chromatic aberration.
Figure 22:
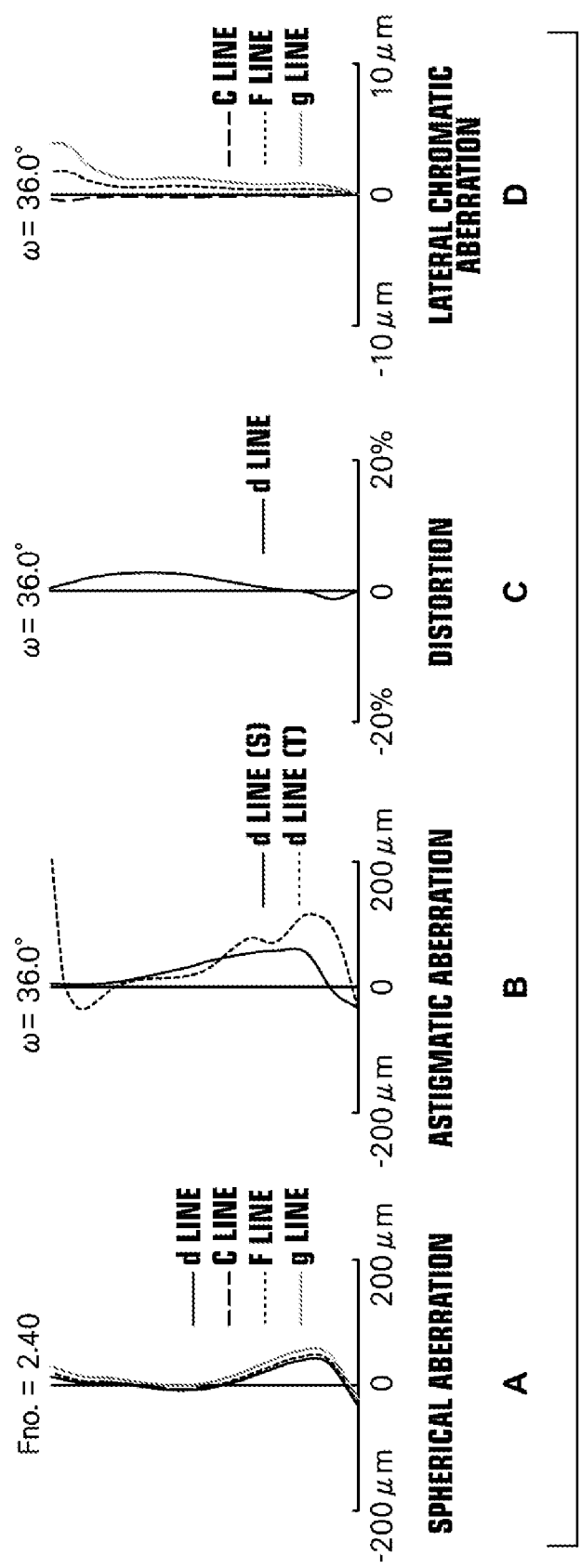
FIG. 22 is a collection of diagrams that illustrate aberrations of the imaging lens of Example 8, wherein A illustrates spherical aberration, B illustrates astigmatic aberration (field curvature), C illustrates distortion, and D illustrates lateral chromatic aberration.
Figure 23:
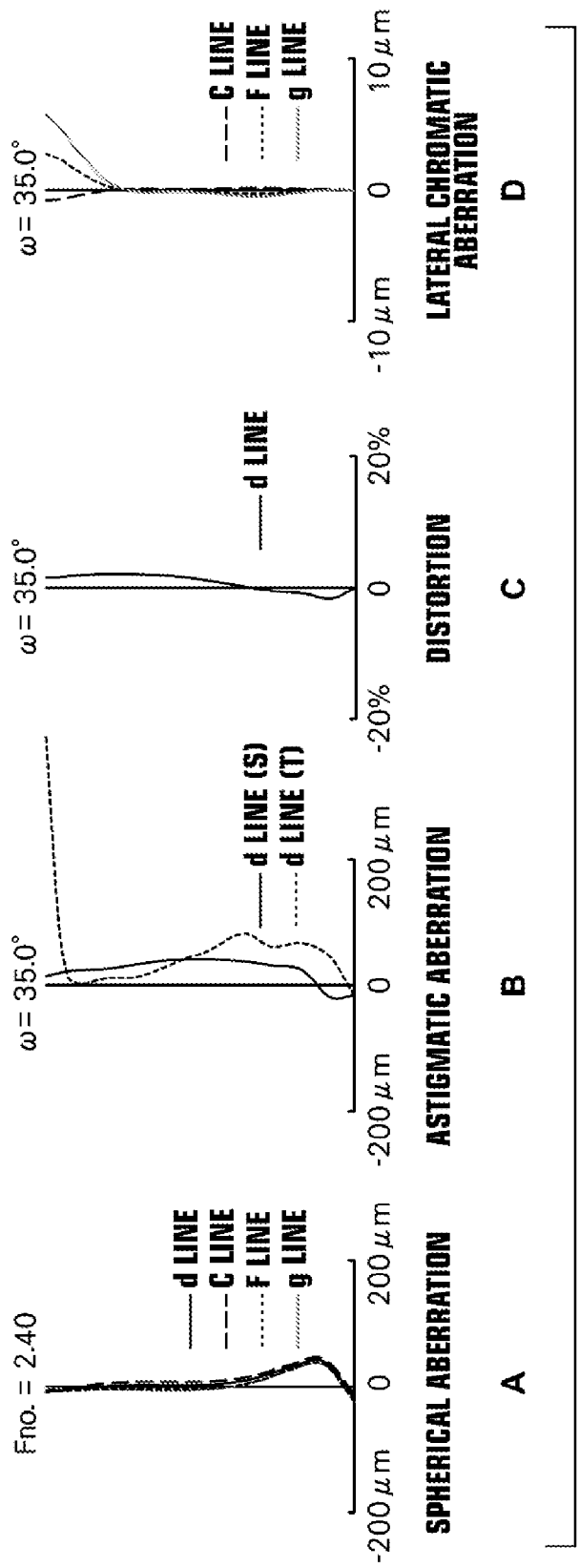
FIG. 23 is a collection of diagrams that illustrate aberrations of the imaging lens of Example 9, wherein A illustrates spherical aberration, B illustrates astigmatic aberration (field curvature), C illustrates distortion, and D illustrates lateral chromatic aberration.
Figure 24:
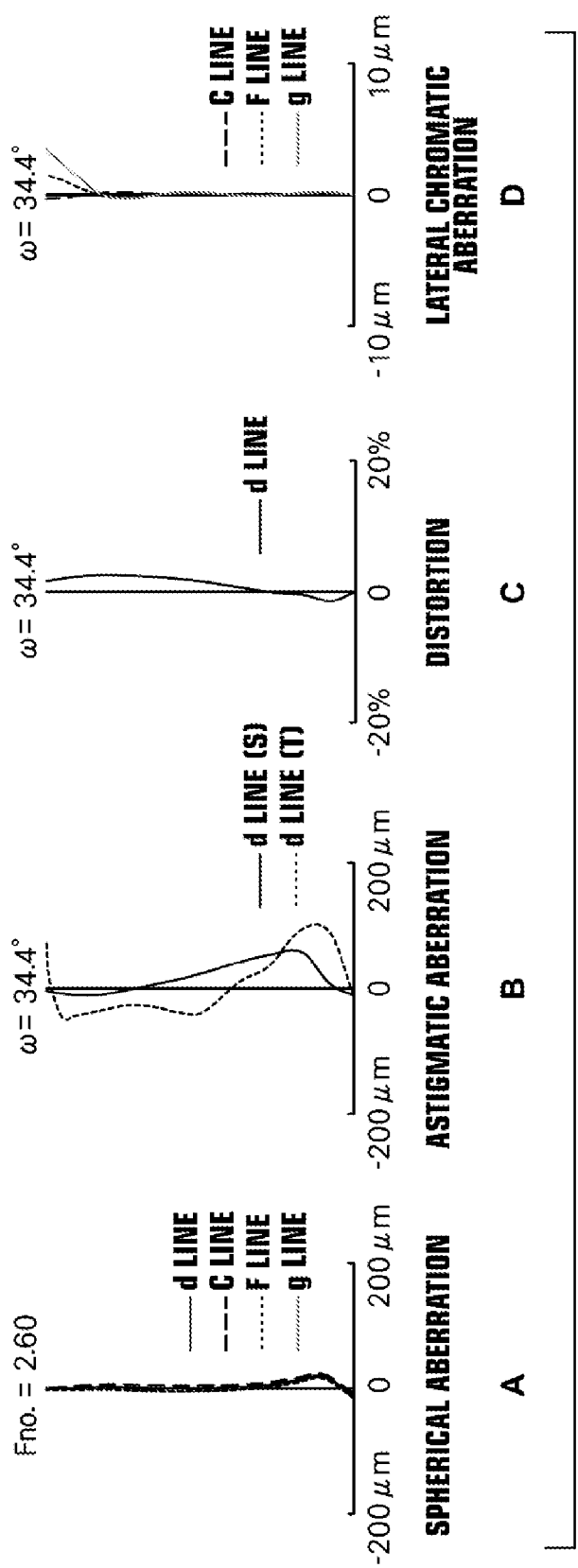
FIG. 24 is a collection of diagrams that illustrate aberrations of the imaging lens of Example 10, wherein A illustrates spherical aberration, B illustrates astigmatic aberration (field curvature), C illustrates distortion, and D illustrates lateral chromatic aberration.
Figure 25:
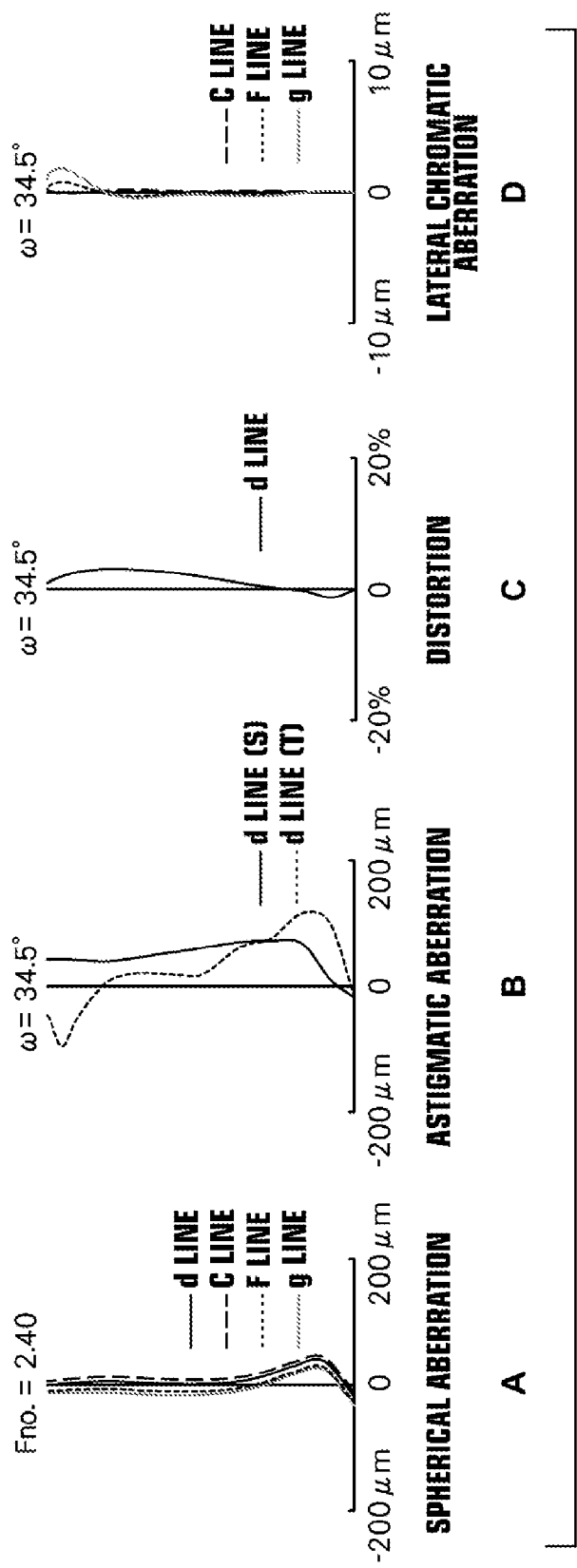
FIG. 25 is a collection of diagrams that illustrate aberrations of the imaging lens of Example 11, wherein A illustrates spherical aberration, B illustrates astigmatic aberration (field curvature), C illustrates distortion, and D illustrates lateral chromatic aberration.
Figure 26:
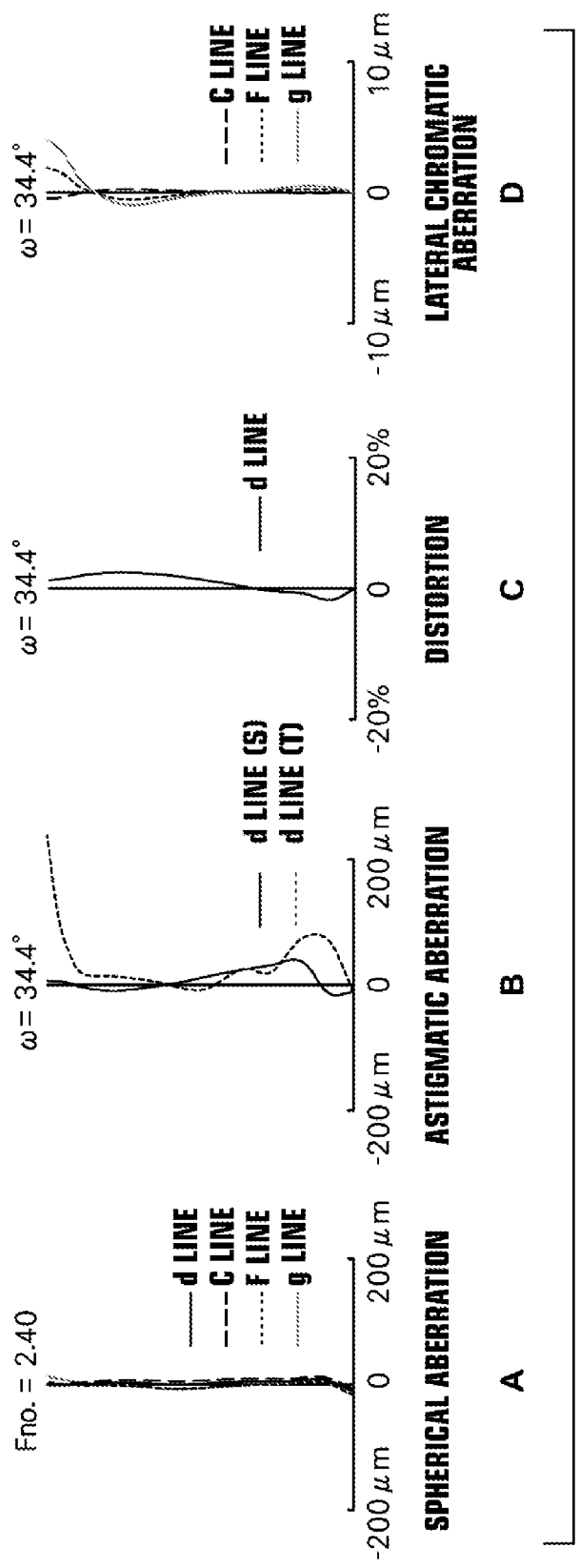
FIG. 26 is a collection of diagrams that illustrate aberrations of the imaging lens of Example 12, wherein A illustrates spherical aberration, B illustrates astigmatic aberration (field curvature), C illustrates distortion, and D illustrates lateral chromatic aberration.
Figure 27:
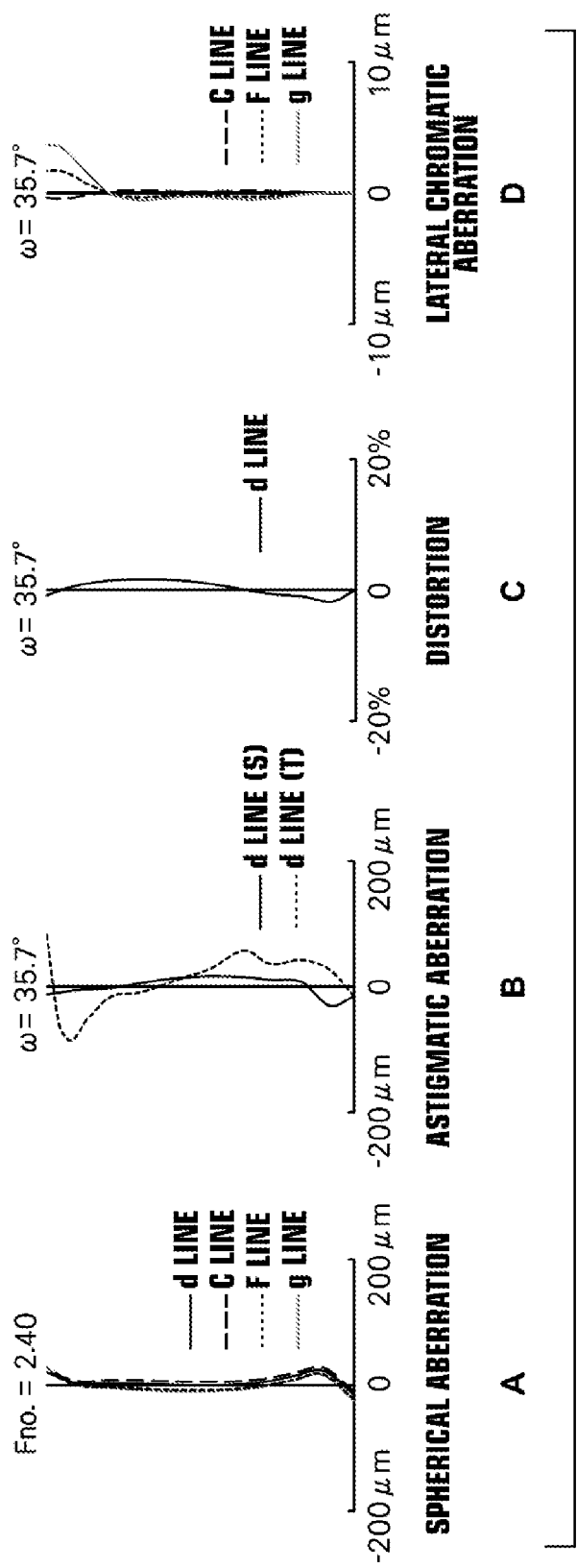
FIG. 27 is a collection of diagrams that illustrate aberrations of the imaging lens of Example 13, wherein A illustrates spherical aberration, B illustrates astigmatic aberration (field curvature), C illustrates distortion, and D illustrates lateral chromatic aberration.

Similarly, the aberrations of the imaging lens of Example 2 are illustrated in A through D of FIG. 16. In addition, the aberrations of the imaging lenses of Examples 3 through 13 are illustrated in A through D of FIGS. 17 through 27.

Table 27 shows values corresponding to Conditional Formulae (1) through (9) of Examples 1 through 13.

As can be understood from each set of numerical value data and from the diagrams that illustrate aberrations, each of the Examples realizes high imaging performance and a short total length.

Note that the imaging lens of the present invention is not limited to the embodiments and Examples described above, and various modifications are possible. For example, the values of the radii of curvature, the distances among surfaces, the refractive indices, the Abbe's numbers, the aspherical surface coefficients, etc., are not limited to the numerical values indicated in connection with the Examples, and may be other values.

In addition, the Examples are described under the presumption that they are to be utilized with fixed focus. However, it is also possible for configurations capable of adjusting focus to be adopted. It is possible to adopt a configuration, in which the entirety of the lens system is fed out or a portion of the lenses is moved along the optical axis to enable automatic focus, for example.

TABLE 1

Example 1
f = 4.20, Bf = 1.41

| Si | Ri | Di | Ndj | vdj |
|---|---|---|---|---|
| 1 (Aperture Stop) | ∞ | −0.169 | | |
| *2 | 1.6447 | 0.748 | 1.54488 | 54.87 |
| *3 | −24.6636 | 0.098 | | |
| *4 | −10.4958 | 0.341 | 1.63351 | 23.63 |
| *5 | 3.8045 | 0.298 | | |
| *6 | 2.9744 | 0.317 | 1.53391 | 55.89 |
| *7 | 4.3638 | 0.497 | | |
| *8 | −3.1414 | 0.362 | 1.63351 | 23.63 |
| *9 | −4.2223 | 0.128 | | |
| *10 | 1.1548 | 0.479 | 1.53391 | 55.89 |
| *11 | 1.0547 | 0.543 | | |
| 12 | ∞ | 0.300 | 1.56700 | 37.80 |
| 13 | ∞ | 0.680 | | |
| 14 (Imaging Surface) | ∞ | | | |

*Aspherical Surface

TABLE 2

Example 2
f = 4.19, Bf = 1.45

| Si | Ri | Di | Ndj | vdj |
|---|---|---|---|---|
| 1 (Aperture Stop) | ∞ | −0.169 | | |
| *2 | 1.5818 | 0.593 | 1.54488 | 54.87 |
| *3 | −688.1717 | 0.139 | | |
| *4 | −11.1408 | 0.342 | 1.63351 | 23.63 |
| *5 | 3.8441 | 0.281 | | |
| *6 | 3.7386 | 0.342 | 1.53391 | 55.89 |
| *7 | 7.2930 | 0.494 | | |
| *8 | −2.9484 | 0.395 | 1.63351 | 23.63 |
| *9 | −4.7599 | 0.122 | | |
| *10 | 1.1342 | 0.520 | 1.53391 | 55.89 |
| *11 | 1.0895 | 0.543 | | |
| 12 | ∞ | 0.300 | 1.56700 | 37.80 |
| 13 | ∞ | 0.723 | | |
| 14 (Imaging Surface) | ∞ | | | |

*Aspherical Surface

TABLE 3

Example 3
f = 4.21, Bf = 1.42

| Si | Ri | Di | Ndj | vdj |
|---|---|---|---|---|
| 1 (Aperture Stop) | ∞ | −0.170 | | |
| *2 | 1.6188 | 0.725 | 1.54488 | 54.87 |
| *3 | 76.0068 | 0.117 | | |
| *4 | −12.2095 | 0.322 | 1.63351 | 23.63 |
| *5 | 4.1487 | 0.290 | | |
| *6 | 2.9313 | 0.311 | 1.53391 | 55.89 |
| *7 | 4.3759 | 0.513 | | |
| *8 | −3.0842 | 0.365 | 1.61399 | 25.48 |
| *9 | −4.2231 | 0.129 | | |
| *10 | 1.1536 | 0.487 | 1.53391 | 55.89 |
| *11 | 1.0541 | 0.543 | | |

TABLE 3-continued

Example 3
f = 4.21, Bf = 1.42

| Si | Ri | Di | Ndj | vdj |
|---|---|---|---|---|
| 12 | ∞ | 0.300 | 1.56700 | 37.80 |
| 13 | ∞ | 0.686 | | |
| 14 (Imaging Surface) | ∞ | | | |

*Aspherical Surface

TABLE 4

Example 4
f = 4.24, Bf = 1.35

| Si | Ri | Di | Ndj | vdj |
|---|---|---|---|---|
| 1 (Aperture Stop) | ∞ | −0.169 | | |
| *2 | 1.6456 | 0.728 | 1.54488 | 54.87 |
| *3 | 48.0664 | 0.102 | | |
| *4 | 76.0010 | 0.361 | 1.63351 | 23.63 |
| *5 | 3.4441 | 0.311 | | |
| *6 | 3.0909 | 0.310 | 1.53391 | 55.89 |
| *7 | 4.1472 | 0.494 | | |
| *8 | −3.0817 | 0.382 | 1.63351 | 23.63 |
| *9 | −4.4140 | 0.132 | | |
| *10 | 1.1737 | 0.499 | 1.53391 | 55.89 |
| *11 | 1.0455 | 0.543 | | |
| 12 | ∞ | 0.300 | 1.56700 | 37.80 |
| 13 | ∞ | 0.594 | | |
| 14 (Imaging Surface) | ∞ | | | |

*Aspherical Surface

TABLE 5

Example 5
f = 4.17, Bf = 1.44

| Si | Ri | Di | Ndj | vdj |
|---|---|---|---|---|
| 1 (Aperture Stop) | ∞ | −0.169 | | |
| *2 | 1.6210 | 0.739 | 1.54488 | 54.87 |
| *3 | −23.2832 | 0.096 | | |
| *4 | −25.5476 | 0.333 | 1.63351 | 23.63 |
| *5 | 2.9507 | 0.266 | | |
| *6 | 8.1176 | 0.351 | 1.53391 | 55.89 |
| *7 | −27.7216 | 0.474 | | |
| *8 | −2.8732 | 0.371 | 1.63351 | 23.63 |
| *9 | −4.0498 | 0.146 | | |
| *10 | 1.1440 | 0.466 | 1.53391 | 55.89 |
| *11 | 1.0357 | 0.543 | | |
| 12 | ∞ | 0.300 | 1.56700 | 37.80 |
| 13 | ∞ | 0.720 | | |
| 14 (Imaging Surface) | ∞ | | | |

*Aspherical Surface

TABLE 6

Example 6
f = 4.20, Bf = 1.38

| Si | Ri | Di | Ndj | vdj |
|---|---|---|---|---|
| 1 (Aperture Stop) | ∞ | −0.169 | | |
| *2 | 1.6359 | 0.742 | 1.54488 | 54.87 |
| *3 | −21.3160 | 0.076 | | |
| *4 | 19.0002 | 0.357 | 1.63351 | 23.63 |

TABLE 6-continued

Example 6
f = 4.20, Bf = 1.38

| Si | Ri | Di | Ndj | vdj |
|---|---|---|---|---|
| *5 | 2.3935 | 0.281 | | |
| *6 | 9.5464 | 0.366 | 1.53391 | 55.89 |
| *7 | −34.2116 | 0.471 | | |
| *8 | −2.7254 | 0.379 | 1.63351 | 23.63 |
| *9 | −4.0496 | 0.150 | | |
| *10 | 1.1338 | 0.480 | 1.53391 | 55.89 |
| *11 | 1.0353 | 0.543 | | |
| 12 | ∞ | 0.300 | 1.56700 | 37.80 |
| 13 | ∞ | 0.661 | | |
| 14 | ∞ | | | |
| (Imaging Surface) | | | | |

*Aspherical Surface

TABLE 7

Example 7
f = 4.01, Bf = 1.23

| Si | Ri | Di | Ndj | vdj |
|---|---|---|---|---|
| 1 | ∞ | −0.169 | | |
| (Aperture Stop) | | | | |
| *2 | 1.6211 | 0.743 | 1.54488 | 54.87 |
| *3 | −76.0000 | 0.085 | | |
| *4 | 12.5356 | 0.378 | 1.63351 | 23.63 |
| *5 | 2.4131 | 0.266 | | |
| *6 | 7.2100 | 0.357 | 1.53391 | 55.89 |
| *7 | 88.7531 | 0.471 | | |
| *8 | −2.7607 | 0.375 | 1.63351 | 23.63 |
| *9 | −4.0573 | 0.147 | | |
| *10 | 1.1247 | 0.507 | 1.53391 | 55.89 |
| *11 | 1.0328 | 0.543 | | |
| 12 | ∞ | 0.300 | 1.56700 | 37.80 |
| 13 | ∞ | 0.553 | | |
| 14 | ∞ | | | |
| (Imaging Surface) | | | | |

*Aspherical Surface

TABLE 8

Example 8
f = 4.07, Bf = 1.44

| Si | Ri | Di | Ndj | vdj |
|---|---|---|---|---|
| 1 | ∞ | −0.169 | | |
| (Aperture Stop) | | | | |
| *2 | 1.6808 | 0.690 | 1.54488 | 54.87 |
| *3 | −23.9719 | 0.166 | | |
| *4 | −2.7566 | 0.304 | 1.63351 | 23.63 |
| *5 | −18.9949 | 0.281 | | |
| *6 | 6.7600 | 0.348 | 1.53391 | 55.89 |
| *7 | −37.9996 | 0.498 | | |
| *8 | −2.7367 | 0.330 | 1.63351 | 23.63 |
| *9 | −8.1929 | 0.122 | | |
| *10 | 1.0810 | 0.504 | 1.53391 | 55.89 |
| *11 | 1.1623 | 0.543 | | |

TABLE 8-continued

Example 8
f = 4.07, Bf = 1.44

| Si | Ri | Di | Ndj | vdj |
|---|---|---|---|---|
| 12 | ∞ | 0.300 | 1.56700 | 37.80 |
| 13 | ∞ | 0.745 | | |
| 14 | ∞ | | | |
| (Imaging Surface) | | | | |

*Aspherical Surface

TABLE 9

Example 9
f = 4.20, Bf = 1.40

| Si | Ri | Di | Ndj | vdj |
|---|---|---|---|---|
| 1 | ∞ | −0.169 | | |
| (Aperture Stop) | | | | |
| *2 | 1.6634 | 0.724 | 1.54488 | 54.87 |
| *3 | −25.3341 | 0.139 | | |
| *4 | −2.9865 | 0.298 | 1.63351 | 23.63 |
| *5 | −18.7014 | 0.321 | | |
| *6 | 3.0640 | 0.306 | 1.53391 | 55.89 |
| *7 | 3.6189 | 0.538 | | |
| *8 | −3.0135 | 0.365 | 1.63351 | 23.63 |
| *9 | −4.4816 | 0.122 | | |
| *10 | 1.1356 | 0.481 | 1.53391 | 55.89 |
| *11 | 1.0450 | 0.543 | | |
| 12 | ∞ | 0.300 | 1.56700 | 37.80 |
| 13 | ∞ | 0.682 | | |
| 14 | ∞ | | | |
| (Imaging Surface) | | | | |

*Aspherical Surface

TABLE 10

Example 10
f = 4.16, Bf = 1.40

| Si | Ri | Di | Ndj | vdj |
|---|---|---|---|---|
| 1 | ∞ | −0.169 | | |
| (Aperture Stop) | | | | |
| *2 | 1.5626 | 0.706 | 1.54488 | 54.87 |
| *3 | 25.3333 | 0.124 | | |
| *4 | −38.0000 | 0.393 | 1.63351 | 23.63 |
| *5 | 3.3009 | 0.258 | | |
| *6 | 7.7906 | 0.324 | 1.53391 | 55.89 |
| *7 | −36.5464 | 0.475 | | |
| *8 | −2.7316 | 0.379 | 1.63351 | 23.63 |
| *9 | −4.3519 | 0.124 | | |
| *10 | 1.1098 | 0.496 | 1.53391 | 55.89 |
| *11 | 1.0504 | 0.543 | | |
| 12 | ∞ | 0.300 | 1.56700 | 37.80 |
| 13 | ∞ | 0.676 | | |
| 14 | ∞ | | | |
| (Imaging Surface) | | | | |

*Aspherical Surface

TABLE 11

Example 11
f = 4.15, Bf = 1.33

| Si | Ri | Di | Ndj | vdj |
|---|---|---|---|---|
| 1 | ∞ | −0.169 | | |
| (Aperture Stop) | | | | |
| *2 | 1.6350 | 0.737 | 1.54488 | 54.87 |
| *3 | 25.3333 | 0.103 | | |
| *4 | 10.7316 | 0.375 | 1.63351 | 23.63 |

TABLE 11-continued

Example 11
f = 4.15, Bf = 1.33

| Si | Ri | Di | Ndj | νdj |
|---|---|---|---|---|
| *5 | 2.5832 | 0.258 | | |
| *6 | 8.9577 | 0.374 | 1.53391 | 55.89 |
| *7 | −37.9403 | 0.492 | | |
| *8 | −2.8162 | 0.366 | 1.63351 | 23.63 |
| *9 | −4.2230 | 0.154 | | |
| *10 | 1.1126 | 0.490 | 1.53391 | 55.89 |
| *11 | 1.0205 | 0.543 | | |
| 12 | ∞ | 0.300 | 1.56700 | 37.80 |
| 13 | ∞ | 0.614 | | |
| 14 (Imaging Surface) | ∞ | | | |

*Aspherical Surface

TABLE 12

Example 12
f = 4.32, Bf = 1.49

| Si | Ri | Di | Ndj | νdj |
|---|---|---|---|---|
| 1 (Aperture Stop) | ∞ | −0.169 | | |
| *2 | 1.6323 | 0.755 | 1.54488 | 54.87 |
| *3 | 33.7409 | 0.172 | | |
| *4 | −3.2035 | 0.302 | 1.63351 | 23.63 |
| *5 | −15.1550 | 0.281 | | |
| *6 | 11.8876 | 0.304 | 1.53391 | 55.89 |
| *7 | −37.9375 | 0.528 | | |
| *8 | −2.7689 | 0.360 | 1.63351 | 23.63 |
| *9 | −7.1426 | 0.122 | | |
| *10 | 1.0782 | 0.515 | 1.53391 | 55.89 |

TABLE 12-continued

Example 12
f = 4.32, Bf = 1.49

| Si | Ri | Di | Ndj | νdj |
|---|---|---|---|---|
| *11 | 1.1023 | 0.543 | | |
| 12 | ∞ | 0.300 | 1.56700 | 37.80 |
| 13 | ∞ | 0.768 | | |
| 14 (Imaging Surface) | ∞ | | | |

*Aspherical Surface

TABLE 13

Example 13
f = 4.19, Bf = 1.42

| Si | Ri | Di | Ndj | νdj |
|---|---|---|---|---|
| 1 (Aperture Stop) | ∞ | −0.169 | | |
| *2 | 1.6478 | 0.688 | 1.54488 | 54.87 |
| *3 | 406.7097 | 0.175 | | |
| *4 | −3.0830 | 0.296 | 1.63351 | 23.63 |
| *5 | −19.0004 | 0.290 | | |
| *6 | 2.9247 | 0.304 | 1.53391 | 55.89 |
| *7 | 3.8683 | 0.544 | | |
| *8 | −3.0040 | 0.369 | 1.63351 | 23.63 |
| *9 | −4.7200 | 0.122 | | |
| *10 | 1.1305 | 0.485 | 1.53391 | 55.89 |
| *11 | 1.0576 | 0.543 | | |
| 12 | ∞ | 0.300 | 1.56700 | 37.80 |
| 13 | ∞ | 0.702 | | |
| 14 (Imaging Surface) | ∞ | | | |

*Aspherical Surface

TABLE 14

Example 1 Aspherical Surface Data

| Surface Number | K | A3 | A4 | A5 | A6 |
|---|---|---|---|---|---|
| 2 | −2.21474E+01 | −3.03617E−02 | 8.17584E−01 | −8.26896E−01 | 1.38864E+00 |
| 3 | −1.35221E+00 | −1.20716E−02 | −9.44957E−03 | 3.39585E−01 | −1.93889E+00 |
| 4 | −9.55411E+01 | 6.70179E−03 | −4.74781E−02 | −1.15794E−01 | 1.85811E+00 |
| 5 | −2.31484E−01 | 3.32855E−02 | −2.24904E−01 | 6.03443E−01 | −8.58889E−01 |
| 6 | −7.98726E+01 | −7.87339E−02 | 9.09019E−01 | −2.66705E+00 | 3.74854E+00 |
| 7 | −4.06108E+01 | 2.04077E−02 | −1.31925E−01 | 8.38711E−01 | −1.99077E+00 |
| 8 | −8.65182E+01 | −1.60493E−01 | 7.27835E−01 | −1.07419E+00 | 1.18650E+00 |
| 9 | −2.08186E+01 | −2.92801E−02 | −4.57862E−01 | 1.66667E+00 | 2.19842E−01 |
| 10 | −3.55735E+01 | 5.90924E−01 | −7.86003E−01 | −1.53995E−01 | 8.77814E−01 |
| 11 | −3.62821E+00 | 2.48534E−01 | −1.39313E+00 | 3.47525E+00 | −5.43180E+00 |

| | A7 | A8 | A9 | A10 | A11 |
|---|---|---|---|---|---|
| 2 | −1.58244E+01 | 6.16698E+01 | −1.17750E+02 | 1.19149E+02 | −5.35322E+01 |
| 3 | 4.09633E+00 | −3.48059E+00 | 1.36536E+00 | −5.35835E+00 | 1.10820E+01 |
| 4 | −7.50962E+00 | 1.43622E+01 | −1.05093E+01 | −3.03114E+00 | −6.09705E−01 |
| 5 | 5.59729E−01 | 5.34088E−01 | −1.03108E+00 | 7.42791E−01 | −1.87248E+00 |
| 6 | −3.25284E+00 | 1.54619E+00 | −1.48439E+00 | 4.98060E+00 | −5.92116E+00 |
| 7 | 1.08550E+00 | 6.80213E−01 | 6.05968E−01 | −2.48513E+00 | 5.99956E−01 |
| 8 | −6.92870E−01 | −8.98863E−01 | 8.96339E−01 | 1.01168E+00 | −1.16581E+00 |
| 9 | −7.70037E+00 | 1.44666E+01 | −1.40306E+01 | 9.87603E+00 | −8.98559E+00 |
| 10 | −5.54391E−01 | −1.93581E−01 | 3.50534E−01 | −1.14058E−01 | 1.96864E−02 |
| 11 | 5.00594E+00 | −2.42302E+00 | 3.07306E−01 | 1.43175E−01 | 8.79536E−02 |

| | A12 | A13 | A14 | A15 | A16 |
|---|---|---|---|---|---|
| 2 | 2.52929E+00 | −1.26421E+01 | 3.08300E+01 | −1.98713E+01 | 4.23526E+00 |
| 3 | −6.52016E+00 | −2.15531E+00 | 2.82557E+00 | 3.10271E−01 | −6.14177E−01 |
| 4 | 2.31604E+01 | −2.77698E+01 | 9.72685E+00 | 1.92507E+00 | −1.43885E+00 |
| 5 | 3.04560E+00 | −1.63518E+00 | −2.72296E−01 | 6.81468E−01 | −2.63352E−01 |
| 6 | −8.43807E−02 | 4.81126E+00 | −3.49592E+00 | 1.12509E+00 | −2.07909E−01 |
| 7 | 7.49743E−01 | −4.23835E−01 | 7.38705E−02 | −1.95714E−01 | 1.06060E−01 |
| 8 | −3.36095E−01 | 6.92890E−01 | −1.66352E−01 | −4.64104E−02 | 1.82815E−02 |

TABLE 14-continued

Example 1 Aspherical Surface Data

| | | | | | |
|---|---|---|---|---|---|
| 9 | 1.06706E+01 | −9.53725E+00 | 5.18913E+00 | −1.53799E+00 | 1.90727E−01 |
| 10 | −2.05452E−02 | 6.18018E−03 | 2.35002E−03 | −1.17051E−03 | 1.08459E−04 |
| 11 | −1.39558E−01 | 5.22153E−02 | −4.83534E−03 | −1.24946E−03 | 2.34440E−04 |

TABLE 15

Example 2 Aspherical Surface Data

| Surface Number | K | A3 | A4 | A5 | A6 |
|---|---|---|---|---|---|
| 2 | −2.20820E+01 | −7.93818E−03 | 7.56895E−01 | −6.06561E−02 | −3.79106E+00 |
| 3 | −2.35840E+01 | −6.13363E−03 | −4.00814E−02 | 3.01227E−01 | −1.63983E+00 |
| 4 | −9.75040E+01 | 1.11261E−03 | −1.01277E−01 | 1.66413E−01 | 2.55223E−01 |
| 5 | 2.15772E−06 | 2.64650E−02 | −1.60845E−01 | 3.48344E−01 | −9.74838E−01 |
| 6 | −8.37230E+01 | −7.67568E−02 | 6.35331E−01 | −2.13486E+00 | 3.43032E+00 |
| 7 | −4.83030E+01 | 2.98404E−02 | −2.13105E−01 | 7.62042E−01 | −1.45452E+00 |
| 8 | −8.74076E+01 | −1.01925E−01 | 4.02720E−01 | −9.66998E−01 | 2.24040E+00 |
| 9 | −2.14765E+01 | −2.08237E−02 | −7.21120E−01 | 3.21899E+00 | −6.35810E+00 |
| 10 | −3.53349E+01 | 5.86438E−01 | −7.22554E−01 | −2.61649E−01 | 5.46185E−01 |
| 11 | −3.72698E+00 | 2.91136E−01 | −1.42874E+00 | 3.54352E+00 | −5.77918E+00 |

| | A7 | A8 | A9 | A10 | A11 |
|---|---|---|---|---|---|
| 2 | 6.74704E+00 | −3.00163E+00 | 5.71163E−01 | −8.19392E+00 | 7.43446E+00 |
| 0 | 3.81812E+00 | −3.96903E+00 | 2.52138E+00 | −6.14701E+00 | 8.89279E+00 |
| 4 | −1.73291E+00 | 2.88366E+00 | 5.18934E−01 | −6.41903E+00 | 2.41216E+00 |
| 5 | 3.24707E+00 | −6.09086E+00 | 6.07627E+00 | −2.19267E+00 | −4.14105E+00 |
| 6 | −1.06686E+00 | −6.78092E+00 | 8.75919E+00 | 7.96306E+00 | −2.51045E+01 |
| 7 | −1.28282E−02 | 3.51567E+00 | −3.81390E+00 | −8.41045E−01 | 3.54538E+00 |
| 8 | −3.42159E+00 | 2.05627E+00 | 4.83550E−02 | 1.03243E+00 | −3.19685E+00 |
| 9 | 6.14808E+00 | −1.66641E+00 | −2.37769E+00 | 2.16612E+00 | 1.19215E−01 |
| 10 | −1.84182E−02 | −3.03603E−01 | 1.92709E−01 | −8.91939E−03 | −3.54843E−02 |
| 11 | 5.41385E+00 | −2.37284E+00 | −1.47870E−01 | 5.61879E−01 | −1.00726E−01 |

| | A12 | A13 | A14 | A15 | A16 |
|---|---|---|---|---|---|
| 2 | 8.65417E+00 | −5.65781E+00 | −1.85140E+01 | 2.26572E+01 | −7.44953E+00 |
| 2 | 3.24687E+00 | −1.79698E+01 | 1.47860E+01 | −3.65068E+00 | −2.30180E−01 |
| 4 | 8.16557E+00 | −3.37178E+00 | −1.19024E+01 | 1.32023E+01 | −4.08088E+00 |
| 5 | 9.82710E+00 | −8.15122E+00 | −1.46280E−01 | 4.10656E+00 | −1.73294E+00 |
| 6 | 1.36570E+01 | 1.24694E+01 | −2.02759E+01 | 1.05323E+01 | −2.07970E+00 |
| 7 | −6.44535E−01 | −2.75266E+00 | 2.87043E+00 | −1.33454E+00 | 2.79998E−01 |
| 8 | 2.89959E+00 | −1.82051E+00 | 1.48200E+00 | −9.23966E−01 | 2.30721E−01 |
| 9 | −6.81777E−01 | −2.70018E−01 | 6.52581E−01 | −3.12725E−01 | 4.99213E−02 |
| 10 | 1.48803E−02 | −4.44317E−03 | 2.13817E−03 | −6.25461E−04 | 6.08598E−05 |
| 11 | −1.00129E−01 | 5.57612E−02 | −9.53049E−03 | −3.64828E−05 | 1.21041E−04 |

TABLE 16

Example 3 Aspherical Surface Data

| Surface Number | K | A3 | A4 | A5 | A6 |
|---|---|---|---|---|---|
| 2 | −2.20815E+01 | −2.50066E−02 | 8.24533E−01 | −8.30524E−01 | 1.38744E+00 |
| 3 | −6.94570E+03 | −1.24651E−02 | −9.65413E−03 | 3.39070E−01 | −1.93901E+00 |
| 4 | −9.15318E+01 | 5.61537E−03 | −4.83347E−02 | −1.16680E−01 | 1.85709E+00 |
| 5 | −1.60568E−01 | 3.41394E−02 | −2.24492E−01 | 6.03668E−01 | −8.58678E−01 |
| 6 | −7.97580E+01 | −7.18360E−02 | 9.09845E−01 | −2.66736E+00 | 3.74869E+00 |
| 7 | −4.12637E+01 | 2.22371E−02 | −1.31216E−01 | 8.39061E−01 | −1.99082E+00 |
| 8 | −8.65094E+01 | −1.59372E−01 | 7.27964E−01 | −1.07422E+00 | 1.18665E+00 |
| 9 | −2.01883E+01 | −2.91632E−02 | −4.57578E−01 | 1.66879E+00 | 2.19921E−01 |
| 10 | −3.55986E+01 | 5.91101E−01 | −7.85912E−01 | −1.53963E−01 | 8.77827E−01 |
| 11 | −3.64200E+00 | 2.49563E−01 | −1.39289E+00 | 3.47532E+00 | −5.43179E+00 |

| | A7 | A8 | A9 | A10 | A11 |
|---|---|---|---|---|---|
| 2 | −1.58256E+01 | 6.16694E+01 | −1.17746E+02 | 1.19155E+02 | −5.35288E+01 |
| 3 | 4.09619E+00 | −3.48098E+00 | 1.36428E+00 | −5.36061E+00 | 1.10799E+01 |
| 4 | −7.51091E+00 | 1.43604E+01 | −1.05118E+01 | −3.03415E+00 | −6.13093E−01 |
| 5 | 5.59830E−01 | 5.34062E−01 | −1.03118E+00 | 7.42587E−01 | −1.87251E+00 |
| 6 | −3.25249E+00 | 1.54662E+00 | −1.48394E+00 | 4.98099E+00 | −5.92087E+00 |

TABLE 16-continued

Example 3 Aspherical Surface Data

| | | | | | |
|---|---|---|---|---|---|
| 7 | 1.08550E+00 | 6.80148E-01 | 6.05900E-01 | -2.48521E+00 | 9.99903E-01 |
| 8 | -6.92677E-01 | -8.98719E-01 | 8.96428E-01 | 1.01173E+00 | -1.16580E+00 |
| 9 | -7.70032E+00 | 1.44666E+01 | -1.40306E+01 | 9.87604E+00 | -8.98558E+00 |
| 10 | -5.54387E-01 | -1.93580E-01 | 3.50534E-01 | -1.14058E-01 | 1.96864E-02 |
| 11 | 5.00594E+00 | -2.42302E+00 | 3.07306E-01 | 1.43175E-01 | 8.79535E-02 |

| | A12 | A13 | A14 | A15 | A16 |
|---|---|---|---|---|---|
| 2 | 2.53061E+00 | -1.26480E+01 | 3.08240E+01 | -1.98714E+01 | 4.23842E+00 |
| 3 | -6.52196E+00 | -2.15734E+00 | 2.82512E+00 | 3.09973E-01 | -6.10098E-01 |
| 4 | 2.31587E+01 | -2.77687E+01 | 9.72748E+00 | 1.92838E+00 | -1.43792E+00 |
| 5 | 3.04566E+00 | -1.63523E+00 | -2.73043E-01 | 6.81800E-01 | -2.61940E-01 |
| 6 | -8.41732E-02 | 4.81137E+00 | -3.49593E+00 | 1.12499E+00 | -2.08104E-01 |
| 7 | 7.49706E-01 | -4.23857E-01 | 7.38633E-02 | -1.95710E-01 | 1.06071E-01 |
| 8 | -3.36096E-01 | 6.92881E-01 | -1.66863E-01 | -4.64195E-02 | 1.82721E-02 |
| 9 | 1.06707E+01 | -9.53724E+00 | 5.18913E+00 | -1.53799E+00 | 1.90728E-01 |
| 10 | -2.05452E-02 | 6.18017E-03 | 2.35002E-03 | -1.17051E-03 | 1.08458E-04 |
| 11 | -1.39558E-01 | 5.22153E-02 | -4.83535E-03 | -1.24946E-03 | 2.34438E-04 |

TABLE 17

Example 4 Aspherical Surface Data

| Surface Number | K | A3 | A4 | A5 | A6 |
|---|---|---|---|---|---|
| 2 | -2.21223E+01 | -3.06610E-02 | 8.17880E-01 | -8.29328E-01 | 1.38771E+00 |
| 3 | 9.76090E+02 | -1.25823E-02 | -1.06353E-02 | 3.38443E-01 | -1.93971E+00 |
| 4 | -1.05214E+03 | 6.46335E-03 | -4.68301E-02 | -1.15373E-01 | 1.85811E+00 |
| 5 | -2.47953E-01 | 3.44177E-02 | -2.25718E-01 | 6.02536E-01 | -8.59549E-01 |
| 6 | -8.09236E+01 | -8.06600E-02 | 9.08445E-01 | -2.66617E+00 | 3.74952E+00 |
| 7 | -4.03910E+00 | 2.46493E-02 | -1.31637E-01 | 6.38427E-01 | -1.99122E+00 |
| 8 | -8.66124E+01 | -1.64655E-01 | 7.26200E-01 | -1.07381E+00 | 1.18674E+00 |
| 9 | -2.08212E+01 | -2.88237E-02 | -4.58020E-01 | 1.66869E+00 | 2.19994E-01 |
| 10 | -3.55114E+01 | 5.91290E-01 | -7.85842E-01 | -1.53942E-01 | 8.77829E-01 |
| 11 | -3.60950E+00 | 2.48946E-01 | -1.39312E+00 | 3.47528E+00 | -5.43178E+00 |

| | A7 | A8 | A9 | A10 | A11 |
|---|---|---|---|---|---|
| 2 | -1.58247E+01 | 6.16707E+01 | -1.17750E+02 | 1.19149E+02 | -5.35301E+01 |
| 3 | 4.09575E+00 | -3.48099E+00 | 1.36495E+00 | -5.35952E+00 | 1.10811E+01 |
| 4 | -7.51010E+00 | 1.43611E+01 | -1.05106E+01 | -3.03285E+00 | -6.11516E-01 |
| 5 | 5.59374E-01 | 5.33842E-01 | -1.03101E+00 | 7.42976E-01 | -1.87231E+00 |
| 6 | -3.25196E+00 | 1.54687E+00 | -1.48377E+00 | 4.98099E+00 | -5.92089E+00 |
| 7 | 1.08536E+00 | 6.80206E-01 | 6.05992E-01 | -2.48509E+00 | 9.99988E-01 |
| 8 | -6.93271E-01 | -8.99337E-01 | 8.95860E-01 | 1.01133E+00 | -1.16606E+00 |
| 9 | -7.70023E+00 | 1.44667E+01 | -1.40306E+01 | 9.87605E+00 | -8.98557E+00 |
| 10 | -5.54386E-01 | -1.93580E-01 | 3.50534E-01 | -1.14058E-01 | 1.96864E-02 |
| 11 | 5.00594E+00 | -2.42302E+00 | 3.07306E-01 | 1.43174E-01 | 3.79532E-02 |

| | A12 | A13 | A14 | A15 | A16 |
|---|---|---|---|---|---|
| 2 | 2.53106E+00 | -1.26421E+01 | 3.08315E+01 | -1.98720E+01 | 4.23219E+00 |
| 3 | -6.52155E+00 | -2.15542E+00 | 2.82575E+00 | 3.10206E-01 | -6.12873E-01 |
| 4 | 2.31587E+01 | -2.77712E+01 | 9.72692E+00 | 1.92615E+00 | -1.43674E+00 |
| 5 | 3.04590E+00 | -1.63460E+00 | -2.71954E-01 | 6.82638E-01 | -2.63106E-01 |
| 6 | -8.40973E-02 | 4.81139E+00 | -3.49611E+00 | 1.12521E+00 | -2.07764E-01 |
| 7 | 7.49761E-01 | -4.23847E-01 | 7.37991E-02 | -1.95774E-01 | 1.05976E-01 |
| 8 | -3.36234E-01 | 6.92828E-01 | -1.66870E-01 | -4.64057E-02 | 1.83182E-02 |
| 9 | 1.06707E+01 | -9.53724E+00 | 5.18913E+00 | -1.53799E+00 | 1.90728E-01 |
| 10 | -2.05453E-02 | 6.18016E-03 | 2.35002E-03 | -1.17051E-03 | 1.08462E-04 |
| 11 | -1.39558E-01 | 5.22152E-02 | -4.83540E-03 | -1.24948E-03 | 2.34427E-04 |

TABLE 18

Example 5 Aspherical Surface Data

| Surface Number | K | A3 | A4 | A5 | A6 |
|---|---|---|---|---|---|
| 2 | -2.19231E+01 | -1.27937E-02 | 8.11374E-01 | -8.64126E-01 | 1.42845E+00 |
| 3 | -7.09668E+02 | -2.10854E-02 | -2.89761E-03 | 3.44642E-01 | -1.93221E+00 |
| 4 | -3.81857E+01 | 3.58986E-03 | -5.28653E-02 | -1.17623E-01 | 1.86051E+00 |

TABLE 18-continued

Example 5 Aspherical Surface Data

|   | K | A3 | A4 | A5 | A6 |
|---|---|---|---|---|---|
| 5 | −4.18660E−01 | 3.60000E−02 | −2.22460E−01 | 6.01738E−01 | −8.61234E−01 |
| 6 | −1.18255E+02 | −1.85901E−01 | 9.45445E−01 | −2.63560E+00 | 3.75880E+00 |
| 7 | −1.79991E+03 | 2.20958E−02 | −1.35764E−01 | 8.34778E−01 | −1.99100E+00 |
| 8 | −7.61306E+01 | −1.63858E−01 | 7.25170E−01 | −1.07486E+00 | 1.18623E+00 |
| 9 | −2.00585E+01 | −3.24824E−02 | −4.58450E−01 | 1.66788E+00 | 2.19835E−01 |
| 10 | −3.36278E+01 | 5.89942E−01 | −7.86081E−01 | −1.53976E−01 | 8.77815E−01 |
| 11 | −3.49648E+00 | 2.45713E−01 | −1.39298E+00 | 3.47527E+00 | −5.43182E+00 |

|   | A7 | A8 | A9 | A10 | A11 |
|---|---|---|---|---|---|
| 2 | −1.57781E+01 | 6.17070E+01 | −1.17935E+02 | 1.19205E+02 | −5.35027E+01 |
| 3 | 4.09952E+00 | −3.47969E+00 | 1.36836E+00 | −5.36454E+00 | 1.10850E+01 |
| 4 | −7.50299E+00 | 1.43714E+01 | −1.05026E+01 | −3.02923E+00 | −6.20517E−01 |
| 5 | 5.57675E−01 | 5.33932E−01 | −1.02669E+00 | 7.48665E−01 | −1.85802E+00 |
| 6 | −3.25309E+00 | 1.54078E+00 | −1.49244E+00 | 4.96813E+00 | −5.93159E+00 |
| 7 | 1.08680E+00 | 6.81354E−01 | 6.06699E−01 | −2.48516E+00 | −9.99739E−01 |
| 8 | −6.93180E−01 | −8.99040E−01 | 8.96312E−01 | 1.01177E+00 | −1.16567E+00 |
| 9 | −7.70028E+00 | 1.44667E+01 | −1.40305E+01 | 9.87611E+00 | −8.98550E+00 |
| 10 | −5.54387E−01 | −1.93579E−01 | 3.50533E−01 | −1.14058E−01 | 1.96865E−02 |
| 11 | 5.00596E+00 | −2.42301E+00 | 3.07310E−01 | 1.43176E−01 | 8.79538E−02 |

|   | A12 | A13 | A14 | A15 | A16 |
|---|---|---|---|---|---|
| 2 | 2.58918E+00 | −1.26508E+01 | 3.08150E+01 | −1.98819E+01 | 4.22785E+00 |
| 3 | −6.51240E+00 | −2.15179E+00 | 2.81761E+00 | 2.77105E−01 | −5.97777E−01 |
| 4 | 2.31515E+01 | −2.77661E+01 | 9.71761E+00 | 1.91318E+00 | −1.43320E+00 |
| 5 | 3.04653E+00 | −1.63537E+00 | −3.04747E−01 | 6.86326E−01 | −2.42177E−01 |
| 6 | −8.73946E−02 | 4.80958E+00 | −3.48674E+00 | 1.15322E+00 | −1.85806E−01 |
| 7 | 7.49212E−01 | −4.24306E−01 | 7.39362E−02 | −1.93415E−01 | 1.11845E−01 |
| 8 | −3.35920E−01 | 6.93030E−01 | −1.66722E−01 | −4.63013E−02 | 1.83624E−02 |
| 9 | 1.06707E+01 | −9.53721E+00 | 5.18911E+00 | −1.53801E+00 | 1.90730E−01 |
| 10 | −2.05452E−02 | 6.18017E−03 | 2.35006E−03 | −1.17051E−03 | 1.08460E−04 |
| 11 | −1.39558E−01 | 5.22151E−02 | −4.83535E−03 | −1.24946E−03 | 2.34435E−04 |

TABLE 19

Example 6 Aspherical Surface Data

| Surface Number | K | A3 | A4 | A5 | A6 |
|---|---|---|---|---|---|
| 2 | −2.20219E+01 | −1.36096E−02 | 8.05041E−01 | −8.72893E−01 | 1.45391E+00 |
| 3 | −8.95297E+02 | −2.13465E−02 | −2.80420E−03 | 3.43217E−01 | −1.93294E+00 |
| 4 | −5.04486E+01 | 3.66913E−03 | −5.33030E−02 | −1.17578E−01 | 1.86058E+00 |
| 5 | −3.92950E−01 | 3.54043E−02 | −2.22299E−01 | 6.01448E−01 | −8.61604E−01 |
| 6 | −1.22973E+02 | −1.94450E−01 | 9.40884E−01 | −2.63601E+00 | 3.75923E+00 |
| 7 | −1.60441E+03 | 1.96507E−02 | −1.35212E−01 | 8.34975E−01 | −1.99090E+00 |
| 8 | −7.52205E+01 | −1.66449E−01 | 7.23646E−01 | −1.07532E+00 | 1.18607E+00 |
| 9 | −2.00897E+01 | −3.61668E−02 | −4.59039E−01 | 1.66748E+00 | 2.19801E−01 |
| 10 | −3.35541E+01 | 5.88358E−01 | −7.86049E−01 | −1.53929E−01 | 8.77836E−01 |
| 11 | −3.52471E+00 | 2.44725E−01 | −1.39269E+00 | 3.47525E+00 | −5.43195E+00 |

|   | A7 | A8 | A9 | A10 | A11 |
|---|---|---|---|---|---|
| 2 | −1.58117E+01 | 6.17206E+01 | −1.17936E+02 | 1.19215E+02 | −5.35066E+01 |
| 3 | 4.09856E+00 | −3.48105E+00 | 1.36556E+00 | −5.36581E+00 | 1.10829E+01 |
| 4 | −7.50329E+00 | 1.43703E+01 | −1.05038E+01 | −3.03383E+00 | −6.27178E−01 |
| 5 | 5.57531E−01 | 5.34252E−01 | −1.02552E+00 | 7.48616E−01 | −1.85324E+00 |
| 6 | −3.25277E+00 | 1.54104E+00 | −1.49132E+00 | 4.97105E+00 | −5.93317E+00 |
| 7 | 1.08680E+00 | 6.81396E−01 | 6.06687E−01 | −2.48495E+00 | 9.99788E−01 |
| 8 | −6.93273E−01 | −8.99095E−01 | 8.96287E−01 | 1.01177E+00 | −1.16568E+00 |
| 9 | −7.70028E+00 | 1.44667E+01 | −1.40305E+01 | 9.87611E+00 | −8.98550E+00 |
| 10 | −5.54379E−01 | −1.93576E−01 | 3.50534E−01 | −1.14057E−01 | 1.96866E−02 |
| 11 | 5.00595E+00 | −2.42302E+00 | 3.07310E−01 | 1.43176E−01 | 8.79539E−02 |

|   | A12 | A13 | A14. | A15 | A16 |
|---|---|---|---|---|---|
| 2 | 2.59403E+00 | −1.26636E+01 | 3.08077E+01 | −1.98833E+01 | 4.23632E+00 |
| 3 | −6.52715E+00 | −2.14343E+00 | 2.82768E+00 | 2.68067E−01 | −5.93977E−01 |
| 4 | 2.31494E+01 | −2.77610E+01 | 9.71342E+00 | 1.91665E+00 | −1.43438E+00 |
| 5 | 3.04886E+00 | −1.63360E+00 | −3.13509E−01 | 6.85120E−01 | −2.46472E−01 |
| 6 | −9.01234E−02 | 4.80567E+00 | −3.49064E+00 | 1.15964E+00 | −1.75680E−01 |
| 7 | 7.49272E−01 | −4.24256E−01 | 7.38781E−02 | −1.93244E−01 | 1.11854E−01 |
| 8 | −3.35918E−01 | 6.93030E−01 | −1.66722E−01 | −4.62995E−02 | 1.83583E−02 |
| 9 | 1.06707E+01 | −9.53721E+00 | 5.18911E+00 | −1.53801E+00 | 1.90730E−01 |

TABLE 19-continued

Example 6 Aspherical Surface Data

| | | | | | |
|---|---|---|---|---|---|
| 10 | −2.05451E−02 | 6.18020E−03 | 2.35008E−03 | −1.17050E−03 | 1.08469E−04 |
| 11 | −1.39558E−01 | 5.22151E−02 | −4.83534E−03 | −1.24946E−03 | 2.34436E−04 |

TABLE 20

Example 7 Aspherical Surface Data

| Surface Number | K | S3 | A4 | A5 | A6 |
|---|---|---|---|---|---|
| 2 | −2.22685E+01 | −7.55336E−03 | 8.03193E−01 | −8.72620E−01 | 1.46755E+00 |
| 3 | −7.08400E+16 | −2.32517E−02 | 1.08707E−03 | 3.48006E−01 | −1.93455E+00 |
| 4 | −8.18360E+01 | 1.12511E−03 | −5.98432E−02 | −1.22839E−01 | 1.85804E+00 |
| 5 | −3.64578E−01 | 3.37144E−02 | −2.20988E−01 | 6.01325E−01 | −8.61386E−01 |
| 6 | −1.12630E+02 | −1.83612E−01 | 9.37058E−01 | −2.63034E+00 | 3.76503E+00 |
| 7 | −1.11106E+24 | 1.79255E−02 | −1.35117E−01 | 8.34132E−01 | −1.99151E+00 |
| 8 | −7.69428E+01 | −1.63029E−01 | 7.25619E−01 | −1.07559E+00 | 1.18571E+00 |
| 9 | −2.08618E+01 | −3.71569E−02 | −4.58188E−01 | 1.66740E+00 | 2.19737E−01 |
| 10 | −3.34660E+01 | 5.88478E−01 | −7.86026E−01 | −1.53919E−01 | 8.77865E−01 |
| 11 | −3.51888E+00 | 2.46599E−01 | −1.39202E+00 | 3.47534E+00 | −5.43195E+00 |

| | A7 | A8 | A9 | A10 | A11 |
|---|---|---|---|---|---|
| 2 | −1.58145E+01 | 6.17271E+01 | −1.17955E+02 | 1.19221E+02 | −5.35084E+01 |
| 3 | 4.09635E+00 | −3.48388E+00 | 1.36084E+00 | −5.35816E+00 | 1.10778E+01 |
| 4 | −7.49876E+00 | 1.43696E+01 | −1.05071E+01 | −3.03579E+00 | −6.32280E−01 |
| 5 | 5.58372E−01 | 5.35168E−01 | −1.02434E+00 | 7.49267E−01 | −1.85372E+00 |
| 6 | −3.24996E+00 | 1.54180E+00 | −1.49136E+00 | 4.97156E+00 | −5.93261E+00 |
| 7 | 1.08625E+00 | 6.81234E−01 | 6.06318E−01 | −2.48546E+00 | 9.99427E−01 |
| 8 | −6.93642E−01 | −8.99282E−01 | 8.96239E−01 | 1.01170E+00 | −1.16575E+00 |
| 9 | −7.70024E+00 | 1.44668E+01 | −1.40305E+01 | 9.87611E+00 | −8.98550E+00 |
| 10 | −5.54374E−01 | −1.93576E−01 | 3.50535E−01 | −1.14057E−01 | 1.96866E−02 |
| 11 | 5.00595E+00 | −2.42301E+00 | 3.07311E−01 | 1.43176E−01 | 8.79538E−02 |

| | A12 | A13 | A14 | A15 | A16 |
|---|---|---|---|---|---|
| 2 | 2.58970E+00 | −1.26600E+01 | 3.08121E+01 | −1.98812E+01 | 4.24780E+00 |
| 3 | −6.52983E+00 | −2.13425E+00 | 2.83133E+00 | 2.65921E−01 | −6.07185E−01 |
| 4 | 2.31463E+01 | −2.77619E+01 | 9.71068E+00 | 1.91207E+00 | −1.43266E+00 |
| 5 | 3.04750E+00 | −1.63618E+00 | −3.16216E−01 | 6.86547E−01 | −2.34693E−01 |
| 6 | −8.92738E−02 | 4.80639E+00 | −3.48949E+00 | 1.16159E+00 | −1.72613E−01 |
| 7 | 7.49007E−01 | −4.24349E−01 | 7.36715E−02 | −1.93324E−01 | 1.11618E−01 |
| 8 | −3.35975E−01 | 6.93095E−01 | −1.66740E−01 | −4.63124E−02 | 1.83609E−02 |
| 9 | 1.06706E+00 | −9.53722E+00 | 5.16911E+00 | −1.53800E+00 | 1.90730E−01 |
| 10 | −2.05451E−02 | 6.18020E−03 | 2.35008E−03 | −1.17050E−03 | 1.08468E−04 |
| 11 | −1.39558E−01 | 5.22150E−02 | −4.83536E−03 | −1.24946E−03 | 2.34434E−04 |

TABLE 21

Example 8 Aspherical Surface Data

| Surface Number | K | A3 | A4 | A5 | A6 |
|---|---|---|---|---|---|
| 2 | −2.28823E+01 | −8.01029E−03 | 7.57935E−01 | −7.90998E−01 | 1.42293E+00 |
| 3 | −6.34999E+02 | −1.10075E−02 | 9.73856E−04 | 3.29062E−01 | −1.94354E+00 |
| 4 | −4.71536E+01 | −2.90630E−02 | −7.37298E−02 | −1.16428E−01 | 1.87178E+00 |
| 5 | −6.95235E+03 | 5.24943E−02 | −2.08430E−01 | 5.95955E−01 | −8.71975E−01 |
| 6 | −1.07423E+02 | −1.20776E−01 | 9.05217E−01 | −2.64133E+00 | 3.75149E+00 |
| 7 | −7.31852E+00 | 4.56293E−02 | −1.28292E−01 | 8.27454E−01 | −1.99453E+00 |
| 8 | −7.83655E+01 | −1.58174E−01 | 7.08341E−01 | −1.07014E+00 | 1.18865E+00 |
| 9 | −2.12973E+01 | −5.93602E−02 | −4.49042E−01 | 1.66858E+00 | 2.20211E−01 |
| 10 | −3.31667E+01 | 5.89656E−01 | −7.85678E−01 | −1.53695E−01 | 8.77863E−01 |
| 11 | −3.45144E+00 | 2.52201E−01 | −1.39328E+00 | 3.47571E+00 | −5.43169E+00 |

| | A7 | A8 | A9 | A10 | A11 |
|---|---|---|---|---|---|
| 2 | −1.58208E+01 | 6.17285E+01 | −1.18007E+02 | 1.19231E+02 | −5.34045E+01 |
| 3 | 4.09745E+00 | −3.47166E+00 | 1.37904E+00 | −5.38352E+00 | 1.11153E+01 |
| 4 | −7.48925E+00 | 1.43798E+01 | −1.05027E+01 | −3.04661E+00 | −6.52249E−01 |
| 5 | 5.46055E−01 | 5.23808E−01 | −1.03741E+00 | 7.40814E−01 | −1.86751E+00 |
| 6 | −3.25930E+00 | 1.53869E+00 | −1.49028E+00 | 4.97605E+00 | −5.92196E+00 |
| 7 | 1.08497E+00 | 6.80820E−01 | 6.06619E−01 | −2.48492E+00 | 1.00019E+00 |

TABLE 21-continued

| Example 8 Aspherical Surface Data | | | | |
|---|---|---|---|---|
| 3 | −6.93158E−01 | −8.99894E−01 | 8.95643E−01 | 1.01138E+00 | −1.16583E+00 |
| 9 | −7.70013E+00 | 1.44665E+01 | −1.40307E+01 | 9.87599E+00 | −8.98562E+00 |
| 10 | −5.54372E−01 | −1.93578E−01 | 3.50532E−01 | −1.14059E−01 | 1.96828E−02 |
| 11 | 5.00596E+00 | −2.42304E+00 | 3.07293E−01 | 1.43170E−01 | 8.79521E−02 |

|  | A12 | A13 | A14 | A15 | A16 |
|---|---|---|---|---|---|
| 2 | 2.61311E+00 | −1.27117E+01 | 3.07617E+01 | −1.98955E+01 | 4.27014E+00 |
| 3 | −6.52067E+00 | −2.18017E+00 | 2.82339E+00 | 2.61814E−01 | −5.78042E−01 |
| 4 | 2.31183E+01 | −2.77483E+01 | 9.74433E+00 | 1.96542E+00 | −1.47749E+00 |
| 5 | 3.06012E+00 | −1.61821E+00 | −2.95685E−01 | 6.86014E−01 | −2.85455E−01 |
| 6 | −8.30138E−02 | 4.81352E+00 | −3.49529E+00 | 1.12761E+00 | −2.07267E−01 |
| 7 | 7.49980E−01 | −4.23488E−01 | 7.44654E−02 | −1.94754E−01 | 1.07574E−01 |
| 8 | −3.36032E−01 | 6.93030E−01 | −1.66741E−01 | −4.64114E−02 | 1.81860E−02 |
| 9 | 1.06707E+01 | −9.53725E+0.0 | 5.18912E+00 | −1.53797E+00 | 1.90732E−01 |
| 10 | −2.05453E−02 | 6.18022E−03 | 2.35005E−03 | −1.17047E−03 | 1.08486E−04 |
| 11 | −1.39559E−01 | 5.22151E−02 | −4.83527E−03 | −1.24939E−03 | 2.34473E−04 |

TABLE 22

| Example 9 Aspherical Surface Data. | | | | | |
|---|---|---|---|---|---|
| Surface Number | K | A3 | A4 | A5 | A6 |
| 2 | −2.25123E+01 | −1.52100E−02 | 7.89533E−01 | −8.26326E−01 | 1.40645E+00 |
| 3 | −8.60306E+02 | −7.19110E−03 | −6.54934E−03 | 3.33314E−01 | −1.94871E+00 |
| 4 | −5.33693E+01 | −1.82174E−02 | −5.74498E−02 | −1.17248E−01 | 1.86183E+00 |
| 5 | −4.47621E+03 | 5.99479E−02 | −2.17448E−01 | 6.02545E−01 | −8.62692E−01 |
| 6 | −8.56688E+01 | −6.14856E−02 | 8.79887E−01 | −2.66810E+00 | 3.74806E+00 |
| 7 | −3.84405E+01 | 2.91617E−02 | −1.33686E−01 | 8.35446E−01 | −1.99153E+00 |
| 8 | −8.17060E+01 | −1.71264E−01 | 7.19826E−01 | −1.06884E+00 | 1.18931E+00 |
| 9 | −2.10449E+01 | −3.56266E−02 | −4.58117E−01 | 1.66872E+00 | 2.20409E−01 |
| 10 | −3.47678E+01 | 5.91664E−01 | −7.86199E−01 | −1.54037E−01 | 8.77803E−01 |
| 11 | −3.54421E+00 | −2.49177E−01 | −1.39327E+00 | 3.47525E+00 | −5.43183E+00 |

|  | A7 | A8 | A9 | A10 | A11 |
|---|---|---|---|---|---|
| 2 | −1.58016E+01 | 6.16989E+01 | −1.17868E+02 | 1.19172E+02 | −5.34971E+01 |
| 3 | 4.08389E+00 | −3.48955E+00 | 1.36717E+00 | −5.35097E−01 | 1.11006E+00 |
| 4 | −7.50268E+00 | 1.43694E+01 | −1.05091E+01 | −3.03972E+00 | −6.29215E−01 |
| 5 | 5.54289E−01 | 5.27713E−01 | −1.03786E+00 | 7.36988E−01 | −1.87445E+00 |
| 6 | −3.25453E+00 | 1.54460E+00 | −1.48576E+00 | 4.98010E+00 | −5.92127E+00 |
| 7 | 1.08585E+00 | 6.80527E−01 | 6.06055E−01 | −2.48528E+00 | 9.99722E−01 |
| 8 | −6.92657E−01 | −8.99575E−01 | 8.95669E−01 | 1.01123E+00 | −1.16609E+00 |
| 9 | −7.70001E+00 | 1.44668E+01 | −1.40306E+01 | 9.87603E+00 | −8.98560E+00 |
| 10 | −5.54395E−01 | −1.93584E−01 | 3.50532E−01 | −1.14059E−01 | 1.96860E−02 |
| 11 | 5.00591E+00 | −2.42303E+00 | 3.07302E−01 | 1.43174E−01 | 8.79533E−02 |

|  | A12 | A13 | A14 | A15 | A16 |
|---|---|---|---|---|---|
| 2 | 2.56644E+00 | −1.26633E+01 | 3.08213E+01 | −1.98690E+01 | 4.22705E+00 |
| 3 | −6.51629E+00 | −2.15971E+00 | 2.80537E+00 | 2.93781E−01 | −5.89181E−01 |
| 4 | 2.31463E+01 | −2.77705E+01 | 9.74776E+00 | 1.95215E+00 | −1.45542E+00 |
| 5 | 3.04864E+00 | −1.62468E+00 | −2.58692E−01 | 6.85670E−01 | −2.92153E−01 |
| 6 | −8.44640E−02 | 4.81086E+00 | −3.49664E+00 | 1.12346E+00 | −2.10480E−01 |
| 7 | 7.49508E−01 | −4.24032E−01 | 7.37248E−02 | −1.95801E−01 | 1.06015E−01 |
| 8 | −3.36250E−01 | 6.92802E−01 | −1.66904E−01 | −4.64269E−02 | 1.82695E−02 |
| 9 | 1.06707E+01 | −9.53725E+00 | 5.18913E+00 | −1.53799E+00 | 1.90729E−01 |
| 10 | −2.05453E−02 | 6.18020E−03 | 2.35004E−03 | −1.17049E−03 | 1.08469E−04 |
| 11 | −1.39558E−01 | 5.22153E−02 | −4.83530E−03 | −1.24944E−03 | 9.34451E−04 |

TABLE 23

| Example 10 Aspherical Surface Data | | | | | |
|---|---|---|---|---|---|
| Surface Number | K | A3 | A4 | A5 | A6 |
| 2 | −2.19715E+01 | 8.96514E−03 | 8.08348E−01 | −8.72535E−01 | 1.48001E+00 |
| 3 | −3.95326E+03 | −1.11311E−02 | 4.61409E−03 | 3.43141E−01 | −1.93638E+00 |
| 4 | −6.28461E+04 | −9.39242E−03 | −6.17614E−02 | −1.21660E−01 | 1.85862E+00 |
| 5 | −3.04529E−01 | 4.07043E−02 | −2.19497E−01 | 6.02072E−01 | −8.61514E−01 |

TABLE 23-continued

Example 10 Aspherical Surface Data

|   | | | | |
|---|---|---|---|---|
| 6 | −1.19748E+02 | −1.85758E−01 | 9.41325E−01 | −2.63145E+00 | 3.76167E+00 |
| 7 | −2.44985E+02 | 1.68297E−02 | −1.36453E−01 | 8.32838E−01 | −1.99206E+00 |
| 8 | −7.51749E+01 | −1.67014E−01 | 7.20469E−01 | −1.07705E+00 | 1.18552E+00 |
| 9 | −2.06901E+01 | −4.16885E−02 | −4.59959E−01 | 1.66677E+00 | 2.19458E−01 |
| 10 | −3.31295E+01 | 5.88533E−01 | −7.86174E−01 | −1.53971E−01 | 8.77832E−01 |
| 11 | −3.54335E+00 | 2.47310E−01 | −1.39172E+00 | 3.47537E+00 | −5.43195E+00 |

|   | A7 | A8 | A9 | A10 | A11 |
|---|---|---|---|---|---|
| 2 | −1.58483E+01 | 6.17424E+01 | −1.17961E+02 | 1.19235E+02 | −5.34901E+01 |
| 3 | 4.09334E+00 | −3.48520E+00 | 1.36500E+00 | −5.36604E+00 | 1.11008E+01 |
| 4 | −7.50500E+00 | 1.43677E+01 | −1.05074E+01 | −3.03876E+00 | −6.29911E−01 |
| 5 | 5.57284E−01 | 5.34256E−01 | −1.02580E+00 | 7.48474E−01 | −1.85339E+00 |
| 6 | −3.25162E+00 | 1.54163E+00 | −1.49079E+00 | 4.97116E+06 | −5.93293E+00 |
| 7 | 1.08609E+00 | 6.80948E−01 | 6.06318E−01 | −2.48532E+00 | 9.99560E−01 |
| 8 | −6.93260E−01 | −8.99021E−01 | 8.96363E−01 | 1.01182E+00 | −1.16565E+00 |
| 9 | −7.70038E+00 | 1.44668E+01 | −1.40306E+01 | 9.87608E+00 | −8.98555E+00 |
| 10 | −5.54381E−01 | −1.93577E−01 | 3.50534E−01 | −1.14057E−01 | 1.96865E−02 |
| 11 | 5.00594E+00 | −2.42301E+00 | 3.07312E−01 | 1.43177E−01 | 8.79541E−02 |

|   | A12 | A13 | A14 | A15 | A16 |
|---|---|---|---|---|---|
| 2 | 2.60863E+00 | −1.26700E+01 | 3.07989E+01 | −1.98913E+01 | 4.23602E+00 |
| 3 | −6.52363E+00 | −2.13572E+00 | 2.82320E+00 | 2.59728E−01 | −6.02114E−01 |
| 4 | 2.31533E+01 | −2.77564E+01 | 9.71906E+00 | 1.93132E+00 | −1.44721E+00 |
| 5 | 3.04827E+00 | −1.63398E+00 | −3.17762E−01 | 6.95458E−01 | −2.29931E−01 |
| 6 | −9.01177E−02 | 4.80553E+00 | −3.49114E+00 | 1.15905E+00 | −1.77059E−01 |
| 7 | 7.49113E−01 | −4.24341E−01 | 7.38938E−02 | −1.93161E−01 | 1.12025E−01 |
| 8 | −3.35913E−01 | 6.93032E−01 | −1.66717E−01 | −4.63080E−02 | 1.83532E−02 |
| 9 | 1.06707E+01 | −9.53720E+00 | 5.18914E+00 | −1.53804E+00 | 1.90733E−01 |
| 10 | −2.05451E−02 | 6.18017E−03 | 2.35007E−03 | −1.17051E−03 | 1.08465E−04 |
| 11 | −1.39558E−01 | 5.22150E−02 | −4.83535E−03 | −1.24945E−03 | 2.34440E−04 |

TABLE 24

Example 11 Aspherical Surface Data

| Surface Number | K | A3 | A4 | A5 | A6 |
|---|---|---|---|---|---|
| 2 | −2.19582E+01 | −1.21022E−02 | 8.03312E−01 | −8.71179E−01 | 1.46552E+00 |
| 3 | −4.92868E+03 | −1.86310E−02 | −9.78839E−06 | 3.44556E−01 | −1.93284E+00 |
| 4 | −8.16644E+01 | 8.17092E−04 | −5.57234E−02 | −1.19415E−01 | 1.85924E+00 |
| 5 | −4.01701E−01 | 3.63414E−02 | −2.21624E−01 | 6.01915E−01 | −8.61017E−01 |
| 6 | −1.12139E+02 | −1.92337E−01 | 9.38999E−01 | −2.63569E+00 | 3.75981E+00 |
| 7 | −4.31066E+02 | 1.83050E−02 | −1.35588E−01 | 8.34067E−01 | −1.99160E+00 |
| 8 | −7.54596E+01 | −1.65724E−01 | 7.23681E−01 | −1.07528E+00 | 1.18613E+00 |
| 9 | −2.08764E+01 | −3.55040E−02 | −4.59736E−01 | 1.66709E+00 | 2.19588E−01 |
| 10 | −3.30219E+01 | 5.88465E−01 | −7.86054E−01 | −1.53929E−01 | 8.77829E−01 |
| 11 | −3.51698E+00 | 2.47130E−01 | −1.39204E+00 | 3.47536E+00 | −5.43193E+00 |

|   | A7 | A8 | A9 | A10 | A11 |
|---|---|---|---|---|---|
| 2 | −1.58221E+01 | 6.17290E+01 | −1.17946E+02 | 1.19215E+02 | −5.35040E+01 |
| 3 | 4.09678E+00 | −3.48455E+00 | 1.36136E+00 | −5.36785E+00 | 1.10828E+01 |
| 4 | −7.50414E+00 | 1.43700E+01 | −1.05043E+01 | −3.03402E+00 | −6.28415E−01 |
| 5 | 5.58127E−01 | 5.34538E−01 | −1.02552E+00 | 7.47934E−01 | −1.85510E+00 |
| 6 | −3.25225E+00 | 1.54145E+00 | −1.49115E+00 | 4.97118E+00 | −5.93314E+00 |
| 7 | 1.08626E+00 | 6.81015E−01 | 6.06394E−01 | −2.48523E+00 | 9.99613E−01 |
| 8 | −6.93265E−01 | −8.99071E−01 | 8.96294E−01 | 1.01176E+00 | −1.16568E+00 |
| 9 | −7.70035E+00 | 1.44667E+01 | −1.40305E+01 | 9.87611E+00 | −8.98550E+00 |
| 10 | −5.54381E−01 | −1.93577E−01 | 3.50534E−01 | −1.14057E−01 | 1.96866E−02 |
| 11 | 5.00595E+00 | −2.42301E+00 | 3.07310E−01 | 1.43176E−01 | 8.79539E−02 |

|   | A12 | A13 | A14 | A15 | A16 |
|---|---|---|---|---|---|
| 2 | 2.59856E+00 | −1.26636E+01 | 3.08077E+01 | −1.98841E+01 | 4.23934E+00 |
| 3 | −6.52173E+00 | −2.13808E+00 | 2.83573E+00 | 2.67134E−01 | −6.03158E−01 |
| 4 | 2.31469E+01 | −2.77638E+01 | 9.71000E+00 | 1.91802E+00 | −1.42796E+00 |
| 5 | 3.04592E+00 | −1.63757E+00 | −3.17785E−01 | 6.84773E−01 | −2.38178E−01 |
| 6 | −9.03967E−02 | 4.80527E+00 | −3.49131E+00 | 1.15868E+00 | −1.76781E−01 |
| 7 | 7.49140E−01 | −4.24346E−01 | 7.38232E−02 | −1.93287E−01 | 1.11829E−01 |
| 8 | −3.35923E−01 | 6.93027E−01 | −1.66717E−01 | −4.62973E−02 | 1.83623E−02 |
| 9 | 1.06706E+01 | −9.53722E+00 | 5.18911E+00 | −1.53800E+00 | 1.90730E−01 |

TABLE 24-continued

Example 11 Aspherical Surface Data

| | | | | | |
|---|---|---|---|---|---|
| 10 | −2.05451E−02 | 6.18020E−03 | 2.35008E−03 | −1.17050E−03 | 1.08467E−04 |
| 11 | −1.39558E−01 | 5.22150E−02 | −4.83535E−03 | −1.24946E−03 | 2.34435E−04 |

TABLE 25

Example 12 Aspherical Surface Data

| Surface Number | K | A3. | A4 | A5 | A6 |
|---|---|---|---|---|---|
| 2 | −2.32894E+01 | 3.12757E−03 | 7.67306E−01 | −8.04192E−01 | 1.42402E+00 |
| 3 | −1.01604E+03 | −1.91398E−02 | 1.33434E−02 | 2.87756E−01 | −1.93617E+00 |
| 4 | −4.51744E+01 | −1.18564E−02 | −1.00324E−01 | −1.22349E−01 | 1.87747E+00 |
| 5 | −2.25231E+03 | 3.85159E−02 | −1.89746E−01 | 5.88801E−01 | −8.72706E−01 |
| 6 | −1.31752E+02 | −1.34824E−01 | 9.00186E−01 | −2.63139E+00 | 3.75098E+00 |
| 7 | −5.93950E+00 | 3.82108E−02 | −1.03011E−01 | 8.10187E−01 | −2.00027E+00 |
| 8 | −7.55657E+01 | −1.58661E−01 | 6.95730E−01 | −1.03820E+00 | 1.19438E+00 |
| 9 | −2.49988E+01 | −8.73236E−02 | −4.18999E−01 | 1.66288E+00 | 2.22684E−01 |
| 10 | −3.31388E+01 | 5.72038E−01 | −7.79549E−01 | −1.52999E−01 | 8.77845E−01 |
| 11 | −3.42641E+00 | 2.33034E−01 | −1.38100E+00 | 3.47637E+00 | −5.43237E+00 |
| | A7 | A8 | A9 | A10 | A11 |
| 2 | −1.58070E+01 | 6.17588E+01 | −1.18123E+02 | 1.19280E+02 | −5.33396E+01 |
| 3 | 4.11439E+00 | −3.45333E+00 | 1.37062E+00 | −5.34079E+00 | 1.10639E+01 |
| 4 | −7.47981E+00 | 1.43869E+01 | −1.04963E+01 | −3.06989E+00 | −6.90428E−01 |
| 5 | 5.50170E−01 | 5.31942E−01 | −1.03199E+00 | 7.39983E−01 | −1.85401E+00 |
| 6 | −3.27032E+00 | 1.52417E+00 | −1.50435E+00 | 4.96771E+00 | −5.93220E+00 |
| 7 | 1.07881E+00 | 6.79019E−01 | 6.03213E−01 | −2.48892E+00 | 9.99933E−01 |
| 8 | −6.99868E−01 | −9.04441E−01 | 8.94719E−01 | 1.01283E+00 | −1.16416E+00 |
| 9 | −7.139952E+00 | 1.44656E+01 | −1.40308E+01 | 9.87572E+00 | −8.98579E+00 |
| 10 | −5.54430E−01 | −1.93594E−01 | 3.50531E−01 | −1.14053E−01 | 1.96810E−02 |
| 11 | 5.00584E+00 | −2.42303E+00 | 3.07306E−01 | 1.43182E−01 | 8.79543E−02 |
| | A12 | A13 | A14 | A15 | A16 |
| 2 | 2.68314E+00 | −1.27616E+01 | 3.06897E+01 | −2.00144E+01 | 4.41522E+00 |
| 3 | −6.63678E+00 | −2.23287E+00 | 3.12529E+00 | 1.64958E−01 | −6.04361E−01 |
| 4 | 2.31056E+01 | −2.76925E+01 | 9.77104E+00 | 2.05125E+00 | −1.57187E+00 |
| 5 | 3.06943E+00 | −1.61535E+00 | −3.64078E+00 | 7.01796E−01 | −2.38008E−01 |
| 6 | −7.96516E−02 | 4.80998E+00 | −3.47895E+00 | 1.13979E+00 | −1.97682E−01 |
| 7 | 7.50474E−01 | −4.23073E−01 | 7.50763E−02 | −1.93335E−01 | 1.09112E−01 |
| 8 | −3.34342E−01 | 6.90606E−01 | −1.66003E−01 | −4.60507E−02 | 1.78061E−02 |
| 9 | 1.06706E+01 | −9.53726E+00 | 5.18912E+00 | −1.53794E+00 | 1.90765E−01 |
| 10 | −2.05421E−02 | 6.18136E−03 | 2.35026E−03 | −1.17050E−03 | 1.08203E−04 |
| 11 | −1.39562E−01 | 5.22141E−02 | −4.83578E−03 | −1.24942E−03 | 2.34600E−04 |

TABLE 26

Example 13 Aspherical Surface Data

| Surface Number | K | A3 | A4 | A5 | A6 |
|---|---|---|---|---|---|
| 2 | −2.26321E+01 | −1.38456E−02 | 7.92035E−01 | −8.25825E−01 | 1.40784E+00 |
| 3 | −4.21973E+06 | −8.73655E−03 | −6.48481E−03 | 3.31815E−01 | −1.94739E+00 |
| 4 | −5.12220E+01 | −1.85810E−02 | −5.94114E−02 | −1.16694E−01 | 1.86383E+00 |
| 5 | −2.91572E+03 | 5.95005E−02 | −2.15035E−01 | 6.02843E−01 | −8.62942E−01 |
| 6 | −8.64783E+01 | −3.66609E−02 | 8.79587E−01 | −2.66997E+00 | 3.74778E+00 |
| 7 | −3.76657E+01 | 3.39632E−02 | −1.31651E−01 | 8.36331E−01 | −1.99141E+00 |
| 8 | −8.13257E+01 | −1.71569E−01 | 7.18319E−01 | −1.06929E+00 | 1.18956E+00 |
| 9 | −2.15088E+01 | −4.26616E−02 | −4.56458E−01 | 1.66897E+00 | 2.20423E−01 |
| 10 | −3.49307E+01 | 5.90190E−01 | −7.86236E−01 | −1.54008E−01 | 8.77846E−01 |
| 11 | −3.55433E+00 | 2.47826E−01 | −1.39254E+00 | 3.47548E+00 | −5.43181E+00 |
| | A7 | A8 | A9 | A10 | A11 |
| 2 | −1.58003E+01 | 6.16848E+01 | −1.17878E+02 | 1.19186E+02 | −5.34784E+01 |
| 3 | 4.08708E+00 | −3.48498E+00 | 1.36942E+00 | −5.34918E+00 | 1.10993E+01 |
| 4 | −7.50047E+00 | 1.43708E+01 | −1.05093E+01 | −3.04638E+00 | −6.41332E−01 |
| 5 | 5.53583E−01 | 5.26983E−01 | −1.03834E+00 | 7.36674E−01 | −1.87176E+00 |
| 6 | −3.25391E+00 | 1.54550E+00 | −1.48446E+00 | 4.98142E+00 | −5.92113E+00 |
| 7 | 1.08529E+00 | 6.79824E−01 | 6.05388E−01 | −2.48583E+00 | 9.99371E−01 |

TABLE 26-continued

Example 13 Aspherical Surface Data

| | | | | | |
|---|---|---|---|---|---|
| 8 | −6.92357E−01 | −8.99419E−01 | 8.95715E−01 | 1.01122E+00 | −1.16611E+00 |
| 9 | −7.70004E+00 | 1.44667E+01 | −1.40306E+01 | 9.87602E+00 | −8.98558E+00 |
| 10 | −5.54379E−01 | −1.93578E−01 | 3.50534E−01 | −1.14058E−01 | 1.96862E−02 |
| 11 | 5.00591E+00 | −2.42304E+00 | 3.07301E−01 | 1.43173E−01 | 8.79531E−02 |

| | A12 | A13 | A14 | A15 | A16 |
|---|---|---|---|---|---|
| 2 | 2.56633E+00 | −1.26730E+01 | 3.08179E+01 | −1.98713E+01 | 4.22452E+00 |
| 3 | −6.54435E+00 | −2.15291E+00 | 2.81281E+00 | 2.73949E−01 | −5.71566E−01 |
| 4 | 2.31371E+01 | −2.77489E+01 | 9.74758E+00 | 1.97036E+00 | −1.47855E+00 |
| 5 | 3.05145E+00 | −1.62451E+00 | −2.67359E−01 | 6.84504E−01 | −2.86853E−01 |
| 6 | −8.46761E−02 | 4.81016E+00 | −3.49751E+00 | 1.12207E+00 | −2.12223E−01 |
| 7 | 7.49278E−01 | −4.24178E−01 | 7.36280E−02 | −1.95866E−01 | 1.05957E−01 |
| 8 | −3.36275E−01 | 6.92781E−01 | −1.66916E−01 | −4.64335E−02 | 1.82688E−02 |
| 9 | 1.06706E+01 | −9.53725E+00 | 5.18909E+00 | −1.53797E+00 | 1.90735E−01 |
| 10 | −2.05453E−02 | 6.18018E−03 | 2.35003E−03 | −1.17050E−03 | 1.08465E−04 |
| 11 | −1.39558E−01 | 5.22154E−02 | −4.83530E−03 | −1.24943E−03 | 2.34452E−04 |

TABLE 27

Values Related to Conditional Formulae

| Formula | Condition | Example 1 | Example 2 | Example 3 | Example 4 | Example 5 | Example 6 | Example 7 |
|---|---|---|---|---|---|---|---|---|
| (1) | f3/f | 3.86 | 3.32 | 3.68 | 4.87 | 2.83 | 3.34 | 3.66 |
| (2) | f/R6 | 1.41 | 1.12 | 1.42 | 1.37 | 0.51 | 0.44 | 0.56 |
| (3) | vd4 | 23.63 | 23.63 | 25.48 | 23.63 | 23.63 | 23.63 | 23.63 |
| (4) | (R6 − R7)/(R6 + R7) | −0.19 | −0.32 | −0.19 | −0.15 | −1.83 | −1.77 | −0.85 |
| (5) | f1/f | 0.68 | 0.69 | 0.72 | 0.73 | 0.67 | 0.67 | 0.73 |
| (6) | f2/f | −1.04 | −1.07 | −1.15 | −1.35 | −1.00 | −1.04 | −1.20 |
| (7) | f4/f | −5.30 | −3.19 | −5.04 | −4.28 | −4.26 | −3.53 | −3.83 |
| (8) | f5/f | 8.16 | 4.05 | 7.73 | 11.93 | 9.87 | 7.64 | 6.42 |
| (9) | f123/f | 1.06 | 1.05 | 1.06 | 1.03 | 1.02 | 1.01 | 1.04 |

| Formula | Condition | Example 8 | Example 9 | Example 10 | Example 11 | Example 12 | Example 13 |
|---|---|---|---|---|---|---|---|
| (1) | f3/f | 2.65 | 7.48 | 2.90 | 3.28 | 3.94 | 4.82 |
| (2) | f/R6 | 0.60 | 1.37 | 0.53 | 0.46 | 0.36 | 1.43 |
| (3) | vd4 | 23.63 | 23.63 | 23.63 | 23.63 | 23.63 | 23.63 |
| (4) | (R6 − R7)/(R6 + R7) | −1.43 | −0.08 | −1.54 | −1.62 | −1.91 | −0.14 |
| (5) | f1/f | 0.72 | 0.69 | 0.73 | 0.76 | 0.72 | 0.72 |
| (6) | f2/f | −1.26 | −1.35 | −1.15 | −1.32 | −1.50 | −1.40 |
| (7) | f4/f | −1.63 | −3.83 | −3.06 | −3.58 | −1.71 | −3.40 |
| (8) | f5/f | 2.25 | 6.89 | 4.63 | 6.53 | 2.54 | 5.57 |
| (9) | f123/f | 0.98 | 1.03 | 1.03 | 1.03 | 0.98 | 1.03 |

What is claimed is:

1. An imaging lens consisting of five lenses, including:
a first lens having a positive refractive power;
a second lens having a negative refractive power;
a third lens having a positive refractive power and a convex surface that faces an object side;
a fourth lens having a negative refractive power and a meniscus shape with a concave surface that faces the object side in a vicinity of an optical axis; and
a fifth lens having a positive refractive power, a meniscus shape with a convex surface that faces the object side, and at least one inflection point on the surface thereof toward an image side, and satisfying the following conditional formula:

$$0<f/f3<0.5 \quad (1)$$

wherein f is the focal length of the entire system, and f3 is the focal length of the third lens.

2. The imaging lens as defined in claim 1 that further satisfies the following conditional formula:

$$0<f/R6<5 \quad (2)$$

wherein f is the focal length of the entire system, and R6 is the paraxial radius of curvature of the surface of the third lens toward the object side.

3. The imaging lens as defined in claim 1 that further satisfies the following conditional formula:

$$vd4<30 \quad (3)$$

wherein vd4 is the Abbe's number of the fourth lens with respect to the d line.

4. The imaging lens as defined in claim 1 that further satisfies the following conditional formula:

$$-4<(R6-R7)/(R6+R7)<0.1 \quad (4)$$

wherein R6 is the paraxial radius of curvature of the surface of the third lens toward the object side, and R7 is the paraxial radius of curvature of the surface of the third lens toward the image side.

5. The imaging lens as defined in claim 1 that further satisfies the following conditional formula:

$$1<f/f1<2 \quad (5)$$

wherein f is the focal length of the entire system, and f1 is the focal length of the first lens.

6. The imaging lens as defined in claim 1 that further satisfies the following conditional formula:

$$-1.5<f/f2<-0.4 \quad (6)$$

wherein f is the focal length of the entire system, and f2 is the focal length of the second lens.

7. The imaging lens as defined in claim 1 that further satisfies the following conditional formula:

$$-2 < f/f4 < -0.1 \quad (7)$$

wherein f is the focal length of the entire system, and f4 is the focal length of the fourth lens.

8. The imaging lens as defined in claim 1 that further satisfies the following conditional formula:

$$0 < f/f5 < 2 \quad (8)$$

wherein f is the focal length of the entire system, and f5 is the focal length of the fifth lens.

9. The imaging lens as defined in claim 1 that further satisfies the following conditional formula:

$$0.5 < f/f123 < 2 \quad (9)$$

wherein f is the focal length of the entire system, and f123 is the combined focal length of the first through third lenses.

10. The imaging lens as defined in claim 1, wherein:
an aperture stop is positioned at the object side of the surface of the second lens toward the object side, or the aperture stop is positioned at the object side of the object side surface of the second lens.

11. The imaging lens as defined in claim 1 that further satisfies the following conditional formula:

$$0 < f/f3 < 0.45 \quad (1\text{-}1)$$

wherein f is the focal length of the entire system, and f3 is the focal length of the third lens.

12. The imaging lens as defined in claim 1 that further satisfies the following conditional formula:

$$0.2 < f/R6 < 3 \quad (2\text{-}1)$$

wherein f is the focal length of the entire system, and R6 is the paraxial radius of curvature of the surface of the third lens toward the object side.

13. The imaging lens as defined in claim 1 that further satisfies the following conditional formula:

$$vd4 < 26 \quad (3\text{-}1)$$

wherein vd4 is the Abbe's number of the fourth lens with respect to the d line.

14. The imaging lens as defined in claim 1 that further satisfies the following conditional formula:

$$-2.5 < (R6-R7)/(R6+R7) < 0.05 \quad (4\text{-}1)$$

wherein R6 is the paraxial radius of curvature of the surface of the third lens toward the object side, and R7 is the paraxial radius of curvature of the surface of the third lens toward the image side.

15. The imaging lens as defined in claim 1 that further satisfies the following conditional formula:

$$1.25 < f/f1 < 1.47 \quad (5\text{-}2)$$

wherein f is the focal length of the entire system, and f1 is the focal length of the first lens.

16. An imaging lens as defined in claim 1 that further satisfies the following conditional formula:

$$-0.9 < f/f2 < -0.63 \quad (6\text{-}2)$$

wherein f is the focal length of the entire system, and f2 is the focal length of the second lens.

17. The imaging lens as defined in claim 1 that further satisfies the following conditional formula:

$$-1 < f/f4 < -0.17 \quad (7\text{-}2)$$

wherein f is the focal length of the entire system, and f4 is the focal length of the fourth lens.

18. The imaging lens as defined in claim 1 that further satisfies the following conditional formula:

$$0.66 < f/f123 < 1.25 \quad (9\text{-}2)$$

wherein f is the focal length of the entire system, and f123 is the combined focal length of the first through third lenses.

19. An imaging apparatus equipped with the imaging lens as defined in claim 1.

20. The imaging lens as defined in claim 1 wherein correction of astigmatic aberrations at low angles of view is facilitated by the fourth lens being of the meniscus shape having the concave surface toward the object side in the vicinity of the optical axis.

* * * * *